(12) United States Patent
Hara et al.

(10) Patent No.: US 8,369,713 B2
(45) Date of Patent: Feb. 5, 2013

(54) BIT-RATE DISCRIMINATION METHOD AND ITS APPARATUS

(75) Inventors: Kazutaka Hara, Yokosuka (JP); Shunji Kimura, Yokosuka (JP); Hirotaka Nakamura, Yokosuka (JP); Koji Kitahara, Yokohama (JP); Yoshikazu Urabe, Yokohama (JP); Masahiro Endo, Yokohama (JP)

(73) Assignees: Nippon Telegraph and Telephone Corporation, Tokyo (JP); NTT Electronics Corporation, Kanagawa (JP)

( * ) Notice: Subject to any disclaimer, the term of this patent is extended or adjusted under 35 U.S.C. 154(b) by 224 days.

(21) Appl. No.: 12/727,121

(22) Filed: Mar. 18, 2010

(65) Prior Publication Data

US 2011/0229152 A1 Sep. 22, 2011

(51) Int. Cl.
*H04B 10/00* (2006.01)

(52) U.S. Cl. .......................................... 398/202; 398/25

(58) Field of Classification Search .......... 398/202–214, 398/25
See application file for complete search history.

(56) References Cited

U.S. PATENT DOCUMENTS

| | | | | |
|---|---|---|---|---|
| 4,122,405 A * | 10/1978 | Tietz et al. | ................... | 331/1 A |
| 5,473,636 A * | 12/1995 | Rokugawa | ................... | 375/324 |
| 5,546,025 A * | 8/1996 | Casselman | ..................... | 327/43 |
| 5,757,850 A * | 5/1998 | Takaki | .......................... | 375/225 |
| 5,808,760 A * | 9/1998 | Gfeller | ............................ | 398/27 |
| 5,923,455 A * | 7/1999 | Rokugawa | ..................... | 398/202 |
| 6,025,946 A * | 2/2000 | Miyamori et al. | ............. | 398/185 |
| 6,311,047 B1 * | 10/2001 | Gotou | ........................ | 455/234.1 |
| 6,337,886 B1 * | 1/2002 | Asahi | ............................ | 375/316 |
| 6,498,670 B2 * | 12/2002 | Yamashita et al. | ............. | 398/209 |
| 6,580,263 B2 * | 6/2003 | Choi et al. | ...................... | 324/96 |
| 6,600,797 B1 * | 7/2003 | Hasegawa et al. | ............. | 375/376 |
| 6,778,783 B2 * | 8/2004 | Okayasu et al. | .............. | 398/182 |
| 6,850,584 B2 * | 2/2005 | Kogure et al. | ................ | 375/376 |

(Continued)

FOREIGN PATENT DOCUMENTS

| | | |
|---|---|---|
| JP | 08-008954 | 1/1996 |
| JP | 09139754 A | 5/1997 |

(Continued)

OTHER PUBLICATIONS

OFC NFOEC2009, Technical Conference, Exposition Mar. 22-26, 2009.

(Continued)

*Primary Examiner* — Agustin Bello
(74) *Attorney, Agent, or Firm* — DLA Piper (US) LLP

(57) ABSTRACT

In the present invention, unlike a conventional circuit, discrimination is not made by integrating a logical code that includes "0" and "1" to some extent and produced from a random code, but repetition of an identical pattern of a well-known preamble signal added to a head portion of a signal is discriminated when a bit-rate of the signal is changed. More specifically, the repetition of the identical pattern is converted into a consecutive identical signal to generate the consecutive identical signal (having a length of tens bits to thousands bits). Although the consecutive identical signal is longer than a same-code continuation length included in the signal, and is shorter than a time constant necessary to the conventional circuit by about one to three digits. Therefore, an integration time can be shortened to the same degree as the generated consecutive identical signal length, and the bit-rate can be discriminated at high speed within a preamble signal receiving time.

25 Claims, 43 Drawing Sheets

U.S. PATENT DOCUMENTS

| | | | |
|---|---|---|---|
| 6,947,494 B2* | 9/2005 | Kim et al. | 375/316 |
| 7,027,741 B2* | 4/2006 | Marutani et al. | 398/173 |
| 7,039,327 B2* | 5/2006 | Kim et al. | 398/202 |
| 7,088,769 B2* | 8/2006 | Ookubo et al. | 375/225 |
| 7,123,846 B2* | 10/2006 | Tateyama et al. | 398/209 |
| 7,194,025 B2* | 3/2007 | Wood et al. | 375/231 |
| 7,212,589 B2* | 5/2007 | Baumgartner | 375/325 |
| 7,340,186 B2* | 3/2008 | Kuwata | 398/208 |
| 7,389,056 B2* | 6/2008 | Kunii et al. | 398/209 |
| 7,606,487 B1* | 10/2009 | Anslow et al. | 398/27 |
| 7,769,304 B2* | 8/2010 | Sakamoto et al. | 398/202 |
| 7,792,434 B2* | 9/2010 | Ichino | 398/208 |
| 7,805,083 B2* | 9/2010 | Gu et al. | 398/164 |
| 7,831,005 B2* | 11/2010 | Kuwata | 375/371 |
| 7,991,296 B1* | 8/2011 | Johnston et al. | 398/154 |
| 8,041,227 B2* | 10/2011 | Holcombe et al. | 398/138 |
| 2001/0019441 A1* | 9/2001 | Kogure et al. | 359/158 |
| 2002/0027694 A1* | 3/2002 | Kim et al. | 359/189 |
| 2002/0065623 A1* | 5/2002 | Choi et al. | 702/99 |
| 2003/0007224 A1* | 1/2003 | Yamashita et al. | 359/189 |
| 2004/0042544 A1* | 3/2004 | Mejia | 375/225 |
| 2004/0173729 A1* | 9/2004 | Shimizu et al. | 250/214 R |
| 2004/0252754 A1* | 12/2004 | Wood et al. | 375/232 |
| 2005/0024083 A1 | 2/2005 | Kitamura et al. | |
| 2005/0047802 A1* | 3/2005 | Jaynes et al. | 398/208 |
| 2006/0159163 A1* | 7/2006 | Kimura et al. | 375/225 |
| 2006/0216042 A1* | 9/2006 | Yeo et al. | 398/209 |
| 2008/0112712 A1* | 5/2008 | Inoue | 398/208 |
| 2011/0229152 A1* | 9/2011 | Hara et al. | 398/202 |

FOREIGN PATENT DOCUMENTS

| | | |
|---|---|---|
| JP | 2000-040960 | 2/2000 |
| JP | 2005050257 A | 2/2005 |
| JP | 2007004587 A | 1/2007 |
| WO | WO 2005/078927 A1 | 8/2005 |

OTHER PUBLICATIONS

Kazutaka Hara et al., "Burst-mode Bit-rate Discrimination Circuit for 1.25/10.3-Gbit/s Dual-rate PON System", Optical Society of America, 2008.

Japanese language office action dated Apr. 5, 2012 and its English language translation issued in corresponding Japanese application 2008001017.

* cited by examiner

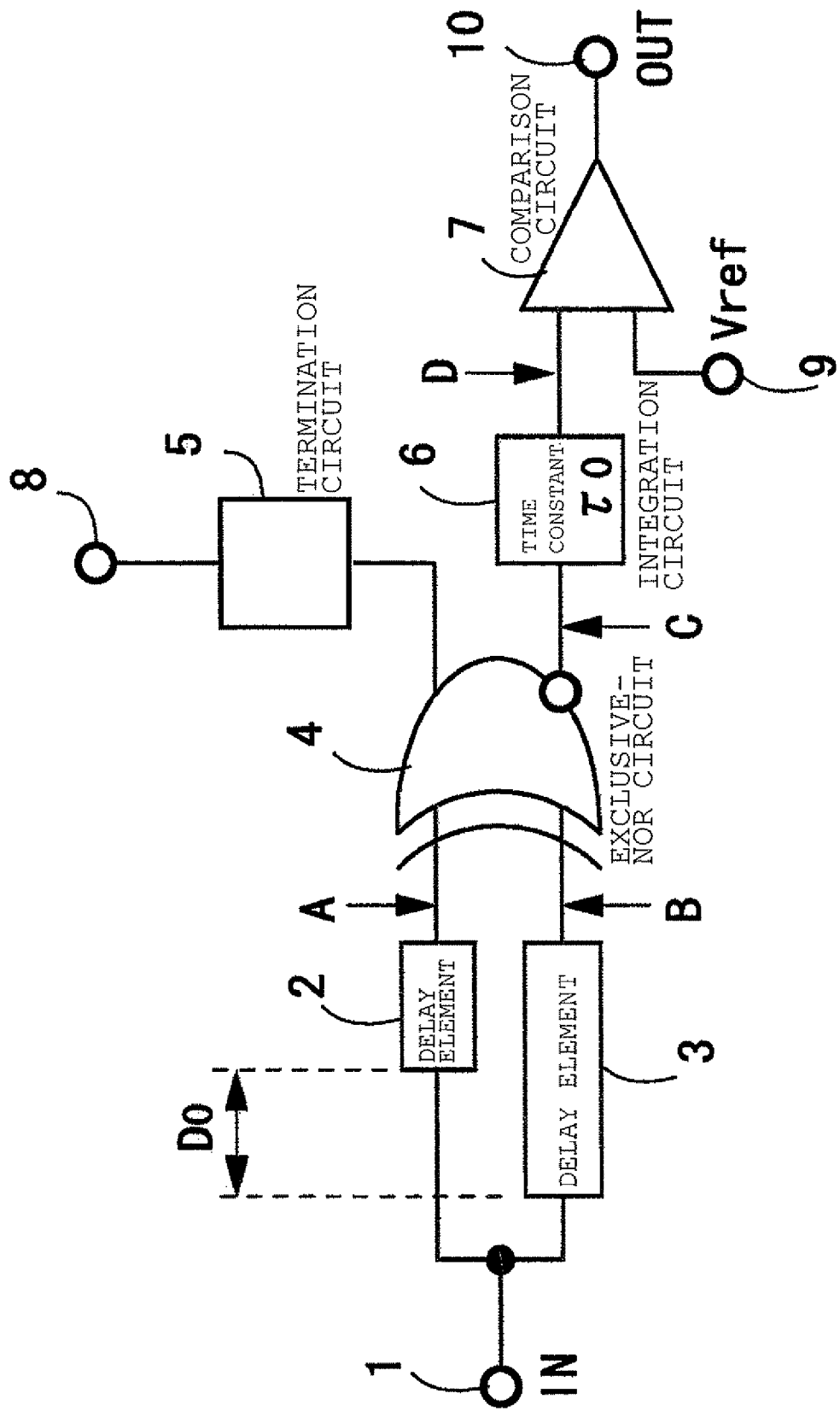

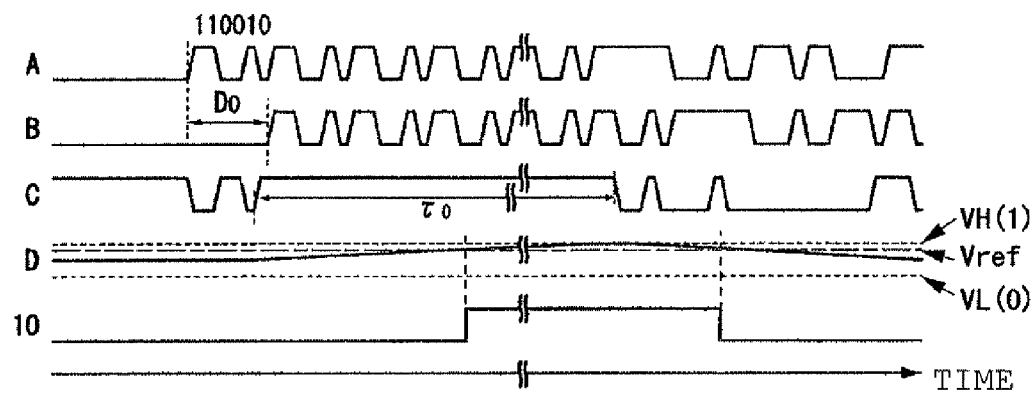
Fig. 2A RESPONSE TO HIGH-RATE SIGNAL
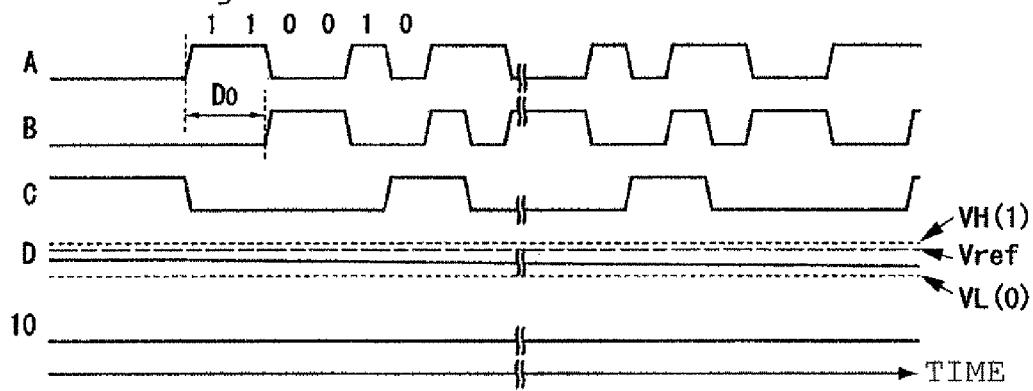
Fig. 2B RESPONSE TO LOW-RATE SIGNAL

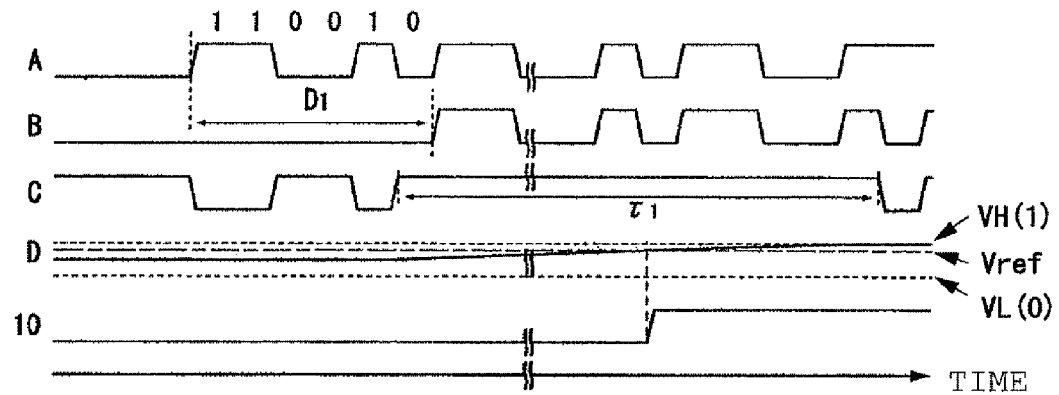
Fig. 4A  RESPONSE TO LOW-RATE SIGNAL
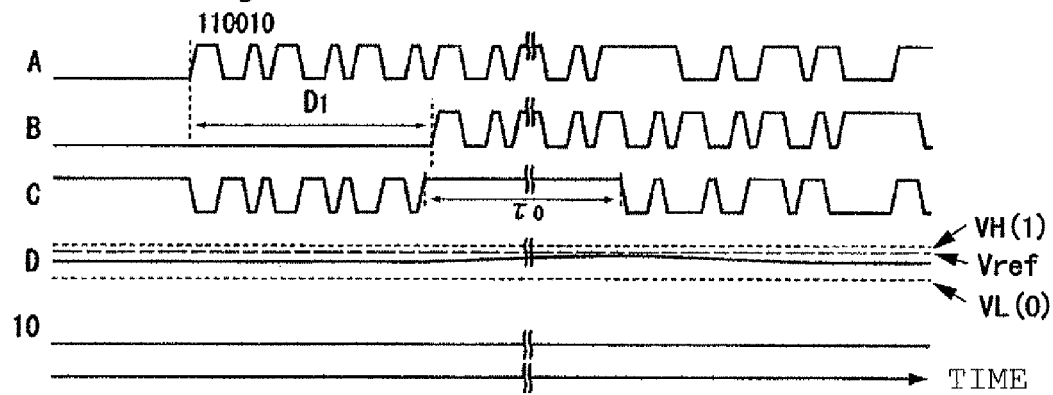
Fig. 4B  RESPONSE TO HIGH-RATE SIGNAL Fig. 13A  RESPONSE TO HIGH-RATE SIGNAL
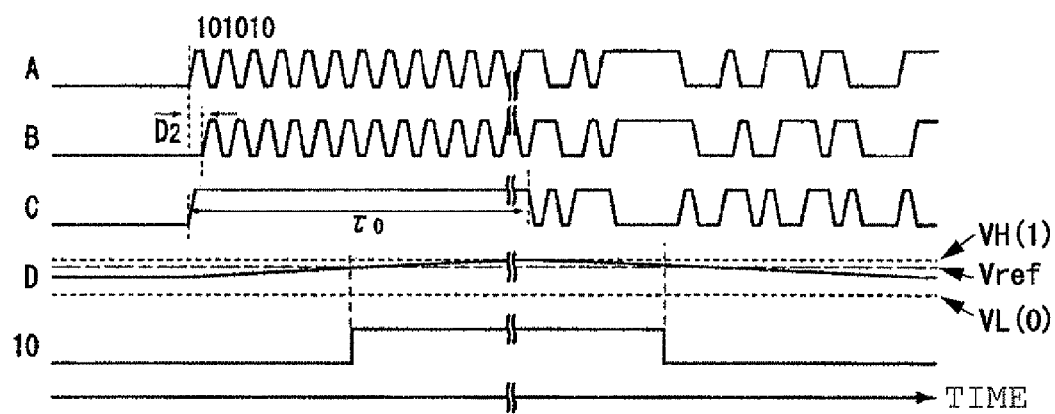
Fig. 13B  RESPONSE TO LOW-RATE SIGNAL
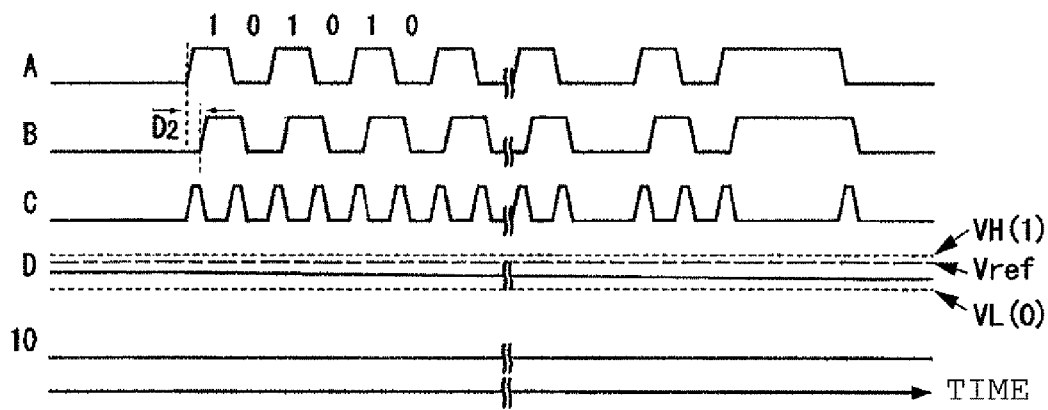

Fig. 15A  RESPONSE TO LOW-RATE SIGNAL
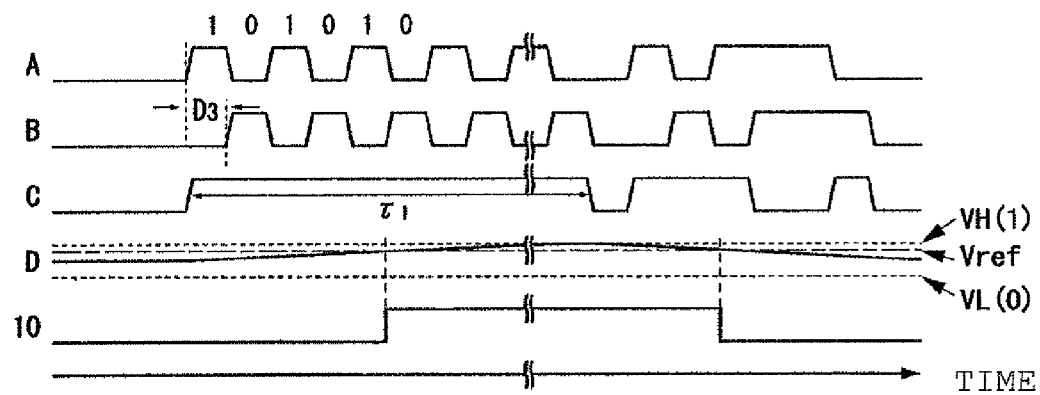
Fig. 15B  RESPONSE TO HIGH-RATE SIGNAL
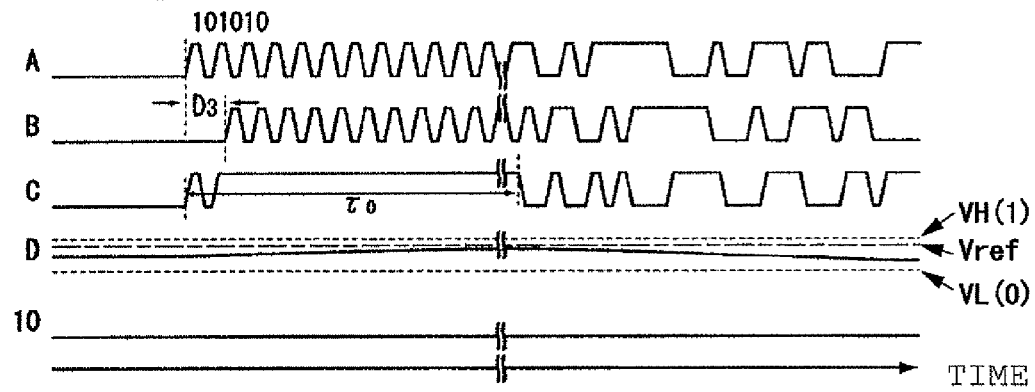

BIT-RATE DISCRIMINATION METHOD AND ITS APPARATUS

TECHNICAL FIELD

The present invention relates to a bit-rate discrimination method and a bit-rate discrimination apparatus for automatically discriminating a bit-rate of an input signal.

BACKGROUND ART

Although communication carriers provide various bit-rate services with the spread of the Internet, maintenance and operation cost increases because a different transmission device is used in each bit-rate. There is a demand for unifying the transmission devices in order to prevent the cost increase. There has been proposed a transmission device that can deal with plural bit-rates to discriminate the bit-rate inside the device (Patent Document 1), and there has also been proposed a mechanism in which optical receiver sensitivity is varied according to the bit-rate (Patent Document 2).

A bit-rate discrimination circuit that discriminates the bit-rates is roughly classified into two type methods. In one of the methods, an edge portion (logical code switching portion of "0"/"1") of a signal is output as a pulse having a constant time width, and the pulse is integrated with respect to the time to specify a signal switching frequency (that is, bit-rate) (Patent Document 1, hereinafter referred to as edge detection method). In the other method, the bit-rate is specified by detecting a low-frequency component of a consecutive identical signal included in the signal (Patent Document 2, hereinafter referred to as low-frequency detection method). Both the methods are based on the assumption that the communication is always conducted at the specified bit-rate after the bit-rate is specified, and the methods do not take into account the high-speed following of the constantly-changing bit-rate. This is because of the following reasons.

In the edge detection method, the edge portion of the signal is detected, and edge density is changed according to same-code continuation included in the signal. The edge density is obtained to some extent for an alternating signal even in the low bit-rate signal, while the edge density is reduced when many long continuous codes are included in the high bit-rate signal. Thus, in order to enhance discrimination accuracy, it is necessary to take some time to statistically make discrimination (usually, time of ten thousand bits to one million bits in terms of bit number). Therefore, an integration time of the edge signal is lengthened. In the low-frequency detection method, because the low-frequency component is detected as its name suggests, it is necessary to set a band of a lowpass filter to a low frequency. Therefore, a time constant of the lowpass filter becomes large order similarly to the integrator in the edge detection.

Recently, a point-to-multipoint network that deals with plural users with one station apparatus becomes widespread, and the need to accommodate users of different bit-rates arises with diversification of the transmission speed. However, for the above-described reasons, a function of instantaneously discriminating the bit-rate with respect to the signal whose bit-rate is switched at high speed is difficult to realized using the bit-rate discrimination circuit of Patent Document 1 or Patent Document 2.

A bit-rate discrimination mechanism that automatically discriminates and detects the received bit-rate is required in order to realize a multi-rate receiver that deals with the plural bit-rates. Furthermore, when the plural bit-rates to be dealt with do not have a relationship of an integral multiple or an integral fraction, a circuit and a device which are connected to a subsequent stage of the receiver must also be able to deal with the plural bit-rates that do not have the relationship of the integral multiple or integral fraction. Therefore, a signal discrimination circuit that can separate the signals according to the bit-rate of the input signal and output the signals from different output terminals in each bit-rate group having a relationship of the integral multiple or integral fraction or in each bit-rate is needed (for example, see Patent Document 3).

FIG. 25 is a block diagram illustrating a conventional receiver that deals with plural bit-rates by combining a signal discrimination circuit and a bit-rate discrimination apparatus automatically detecting received plural bit-rates.

The receiver in FIG. 25 automatically discriminates the bit-rates using the bit-rate discrimination circuit and the signal discrimination circuit, and individually outputs the desired bit-rates from different output ports. Specifically, the receiver includes a photo-detector 101, a trans-impedance amplifier (TIA) 102, a low bit-rate limiting amplifier (LA) 103, a high bit-rate limiting amplifier (LA) 104, a low-bit-rate-side control port 105, a gate circuit 106, a high-bit-rate-side control port 107, a gate circuit 108, a low bit-rate clock and data recovery circuit (CDR) 109, a high bit-rate clock and data recovery circuit (CDR) 110, a low bit-rate signal output terminal 111, a high bit-rate signal output terminal 112, a low-bit-rate discrimination circuit 113, a high-bit-rate discrimination circuit 114, and a reset-set flipflop circuit 115. The receiver in FIG. 25 outputs the received signal from the low bit-rate signal output terminal 111 and the high bit-rate signal output terminal 112 according to the high-bit-rate optical signal and low-bit-rate optical signal, which are input to the photo-detector 101. In the configuration of the receiver in FIG. 25, an output voltage of the high bit-rate limiting amplifier (LA) 104 is partially input to the low-bit-rate discrimination circuit 113 and the high-bit-rate discrimination circuit 114 to discriminate the bit-rates. In other words, the receiver in FIG. 25 has the configuration in which the bit-rates are discriminated by inputting the signals having the plural bit-rates from one input port to the respective bit-rate discrimination circuits.

Thus, the optical transmission receiving circuit can be formed using the bit-rate discrimination circuit and the signal discrimination circuit having the discrimination function such that the bit-rates are automatically discriminated to individually output the signals having the desired bit-rates from different output ports.

CITATION LIST

Patent Literature

Patent Document 1: Japanese Patent Application Laid-Open No. 2000-40960

Patent Document 2: International Publication No. WO2005/078927

Patent Document 3: Japanese Patent Application Laid-Open No. 8-008954

DISCLOSURE OF THE INVENTION

As described above, because it takes a long time for the bit-rate discrimination circuits of Patent Document 1 and Patent Document 2 to make discrimination, the bit-rate cannot be discriminated at high speed in a signal transmission method in which the bit-rate changes at high speed with time.

A first object of the present invention is to provide a bit-rate discrimination method, a bit-rate discrimination circuit, and a bit-rate discrimination apparatus, which can discriminate the bit-rate faster than the conventional technique.

In the receiver in FIG. 25, the low-bit-rate discrimination circuit 113 and the high-bit-rate discrimination circuit 114 discriminate the bit-rate based on the output result of the high bit-rate limiting amplifier (LA) 104. Generally the light-receiving sensitivity is degraded when a band of the electronic device is spread, and a trade-off relationship holds between the light-receiving sensitivity and the band of the electronic device. Therefore, unfortunately the output result from the low-bit-rate discrimination circuit 113 that discriminates the low bit-rate occasionally becomes false discrimination result depending on a light intensity level of the discriminated low bit-rate. The false discrimination result output from the low-bit-rate discrimination circuit 113 will be described with reference to FIG. 26.

FIG. 26 illustrates a timing chart obtained when the false discrimination result is output from each bit-rate discrimination circuit in FIG. 25. The numeral in FIG. 26 denotes a voltage value of the signal output from the device denoted by each numeral in FIG. 25. At this point, to the photo-detector 101, the high-bit-rate signal and the low-bit-rate signal whose light-receiving sensitivity is equal to or lower than that of the high-bit-rate signal are assumed to be input after a long non-signal state follows the low-bit-rate signal and the high-bit-rate signal. A preamble pattern of the signal is assumed to have a period pattern, in which a polarity is inverted at a half of a period and the inverted code of the first half of the pattern becomes the second half of the pattern. As described above, the trade-off relationship holds between the band of the electronic device and the light-receiving sensitivity, and the light-receiving sensitivity is reduced in the high bit-rate limiting amplifier (LA) 104 in exchange for securing the band for putting the high-bit-rate voltage value into the amplitude-limited state. Therefore, the low-bit-rate signal whose light-receiving sensitivity is equal to or lower than that of the high-bit-rate signal is not output after passing through the high bit-rate limiting amplifier (LA) 104. For example, when the high bit-rate limiting amplifier (LA) 104 does not output the low-bit-rate signal, the low-bit-rate discrimination circuit 113 does not output a pulse 116 that is the bit-rate discrimination result, thereby generating a malfunction in which the gate circuit 106 cannot be opened in the receiver in FIG. 25 although the low bit-rate limiting amplifier 103 outputs the low-bit-rate signal.

A second object of the invention is to provide a bit-rate discrimination apparatus and a bit-rate discrimination method, which can discriminate the bit-rate of the input signal even if the waveform degradation or the light-receiving sensitivity degradation is generated due to the band limitation of the electronic device, and a signal discriminator and an optical signal receiving discriminator, which include the bit-rate discrimination apparatus.

To achieve the first object of the invention, a bit-rate discrimination method according to a first aspect of the invention is characterized in that a rate of an input signal is discriminated by utilizing periodicity of a unique preamble signal included in the input signal.

A second aspect of the invention, in the bit-rate discrimination method according to the first aspect of the invention, is characterized by including discriminating a signal rate within a preamble signal receiving time by converting repetition of the same pattern into a consecutive identical signal, and discriminating threshold by integrating the consecutive identical signal.

A bit-rate discrimination circuit according to a third aspect of the invention is characterized by including an integrating unit, in which a delay difference corresponding to an integral multiple of a unique preamble pattern period included in an input signal is provided between two input terminals of a consistency circuit (exclusive-NOR circuit), the input signal is input to the two input terminals with the delay difference, and an output signal from the exclusive-NOR circuit is integrated; and a comparison unit that compares a signal obtained by the integrating unit with a threshold to output discrimination result.

A bit-rate discrimination circuit according to a fourth aspect of the invention is characterized by including an integrating unit, in which a delay difference corresponding to an odd-numbered multiple of a half of a unique preamble pattern period included in an input signal is provided between two input terminals of an inconsistency circuit (exclusive-OR circuit), the input signal is input to the two input terminals with the delay difference, and an output signal from the exclusive-OR circuit is integrated; and a comparison unit that compares a signal obtained by the integrating unit with a threshold to output discrimination result.

A fifth aspect of invention, in the bit-rate discrimination circuit according to the third or fourth aspect of the invention, is characterized in that an integration time constant corresponding to a preamble signal receiving time of a signal having a bit-rate to be discriminated is set to the integrating unit A bit-rate discrimination apparatus according to a sixth aspect of the invention is characterized in that the plurality of bit-rate discrimination circuits according to the third, fourth or fifth aspect of the invention are connected to a common input terminal, and the delay difference possessed by each bit-rate discrimination circuit and an integration time constant of the integrating unit are varied to be able to discriminate a plurality of rates.

A bit-rate discrimination apparatus according to a seventh aspect of the invention including a storage circuit in which the discrimination results of the bit-rate discrimination circuits according to the third, fourth, fifth or sixth aspect of the invention are stored, is characterized in that the storage circuit retains the previous discrimination results until the discrimination results are changed.

An eighth aspect of the invention, in the bit-rate discrimination apparatus according to the seventh aspect of the invention quoting the sixth aspect, is characterized in that priority is placed on the discrimination by the discrimination circuit that handles the highest-bit-rate signal in at least two bit-rate discrimination circuits in the plurality of bit-rate discrimination circuits used, when at least the two bit-rate discrimination circuits simultaneously discriminate that the bit-rate is handled thereby.

A ninth aspect of the invention, in the bit-rate discrimination apparatus according to the seventh aspect of the invention, is characterized in that a bit-rate discrimination circuit according to the third aspect of the invention is used as a bit-rate discrimination circuit for the low bit-rate signal, a bit-rate discrimination circuit according to the fourth aspect of the invention is used as a bit-rate discrimination circuit for the high bit-rate signal, each of the bit-rate discrimination circuits is connected to a common input terminal, and a pulse compression unit that compresses a pulse width of the discrimination output signal of the bit-rate discrimination circuit according to the third aspect of the invention to a leading edge is provided.

To achieve the second object, according to a tenth aspect of the invention, the bit-rate discrimination is made in each input port, and the results of the bit-rate discriminations are comprehensively determined to prevent the false discrimination.

Specifically, a bit-rate discrimination apparatus according to the invention includes a control unit that outputs a control signal, the control signal controlling a gate circuit such that a low-bit-rate signal in an input signal is passed through a first path and a high-bit-rate signal faster than the low-bit-rate signal in the input signal is passed through a second path, the input signal being input to the first path and the second path, the gate circuit that passes or cuts the signal being connected to each of the first path and the second path, wherein the control unit includes: a first input port that obtains the input signal in front of the gate circuit of the first path; and a second input port that obtains the input signal in front of the gate circuit of the second path, and the bit-rate of the input signal from each of the first input port and the second input port is determined based on a preamble pattern included in the input signal, thereby preventing a control malfunction of the gate circuit.

Because the bit-rate is discriminated with respect to each of the input signal from both the input ports, the invention can provide the bit-rate discrimination apparatus that can discriminate the bit-rate of the input signal even if waveform degradation or light-receiving sensitivity degradation is generated by a band limitation of an electronic device and the like.

The control unit in the bit-rate discrimination apparatus according to the invention may include: a low-bit-rate discrimination circuit that is connected to the first input port to discriminate whether the bit-rate of the input signal is identical to the set low bit-rate; a high-bit-rate discrimination circuit that is connected to the second input port to discriminate whether the bit-rate of the input signal is identical to the set high bit-rate; and a signal output circuit that includes a first control port connected to the gate circuit of the first path and a second control port connected to the gate circuit of the second path, and outputs the control signal from each of the first control port and the second control port based on discrimination result of each of the high-bit-rate discrimination circuit and the low-bit-rate discrimination circuit.

The bit-rate discrimination apparatus of the invention discriminates whether the bit-rate is the low bit-rate using the input signal from the low-bit-rate-side first path and discriminates whether the bit-rate is the high bit-rate using the input signal from the high-bit-rate-side second path. Therefore, the bit-rate discrimination apparatus of the invention can discriminate the bit-rate with respect to not only the high-bit-rate signal that is not the integral multiple of the low bit-rate, but also the low-bit-rate signal that is not the integral fraction of the high bit-rate.

Each of the low-bit-rate discrimination circuit and the high-bit-rate discrimination circuit of the bit-rate discrimination apparatus according to the invention, which branches the input signal into two signals, includes: delay circuits that generate a delay difference corresponding to an odd-numbered multiple of a half period of the preamble pattern of the input signal between the two branched signals; an exclusive-OR circuit to which the two signals having the delay difference are input from the delay circuits, and which produces a consecutive identical signal when the codes of the two signals are different from each other; an integrator that integrates the consecutive identical signal from the exclusive-OR circuit; and a comparator that makes discrimination with a predetermined threshold and the consecutive identical signal integral value integrated by the integrator. The low-bit-rate discrimination circuit outputs a pulse signal having a finite width within the preamble period pattern when the input signal has the low bit-rate, and the high-bit-rate discrimination circuit outputs a pulse signal having a finite width within the preamble period pattern when the input signal has the high bit-rate. The signal output circuit can include a determination circuit to which the pulse signal is input as a control determining signal from each of the low-bit-rate discrimination circuit and the high-bit-rate discrimination circuit, and which produces the control signal and maintains a state of the control signal until the bit-rate of the input signal is changed.

In addition, a bit-rate discrimination method of the bit-rate discrimination apparatus includes: inputting the input signal obtained in front of the gate circuit of the first path to a low-bit-rate discrimination circuit; inputting the input signal obtained in front of the gate circuit of the second path to a high-bit-rate discrimination circuit; branching the input signal into two signals in each of the low-bit-rate discrimination circuit and the high-bit-rate discrimination circuit; generating a delay difference corresponding to an odd-numbered multiple of a half period of a preamble pattern of the input signal between the two branched signals; generating a consecutive identical signal when the codes of the two signals having the delay difference are different from each other; discriminating with a value obtained by integrating the consecutive identical signal and a predetermined threshold; the low-bit-rate discrimination circuit outputting a pulse signal having a finite width within the preamble period pattern when the input signal is low bit-rate; the high-bit-rate discrimination circuit outputting a pulse signal having a finite width within the preamble period pattern when the input signal has the high bit-rate; and outputting a control signal that controls the gate circuit based on the pulse signal from each of the low-bit-rate discrimination circuit and the high-bit-rate discrimination circuit.

The bit-rate discrimination apparatus according to the invention can discriminate a bit-rate of the input signal whose preamble pattern has a period pattern, in which polarity is inverted at a half of a period and an inverted code of the first-half pattern becomes the second-half pattern, at both a low bit-rate and a high bit-rate faster than the low bit-rate.

The high-bit-rate discrimination circuit in the bit-rate discrimination apparatus according to the invention, which branches the input signal into two signals, includes: delay circuits generate a delay difference corresponding to an odd-numbered multiple of a half period of the preamble pattern of the input signal between the two branched signals; an exclusive-OR circuit to which the two signals having the delay difference are input from the delay circuits, and which produces a consecutive identical signal when the codes of the two signals are different from each other; an integrator that integrates the consecutive identical signal from the exclusive-OR circuit; and a comparator that makes discrimination using a predetermined threshold and the consecutive identical signal integral value integrated by the integrator, and the high-bit-rate discrimination circuit outputs a pulse signal having a finite width within the preamble period pattern when the input signal has the high bit-rate. The low-bit-rate discrimination circuit that branches the input signal into two signals includes: delay circuits that generate a delay difference corresponding to an integral multiple of a period of the preamble pattern of the input signal between the two branched signals; an exclusive-NOR circuit to which the two signals having the delay difference are input from the delay circuits, and which produces a consecutive identical signal when the codes of the two signals are identical to each other; an integrator that integrates the consecutive identical signal from the exclusive-NOR circuit; and a comparator that makes discrimination with a predetermined threshold and the consecutive identical signal integral value integrated by the integrator, and the low-bit-rate discrimination circuit outputs a pulse signal when the input signal is in a non-signal state. The signal output circuit can include: an AND circuit to which the pulse signal from the low-bit-rate discrimination circuit and an inverting pulse signal of the pulse signal from the high-bit-rate discrimination circuit are input; and a determination circuit to which the output result of the AND circuit and the pulse signal from the high-bit-rate discrimination circuit are input as a control determining signal, and which produces the control signal and maintains a state of the control signal until the bit-rate of the input signal is changed.

In addition, in a bit-rate discrimination method in the bit-rate discrimination apparatus, the input signal is obtained in front of the gate circuit of the first path and input to a low-bit-rate discrimination circuit; the input signal is obtained in front of the gate circuit of the second path and input to a high-bit-rate discrimination circuit; the input signal is branched into two signals by the high-bit-rate discrimination circuit, a delay difference corresponding to an odd-numbered multiple of a half period of a preamble pattern of the input signal is generated between the two branched signals, a consecutive identical signal is generated to make discrimination with a predetermined threshold and a value obtained by integrating the consecutive identical signal when codes of the two signals having the delay difference are different from each other, and the high-bit-rate discrimination circuit outputs a pulse signal having a finite width within the preamble period pattern when the input signal has the high bit-rate; the input signal is branched into two signals by the low-bit-rate discrimination circuit, a delay difference corresponding to an integral multiple of a period of the preamble pattern of the input signal is generated between the two branched signals, a consecutive identical signal is generated to make discrimination with a predetermined threshold and a value obtained by integrating the consecutive identical signal when codes of the two signals having the delay difference are identical to each other, and the low-bit-rate discrimination circuit outputs a pulse signal when the input signal is in a non-signal state; and an inverting pulse signal of the pulse signal from the high-bit-rate discrimination circuit and the pulse signal from the low-bit-rate discrimination circuit are input to an AND circuit, and a control signal that controls the gate circuit is output based on the output result from the AND circuit and the pulse signal from the high-bit-rate discrimination circuit.

A bit-rate discrimination apparatus according to the invention can discriminate a bit-rate of the input signal whose preamble pattern has integral repetition patterns having given periods at a low bit-rate and a period pattern, in which polarity is inverted at a half of a period and an inverted code of the first-half pattern becomes the second-half pattern, at a high bit-rate faster than the low bit-rate.

The control unit in the bit-rate discrimination apparatus according to the invention further includes a signal-discontinuation detecting circuit that outputs a pulse signal having a finite width when at least one of the input signals input to the first input port and the second input port is smaller than a predetermined amplitude. The high-bit-rate discrimination circuit that branches the input signal into two signals includes: delay circuits that generate a delay difference corresponding to an integral multiple of a period of the preamble pattern of the input signal between the two branched signals; an exclusive-NOR circuit to which the two signals having the delay difference are input from the delay circuits, and which produces a consecutive identical signal when the codes of the two signals are identical to each other; an integrator that integrates the consecutive identical signal from the exclusive-NOR circuit; and a comparator that makes discrimination using a predetermined threshold and the consecutive identical signal integral value integrated by the integrator, and the high-bit-rate discrimination circuit outputs a pulse signal when the input signal is in a non-signal state. The low-bit-rate discrimination circuit that branches the input signal into two signals includes: delay circuits that generate a delay difference corresponding to an odd-numbered multiple of a half period of the preamble pattern of the input signal between the two branched signals; an exclusive-OR circuit to which the two signals having the delay difference are input from the delay circuit, and which produces a consecutive identical signal when the codes of the two signals are different to each other; an integrator that integrates the consecutive identical signal from the exclusive-OR circuit; and a comparator that makes discrimination with a predetermined threshold and the consecutive identical signal integral value integrated by the integrator. The low-bit-rate discrimination circuit outputs a pulse signal having a finite width within the preamble period pattern when the input signal is high-bit-rate as a result of the discrimination. The signal output circuit includes: an AND circuit to which an inverting pulse signal of the pulse signal from the signal-discontinuation detecting circuit and a pulse signal from the high-bit-rate discrimination circuit are input; and a determination circuit to which the output result of the AND circuit and the pulse signal from the low-bit-rate discrimination circuit are input as a control determining signal, and which produces the control signal and maintains a state of the control Signal until the bit-rate of the input signal is changed.

In addition, in a bit-rate discrimination method in the bit-rate discrimination apparatus, the input signal is obtained in front of the gate circuit of the first path and input to a low-bit-rate discrimination circuit; the input signal is obtained in front of the gate circuit of the second path and input to a high-bit-rate discrimination circuit; the input signal is branched into two signals by the high-bit-rate discrimination circuit, a delay difference corresponding to an integral multiple of a period of a preamble pattern of the input signal is generated between the two branched signals, a consecutive identical signal is generated to make discrimination with a predetermined threshold and a value obtained by integrating the consecutive identical signal when codes of the two signals having the delay difference are identical to each other, and the high-bit-rate discrimination circuit outputs a pulse signal when the input signal is in a non-signal state; the input signal is branched into two signals by the low-bit-rate discrimination circuit, a delay difference corresponding to an odd-numbered multiple of a half period of the preamble pattern of the input signal is generated between the two branched signals, a consecutive identical signal is generated to make discrimination with a predetermined threshold and a value obtained by integrating the consecutive identical signal when codes of the two signals having the delay difference are different from each other, and the low-bit-rate discrimination circuit outputs a pulse signal having a finite width within the preamble period pattern when the input signal has the low bit-rate; and an inverting pulse signal of the pulse signal having the finite width and the pulse signal from the high-bit-rate discrimination circuit are input to an AND circuit when at least one of the input signals input to the first input port and the second input port is smaller than a predetermined amplitude, and a control signal that controls the gate circuit is output based on the output result from the AND circuit and the pulse signal from the low-bit-rate discrimination circuit.

A bit-rate discrimination apparatus according to the invention can discriminate a bit-rate of the input signal whose preamble pattern has a period pattern, in which polarity is inverted at a half of a period and an inverted code of the first-half pattern becomes the second-half pattern, at a low bit-rate and integral repetition period patterns at a high bit-rate faster than the low bit-rate.

The control unit in the bit-rate discrimination apparatus according to the invention further includes a signal-discontinuation detecting circuit that outputs a pulse signal having a finite width when at least one of the input signals input to the first input port and the second input port is smaller than a predetermined amplitude. Each of the low-bit-rate discrimination circuit and the high-bit-rate discrimination circuit, which branches the input signal into two signals, includes: delay circuits that generate a delay difference corresponding to an integral multiple of a period of the preamble pattern of the input signal between the two branched signals; an exclusive-NOR circuit to which the two signals having the delay difference are input from the delay circuits, and which produces a consecutive identical signal when the codes of the two signals are identical to each other; an integrator that integrates the consecutive identical signal from the exclusive-NOR circuit; and a comparator that makes discrimination with a predetermined threshold and the consecutive identical signal integral value integrated by the integrator, each of the low-bit-rate discrimination circuit and the high-bit-rate discrimination circuit outputs a pulse signal when the input signal is in a non-signal state, the signal output circuit includes: a first AND circuit to which the pulse signal from the high-bit-rate discrimination circuit and an inverting pulse signal of the pulse signal from the signal-discontinuation detecting circuit are input; a second AND circuit to which the output result from the first AND circuit and the pulse signal from the low-bit-rate discrimination circuit are input; and a determination circuit to which the output result of the first AND circuit and the output result from the second AND circuit are input as a control determining signal, and which produces the control signal and maintains a state of the control signal until the bit-rate of the input signal is changed.

In addition, in a bit-rate discrimination method in the bit-rate discrimination apparatus according to the invention, the input signal is obtained in front of the gate circuit of the first path and input to a low-bit-rate discrimination circuit; the input signal is obtained in front of the gate circuit of the second path and input to a high-bit-rate discrimination circuit; the input signal is branched into two signals by each of the low-bit-rate discrimination circuit and the high-bit-rate discrimination circuit, a delay difference corresponding to an integral multiple of a period of a preamble pattern of the input signal is generated between the two branched signals, a consecutive identical signal is generated to make discrimination with a predetermined threshold and a value obtained by integrating the consecutive identical signal when codes of the two signals having the delay difference are identical to each other, and each of the low-bit-rate discrimination circuit and the high-bit-rate discrimination circuit outputs a pulse signal when the input signal is in a non-signal state; and an inverting pulse signal of a pulse signal having a finite width and the pulse signal from the high-bit-rate discrimination circuit are input to a first AND circuit when at least one of the input signals of the first path and the second path is smaller than a predetermined amplitude, the output result from the first AND circuit and the pulse signal from the low-bit-rate discrimination circuit are input to a second AND circuit, and a control signal that controls the gate circuit is output based on the output result from the first AND circuit and the output result from the second AND circuit.

The bit-rate discrimination apparatus according to the invention can discriminate a bit-rate of the input signal whose preamble pattern has integral repetition patterns having certain periods at both a low bit-rate and a high bit-rate faster than the low bit-rate.

The control unit in the bit-rate discrimination apparatus according to the invention further includes: a second input port low-bit-rate discrimination circuit that discriminates whether the bit-rate of the input signal is identical to the set low bit-rate; a signal-discontinuation detecting circuit that outputs a pulse signal having a finite width when at least one of the input signals input to the first input port and the second input port is smaller than a predetermined amplitude; and a select switch that selects the discrimination result of the low-bit-rate discrimination circuit or the discrimination result from the second input port low-bit-rate discrimination circuit using the pulse signal from the signal-discontinuation detecting circuit, the high-bit-rate discrimination circuit and the second input port low-bit-rate discrimination circuit are parallel-connected to the second input port, and the signal output circuit includes a determination circuit to which the discrimination result selected by the select switch and the discrimination result from the high-bit-rate discrimination circuit are input as a control determining signal, and which produces the control signal and maintains a state of the control signal until the bit-rate of the input signal is changed.

The bit-rate discrimination apparatus according to the invention can prevent the malfunction even if the pulse signal from the low-bit-rate discrimination circuit is output out of the preamble pattern time of the input signal.

A bit-rate discrimination apparatus according to the invention includes a control unit that outputs a control signal, the control signal controlling a gate circuit such that a low-bit-rate signal in an input signal is passed through a first path and a high-bit-rate signal faster than the low-bit-rate signal in the input signal is passed through second path, the input signal being input to the first path and the second path, the gate circuit that passes or cuts the signal being connected to each of the first path and the second path. The control unit includes: a second input port that obtains the input signal in front of the gate circuit of the second path; a low-bit-rate discrimination circuit that is connected to the second input port to discriminate whether the bit-rate of the input signal is identical to the set low bit-rate; a high-bit-rate discrimination circuit that is connected to the second input port in parallel with the low-bit-rate discrimination circuit, and discriminates whether the bit-rate of the input signal is identical to the set high bit-rate; a signal-discontinuation detecting circuit that outputs a pulse signal having a finite width when at least one of the input signals input to a first input port and the second input port is smaller than a predetermined amplitude, the first input port obtaining the input signal in front of the gate circuit of the first path; and a signal output circuit that includes a first control port connected to the gate circuit of the first path and a second control port connected to the gate circuit of the second path, and outputs the control signal from each of the first control port and the second control port based on discrimination result of each of the high-bit-rate discrimination circuit and the low-bit-rate discrimination circuit. Each of the low-bit-rate discrimination circuit and the high-bit-rate discrimination circuit, which branches the input signal into two signals, includes: delay circuits that generate a predetermined delay difference based on a preamble pattern of the input signal between the two branched signals; an exclusive-OR circuit to which the two signals having the delay difference are input from the delay circuits, and which produces a consecutive identical signal based on the preamble pattern of the input signal when the codes of the two signals are different from each other, or an exclusive-NOR circuit to which the two signals having the delay difference are input from the delay circuits, and which produces a consecutive identical signal when the codes of the two signals are identical to each other; an integrator that integrates the consecutive identical signal from the exclusive-OR circuit or the exclusive-NOR circuit; and a comparator that makes discrimination with a predetermined threshold and the consecutive identical signal integral value integrated by the integrator, the low-bit-rate discrimination circuit outputs a pulse signal having a finite width within the preamble period pattern when the input signal has the low bit-rate, and the high-bit-rate discrimination circuit outputs a pulse signal having a finite width within the preamble period pattern when the input signal has the high bit-rate. The signal output circuit includes: an OR circuit to which the pulse signal from the signal-discontinuation detecting circuit and the pulse signal from the low-bit-rate discrimination circuit are input; and a determination circuit to which the output result of the OR circuit and the pulse signal from the high-bit-rate discrimination circuit are input as a control determining signal, and which produces the control signal and maintains a state of the control signal until the bit-rate of the input signal is changed.

In the invention, although only the input signal of the second path is obtained, the output from the low-bit-rate discrimination circuit and the output from the signal-discontinuation detecting circuit are input to the OR circuit, and the bit-rate of the input signal is determined using the output of the OR circuit and the output of the high-bit-rate discrimination circuit. Therefore, the invention can provide the bit-rate discrimination apparatus that can discriminate the bit-rate of the input signal even if the waveform degradation or the light-receiving sensitivity degradation is generated by the band limitation of the electronic device.

The determination circuit in the bit-rate discrimination apparatus according to the invention is a reset-set flipflop circuit. In the reset-set flip-flop circuit, the control determining signal is input to each of a set terminal and a reset terminal, and an output terminal and the first control port are connected and an inverting output terminal and the second control port are connected, or the inverting output terminal and the first control port are connected and the output terminal and the second control port are connected. The state of the gate circuit can be maintained until the bit-rate of the input signal is changed.

Specifically, a signal discriminator according to the invention includes: a first path in which a gate circuit that passes or cuts a signal and a clock data reproducing circuit that deals with a low bit-rate are series-connected or a clock data reproducing circuit, in which the gate circuit is incorporated to deal with the low bit-rate, is connected; a second path in which a gate circuit that passes or cuts a signal and a clock data reproducing circuit that deals with a high bit-rate faster than the low bit-rate are series-connected or a clock data reproducing circuit, in which the gate circuit is incorporated to deal with the high bit-rate, is connected; and the bit-rate discrimination apparatus that controls the gate circuit such that a low-bit-rate signal is passed through the first path while a high-bit-rate signal is passed through the second path in a time-division-multiplexed identical input signal input to both the first path and the second path.

Because the bit-rate is discriminated with respect to each of the input signals from both the input ports, the invention can provide the signal discriminator that can make the discrimination in each bit-rate of the input signal even if the waveform degradation or the light-receiving sensitivity degradation is generated by the band limitation of the electronic device.

Specifically, an optical signal receiving discriminator according to the invention includes: the signal discriminator; a photo-detector that receives an input optical signal in which a high-bit-rate optical signal and low-bit-rate optical signal are time-division-multiplexed, the photo-detector performing photoelectric conversion of the input optical signal into a high-bit-rate current signal and a low-bit-rate current signal; a trans-impedance amplifier (TIA) that converts the high-bit-rate current signal and the low-bit-rate current signal into a high-bit-rate voltage signal and a low-bit-rate voltage signal; a low bit-rate limiting amplifier that amplifies a band corresponding to the low bit-rate to couple the amplified band to the first path of the signal discriminator with respect to one of two branched outputs of the trans-impedance amplifier (TIA); and a high bit-rate limiting amplifier (LA) that amplifies a band corresponding to the high bit-rate faster than the low bit-rate to couple the amplified band to the second path of the signal discriminator with respect to the other of two branched outputs of the trans-impedance amplifier (TIA).

Because the bit-rate is discriminated with respect to each of the input signals from both the input ports, the invention can provide the optical signal receiving discriminator that can make the discrimination in each bit-rate of the input signal even if the waveform degradation or the light-receiving sensitivity degradation is generated by the band limitation of the electronic devices.

An optical signal receiving discriminator according to the invention includes: a photo-detector that receives an input optical signal in which a high-bit-rate optical signal and a low-bit-rate optical signal are time-division-multiplexed; a trans-impedance amplifier (TIA) that converts the high-bit-rate current signal and low-bit-rate current signal, to which photoelectric conversion is already performed, into a high-bit-rate voltage signal and a low-bit-rate voltage signal; a first path, in which a gate circuit that passes or cuts a signal is incorporated, a low bit-rate limiting amplifier that amplifies a band corresponding to the low bit-rate and a clock data reproducing circuit that deals with the low bit-rate are series-connected, and one of two branched outputs of the trans-impedance amplifier (TIA) is coupled as an input signal from the low bit-rate limiting amplifier side; a second path, in which a gate circuit that passes or cuts the signal is incorporated, a high bit-rate limiting amplifier (LA) that amplifies a band corresponding to the high bit-rate faster than the low bit-rate and a clock data reproducing circuit that deals with the high bit-rate are series-connected, and the other of two branched outputs of the trans-impedance amplifier (TIA) is coupled as an input signal from the high bit-rate limiting amplifier (LA) side; and the bit-rate discrimination apparatus that controls the gate circuit such that a low-bit-rate signal is passed through the first path while a high-bit-rate signal is passed through the second path in the input signal.

Because the bit-rate is discriminated with respect to each of the input signals from both the input ports, the invention can provide the optical signal receiving discriminator that can make the discrimination in each bit-rate of the input signal even if the waveform degradation or the light-receiving sensitivity degradation is generated by the band limitation of the electronic device.

The aspects of the invention can be combined to a maximum extent.

EFFECT OF THE INVENTION

According to the first to ninth aspects of the invention, unlike the conventional circuit that makes the discrimination by integrating the logical code that includes "0" and "1"

produced from the random code to some extent, the bit-rate is discriminated by utilizing the periodicity of the known preamble signal added to the head portion of the signal when the bit-rate of the signal is changed. More specifically, the repetition of the identical pattern is converted into a very long consecutive "1" signal (having a length of several tens of bits to several thousand bits). Although the consecutive identical signal is longer than the same-code continuation length included in the signal, the consecutive identical signal is shorter than the time constant necessary for the conventional circuit by about one to three orders of magnitude. Therefore, the integration time can be shortened to the same degree as the generated consecutive identical signal length, and the bit-rate can be discriminated at high speed within a preamble signal receiving time.

The tenth aspect of the invention can provide the bit-rate discrimination apparatus and the bit-rate discrimination method, which can automatically discriminate the bit-rate of the input signal, and the signal discriminator and the optical signal receiving discriminator, which include the bit-rate discrimination apparatus. The tenth aspect of the invention can realize the optical communication receiving apparatus that can correct the malfunction of the bit-rate discrimination circuit, instantaneously discriminate the bit-rate of the input signal even for the plural bit-rates that do not have the relationship of the integral multiple of integral fraction, and individually output the signals having the desired bit-rates from the output ports.

BRIEF DESCRIPTION OF THE DRAWINGS

FIG. 1 is a view illustrating a configuration of a bit-rate discrimination circuit according to a first example of the invention;

FIG. 2A is a timing chart illustrating a response operation for a high bit-rate signal in the first example of the invention;

FIG. 2B is a timing chart illustrating a response operation for a low bit-rate signal in the first example of the invention;

FIG. 4A is a timing chart illustrating a response operation to a low bit-rate signal in the second example of the invention;

FIG. 4B is a timing chart illustrating a response operation for a high bit-rate signal in the second example of the invention;

FIG. 13A is a timing chart illustrating a response operation for a high bit-rate signal in the fifth example of the invention;

FIG. 13B is a timing chart illustrating a response operation for a low bit-rate signal in the fifth example of the invention;

FIG. 15A is a timing chart illustrating a response operation for a high bit-rate signal in the sixth example of the invention;

FIG. 15B is a timing chart illustrating a response operation for a low bit-rate signal in the sixth example of the invention;

DESCRIPTION OF EMBODIMENTS

First Embodiment

Figure 3:
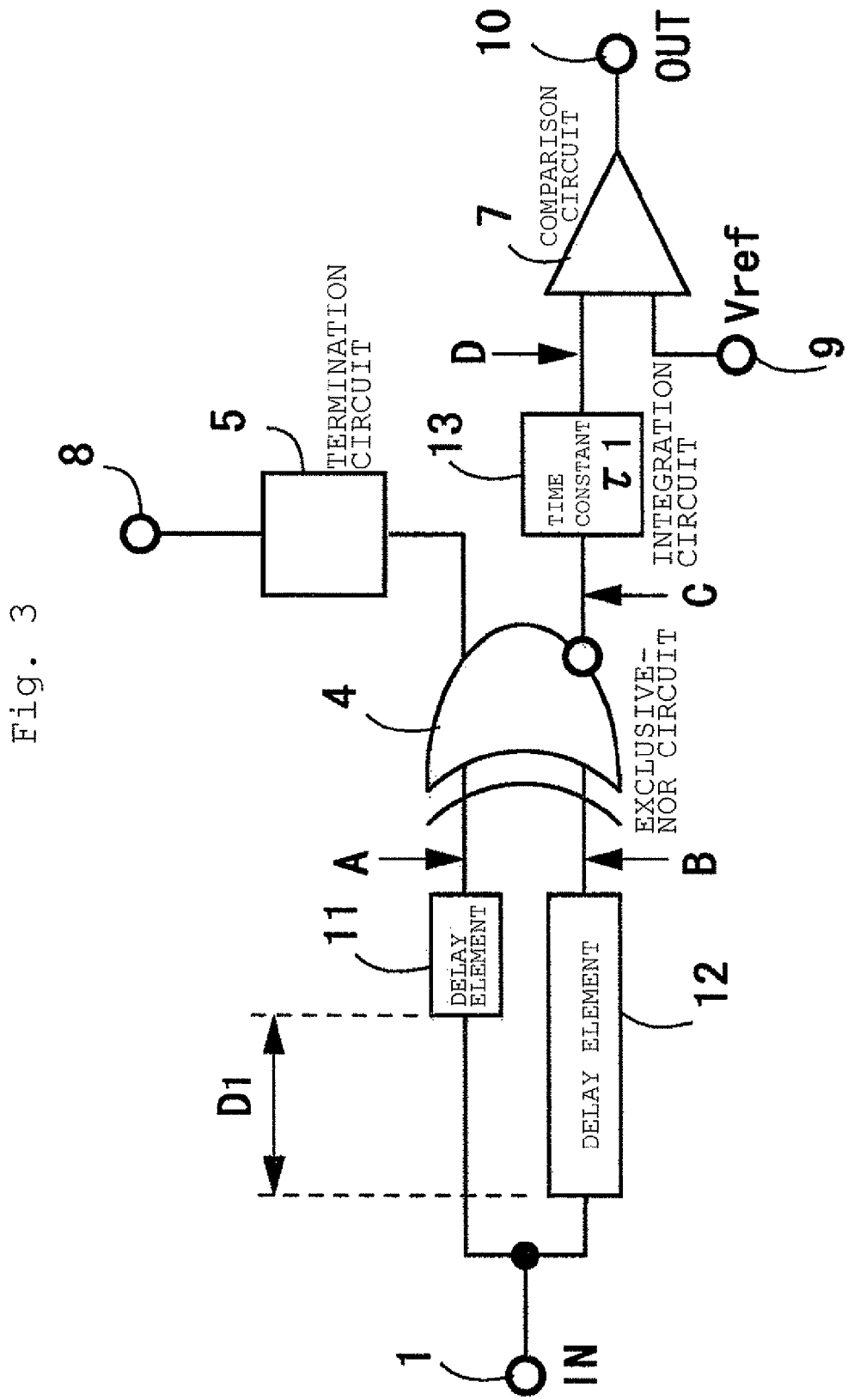
FIG. 3 is a view illustrating a configuration of a bit-rate discrimination circuit according to a second example of the invention.

A first embodiment of the invention will be described with reference to the accompanying drawings. The first embodiment described below is examples of the invention, and the invention is not limited to the examples. In the first embodiment and the drawings related to the first embodiment, the same component is denoted by the same numeral.

First Example

FIG. 1 illustrates a configuration of a bit-rate discrimination circuit according to a first example of the invention. Referring to FIG. 1, the numeral 1 denotes an input terminal, the numerals 2 and 3 denote delay circuits, the numeral 4 denotes an exclusive-NOR circuit, the numeral 5 denotes a termination circuit, the numeral 6 denotes an integrator (time constant of $\tau_0$), the numeral 7 denotes a comparator, the numeral 8 denotes a power supply or a ground, the numeral 9 denotes a reference voltage input terminal, and the numeral 10 denotes an output terminal (alphabets in FIG. 1 are described in the description of FIG. 2). For the sake of convenience, in the first example, it is assumed that there are two kinds of bit-rates, that is, a high rate and a low rate, in the transmitted signal.

In the delay circuits 2 and 3 connected to nodes A and 9 of the exclusive-NOR circuit 4, a delay time difference between the delay circuits 2 and 3 is adjusted to a length of an integral multiple of a repetition period of the same pattern in the preamble signal of the high bit-rate signal input to the bit-rate discrimination circuit. In FIG. 1, for the sake of convenience, both the delay circuits 2 and 3 are connected. However, only one of the delay circuits 2 and 3 may be connected when the delay time of the delay circuit is equal to the length of the integral multiple. In the first example, the input-side terminals of the delay circuits 2 and 3 are connected to the input terminal 1. Alternatively, the input-side terminals of the delay circuits 2 and 3 may physically be separated from each other. In inputting not the in-phase input signal but the differential input signal, the similar effect is obtained when the exclusive-NOR circuit is replaced by the exclusive-OR circuit. The integrator 6 can be omitted when the comparator 7 has a response speed that is equal to a time constant ($\tau_0$) of the integrator 6.

FIGS. 2A and 2B are the timing charts illustrating an operation of the first example of the invention. The numerals in FIGS. 2A and 2B denotes a voltage level transition at a node denoted by the same numerals in FIG. 1. FIG. 2A illustrates an operation when a high bit-rate signal is input to the bit-rate discrimination circuit of the first example, and FIG. 2B illustrates an operation when a low bit-rate signal is input thereto. As illustrated in FIG. 2A, the preamble period is set to six bits of "110010", and a delay time difference $D_0$ of six bits (equal to the preamble pattern period) is provided between the delay circuits 2 and 3. The signals at the nodes A and B are input to the exclusive-NOR circuit 4 with the delay time difference $D_0$, and the exclusive-NOR circuit 4 outputs the result as a voltage at a node C. As can be seen from FIG. 2A, although the code "0" is output due to inconsistency in the one period in a transition portion from the non-signal state to the preamble head portion, the preamble portion becomes the same-code continuation of the code "1" (portion indicated by $\tau_0$ in FIG. 2A).

The integrator 6 responds to the same-code continuation having the length of about preamble by designing a time constant of the integrator 6 to be about $\tau_0$, and can output a voltage exceeding a threshold (reference voltage Vref) of the comparator 7 to a node D. When a random signal of a payload portion is input thereafter, because the exclusive-NOR circuit 4 outputs consistency between the signals having a mark ratio of 1/2, the mark ratio of the output signal also probabilistically becomes 1/2, and the integral output at the node D decreases to an average voltage half that of the same-code continuation of the code "1" (strictly, (VH+VL)/2. Where VH is a HI voltage of the logical code "1" and VL is a LOW voltage of the code "0"). As a result, a finite-width pulse signal that has a leading edge in the middle of the preamble is output to the output terminal 10 of the comparator 7.

On the other hand, as illustrated in FIG. 2B, when the low bit-rate signal is input, because the delay time difference between the nodes A and B is not matched with the preamble period (the preamble having the same pattern as the high bit-rate signal and the one-third speed of the high bit-rate signal is illustrated by way of example) of the low bit-rate signal, the consistency output of the preamble pattern does not become the same-code continuation of the code "1" (at this point, the output becomes the signal having the mark ratio of 1/3). Therefore, because the output of the integrator 6 does not exceed the threshold of the comparator 7, the pulse signal is not output to the output terminal 10 of the comparator 7.

As described above, the bit-rate discrimination circuit that outputs the pulse in receiving the preamble pattern of the signal having a specific bit-rate without responding to the low bit-rate signal can be formed using the configuration of the first example. However, when the low bit-rate signal includes the same-code continuation having a length as long as the preamble length of the high bit-rate signal, because the integral value of the consistency output of the same-code continuation portion possibly exceeds the threshold, the configuration of the first example is effectively used only when the preamble length of the high bit-rate signal is sufficiently longer than the same-code continuation length of the low bit-rate signal. In FIG. 2, the length in the non-signal state before the signal input is short to an extent that the length can be negligible, and therefore an initial value at the node D is set to the output voltage ((VH+VL)/2) with respect to the payload portion of the previous signal. However, the effect similar to that of the same-code continuation is obtained when the non-signal state longer than the preamble length of the high bit-rate signal exists between the signals. At this point, however, no problem occurs because the discrimination result is output in the non-signal portion that is not the preamble pattern.

Second Example

FIG. 3 illustrates a configuration of a bit-rate discrimination circuit according to a second example of the invention. In FIG. 3, the component similar to that of FIG. 1 is denoted by the same numeral, the numerals 11 and 12 denote delay circuits, and the numeral 13 denotes an integrator (time constant $\tau_1$). In the second example, it is also assumed that there are two kinds of bit-rates, that is, the high rate and the low rate, in the transmitted signal. The configuration of FIG. 3 differs from that of FIG. 1 only in that the delay time difference between the delay circuits 11 and 12 is adjusted to a length of an integral multiple of the preamble pattern period of the low bit-rate signal. For the sake of convenience, the delay circuits 11 and 12 are connected in FIG. 3. When the delay of one of the delay circuits is equal to the length of the integral multiple, only one of the delay circuits may be provided. In FIG. 3, the input-side terminals of the delay circuits 11 and 12 are connected to the input terminal 1. Alternatively, the input-side terminals may physically be separated from each other. When not the in-phase input signal but the differential input signal is input, the similar effect is obtained by changing the exclusive-NOR circuit 4 to the exclusive-OR circuit. The integrator 13 can be omitted when the comparator 7 has the response speed that is equal to a time constant ($\tau_1$) of the integrator 13.

FIGS. 4A and 4B are the timing charts illustrating an operation of the second example of the invention. The numerals in FIGS. 4A and 4B denote the voltage at a node denoted by the same numerals in FIG. 3. FIG. 4A illustrates an operation when the high bit-rate signal is input to the bit-rate discrimination circuit of the second example, and FIG. 4B illustrates an operation when the low bit-rate signal is input thereto. As illustrated in FIG. 4A, the preamble period is set to six bits of "110010", and a delay time difference $D_1$ of six bits (equal to the preamble pattern period) is provided between the delay circuits 11 and 12. As with the description of FIG. 2A, it is clear that the finite-width pulse signal that has the leading edge in the middle of the preamble is output to the output terminal 10 of the comparator 7.

For the input of the high bit-rate signal, when the preamble period of the low bit-rate signal is not the integral multiple of the preamble period of the high bit-rate signal, because the consistency output of the preamble pattern does not become the same-code continuation similarly to the description of FIG. 2B, the output of the integrator 13 does not exceed the threshold of the comparator 7. However, as illustrated in FIG. 4B, when the preamble period of the low bit-rate signal is the integral multiple (in this case, triple) of the preamble period of the high bit-rate signal, the consistency output becomes the same-code continuation. Assuming that the time constant $\tau_1$ of the integrator 13 is substantially equal to the preamble length of the low bit-rate signal, $\tau_0 < \tau_1$ is obtained because usually the preamble length of the high bit-rate signal is shortened in inverse proportion to the bit-rate. Assuming that the integral value of the consistency output is decreased in the payload portion, when the threshold voltage (reference voltage Vref) is set such that the continuous code having the length of about $\tau_0$ does not exceed the threshold while the same-code continuation having the length of about $\tau_1$ just exceeds the threshold, the adjustment can be made such that the finite-width pulse signal having the leading edge in the middle of the preamble is not output with respect to the input of the high bit-rate signal.

As described above, the bit-rate discrimination circuit that outputs the pulse to the preamble pattern of the specific bit-rate signal without responding to the higher-rate signal can be configured using the configuration of the second example. Similarly to the first example, when the same-code continuation whose length is similar to the preamble length of the low bit-rate signal is included in the high bit-rate signal, because the integral value of the consistency output of the same-code continuation portion possibly exceeds the threshold, the configuration of the second example is effectively utilized only when the preamble length of the low bit-rate signal is sufficiently longer than the same-code continuation length of the high bit-rate signal. In FIG. 4, similarly to FIG. 2, the length in the non-signal state before the signal input is short to an extent that the length can be negligible, and therefore the initial value at the node D is set to the output voltage ((VH+VL)/2) with respect to the payload portion of the previous signal. However, the effect similar to that of the same-code continuation is obtained when the non-signal state longer than the preamble length of the low bit-rate signal exists between the signals. At this point, no problem occurs because the discrimination result is output in the non-signal portion that is not the preamble pattern. However, when the preamble period of the low bit-rate signal is the integral multiple of the preamble period of the high bit-rate signal at the same time, the pulse of the discrimination result is possibly output subsequent to the non-signal so as to overlap the preamble pattern of the high bit-rate signal. The countermeasure against the discrimination malfunction is described from a fourth example.

As is clear from the operations of the first and second examples, the delay time difference of the integral multiple of the preamble period of the specific bit-rate signal is provided in the input portion, and the integrator having the time constant of about preamble length is used, which allows the finite-width pulse signal having the leading edge in receiving the preamble pattern of the specific bit-rate signal to be output without responding to the signal that is faster or slower than the specific bit-rate. In other words, only the discrimination whether the bit-rate is the specific bit-rate can be made. Therefore, in order to specify the bit-rate of the input signal, it is necessary to make the discrimination using the plural bit-rate discrimination circuits of the invention. Because the output pulse becomes off in the payload portion, it is necessary to provide a storage circuit that retains the discrimination result until the discrimination result of the next signal is output. The storage circuit will be described later.

Third Example

Figure 5:
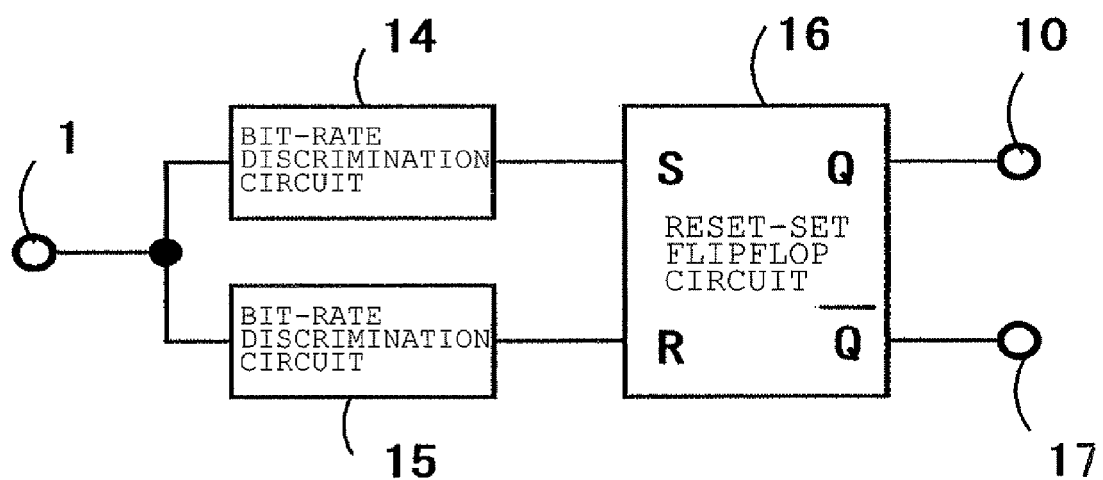
FIG. 5 is a view illustrating a configuration of a bit-rate discrimination apparatus according to a third example of the invention.
Figure 6:
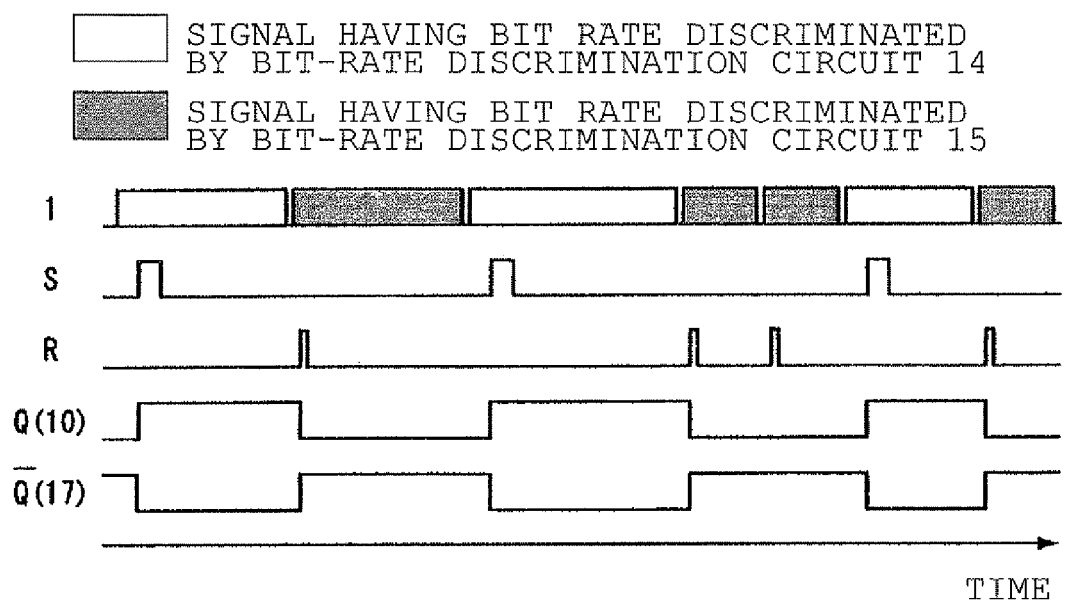
FIG. 6 is a timing chart illustrating an operation of the third example of the invention.

FIG. 5 illustrates a configuration of a bit-rate discrimination apparatus according to a third example of the invention. In FIG. 5, the component similar to that of FIG. 1 is denoted by the same numeral, the numerals 14 and 15 denote the bit-rate discrimination circuit of the first or second example of the invention, the numeral 16 denotes a reset-set flipflop (RS-FF) circuit, and the numeral 17 denotes an inverting output terminal. FIG. 6 is a timing chart illustrating an operation of the third example. The numerals in FIG. 6 denote voltages at nodes denoted by the same numerals in FIG. 5. It is assumed that the bit-rate discrimination circuits 14 and 15 discriminate the signals having different bit-rates, respectively (in FIG. 6, the numeral 14 denotes the bit-rate discrimination circuit for the low bit-rate signal). When each of the bit-rate discrimination circuits 14 and 15 outputs the pulse signal as a discrimination signal in the preamble portion of the signal having each bit-rate, the signals in FIG. 6 are obtained by the output terminal 10 and the inverting output terminal 17 and retained by the RS-FF circuit 16. The discrimination as to signal having which bit-rate is input can be made by the output signal of the RS-FF circuit 16.

Fourth Example

Figure 7:
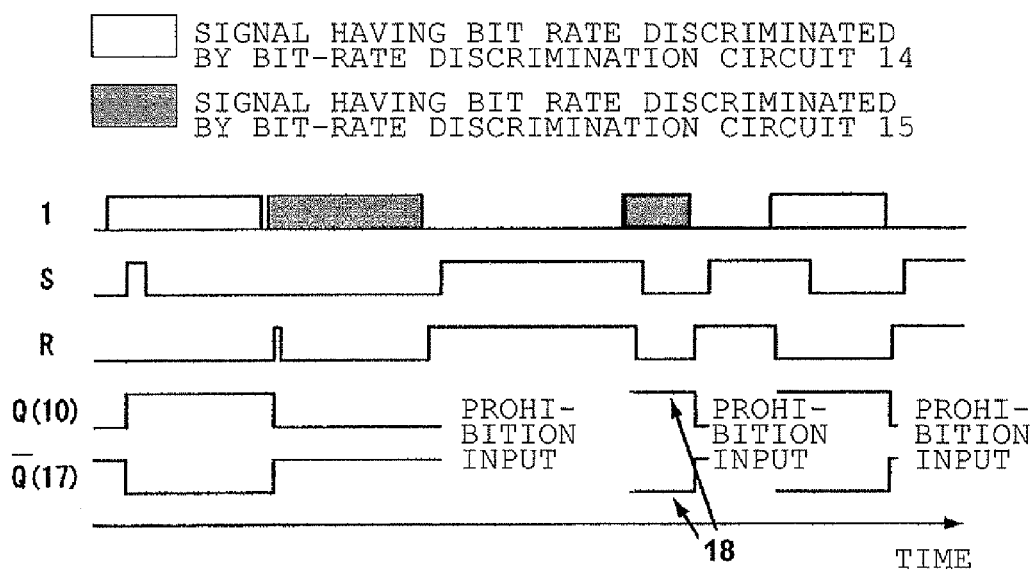
FIG. 7 is a timing chart illustrating a malfunction of the third example of the invention.

FIG. 7 is a timing chart illustrating a malfunction of the third example of the invention. In FIG. 7, the component similar to that of FIG. 6 is denoted by the same numeral, and the numeral 18 denotes a malfunction portion. As described above, when the non-signal state longer than the preamble length of the low bit-rate signal exists between the signals, pulse of the discrimination result is possibly output in the non-signal portion. In such cases, the malfunction possibly occurs because of "prohibition input" in which "1" is simultaneously input to an S terminal and an R terminal of the reset-set flip-flop circuit 16.

The integrator 13 of the bit-rate discrimination circuit 14 for the low bit-rate signal is longer than the integrator 6 of the bit-rate discrimination circuit 15 for the high bit-rate signal in the time constant. Therefore, depending on the setting of the time constant, the tailing edge (of the head portion of the high bit-rate signal) subsequent to the long non-signal state output by the bit-rate discrimination circuit 14 for the low bit-rate signal is delayed with respect to the tailing edge after the preamble of the high bit-rate signal output by the bit-rate discrimination circuit 15 for the high bit-rate signal. Also in such cases, the malfunction occurs because of the "prohibition input" in which "1" is simultaneously input to the S terminal and R terminal of the reset-set flip-flop circuit 16 (the numeral 18 in FIG. 7).

Figure 8:
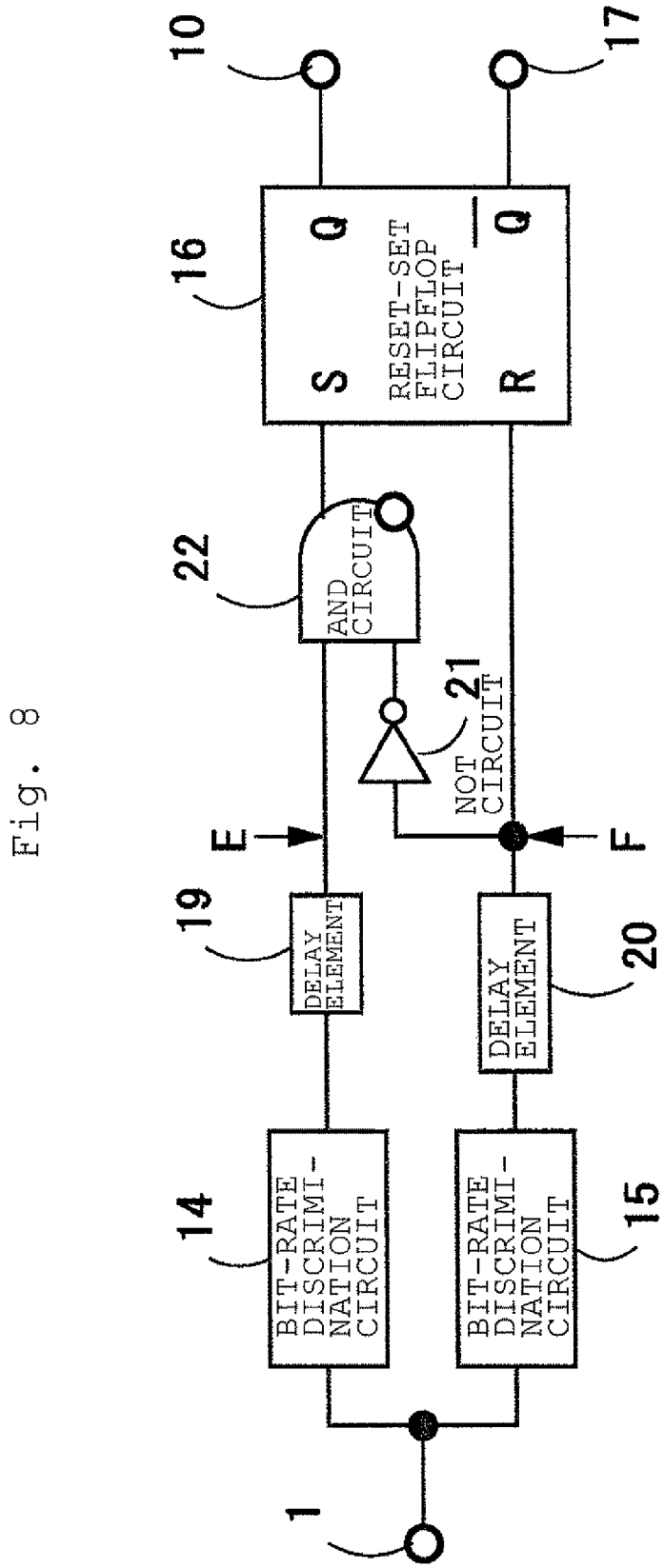
FIG. 8 is a view illustrating a configuration of a bit-rate discrimination apparatus according to a fourth example of the invention.

FIG. 8 illustrates a configuration of the bit-rate discrimination apparatus according to a fourth example of the invention. In FIG. 8, the component similar to that of FIG. 5 is denoted by the same numeral, the numerals 19 and 20 denote delay circuits, the numeral 21 denotes a NOT circuit, and the numeral 22 denotes an AND circuit (alphabets in FIG. 8 are described in the description of FIG. 9). In FIG. 8, the delay circuits 19 and 20 that correct a deviation of the tailing edges caused by the time constant difference of the integrator are added to the output portion of the bit-rate discrimination circuits 14 and 15 such that the malfunction does not occur (tailing edges are aligned with each other). For the sake of convenience, the delay circuits 19 and 20 are connected in FIG. 8. When the tailing edges are aligned with each other by one of the delay circuits, only one of the delay circuits may be provided. When "1" is input to the R terminal, the input on the side of the S terminal is forcibly converted into "0" using the NOT circuit 21 and the AND circuit 22 such that the prohibition input is not input to the reset-set flipflop circuit 16. This is because the "1" is simultaneously input to the S terminal and R terminal when the high bit-rate signal is input.

Figure 9:
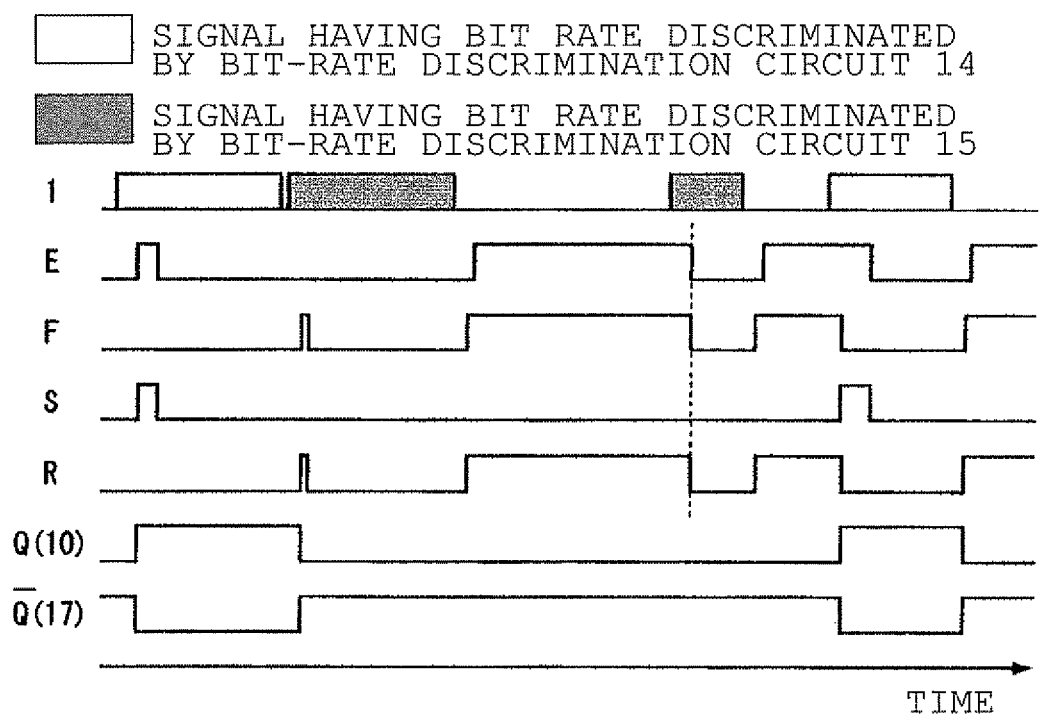
FIG. 9 is a timing chart illustrating an operation of the fourth example of the invention.

FIG. 9 is a timing chart illustrating an operation of the fourth example. The numerals in FIG. 9 denote voltages at nodes denoted by the same numerals in FIG. 8. As can be seen from FIG. 9, the correct discrimination result is obtained because the long non-signal state and the false discrimination immediately after the non-signal state are not output from input on the S terminal side. A relative time difference between the discrimination signal and the input signal, caused by the insertion of the delay circuits 19 and 20, may be corrected using the delay on the signal side.

Figure 10:
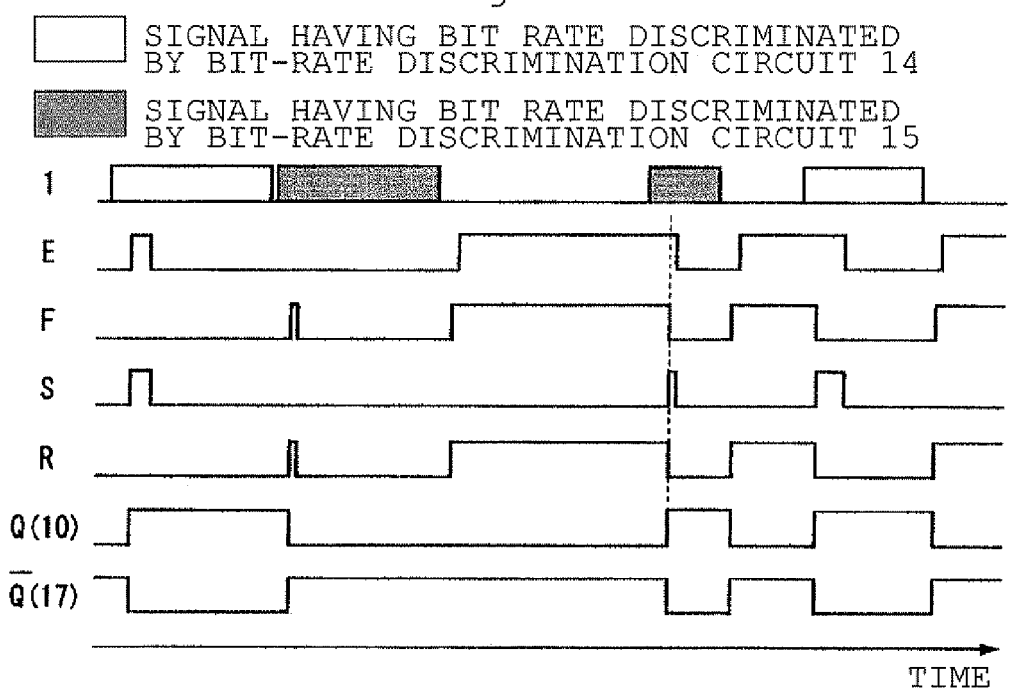
FIG. 10 is a timing chart illustrating a malfunction of the fourth example of the invention.

FIG. 10 is a timing chart illustrating a malfunction of the fourth example of the invention. The numerals in FIG. 10 denote the components similar to those in FIG. 7. When the preamble period of the low bit-rate signal is the integral multiple of the preamble period of the high bit-rate signal while the non-signal state longer than the preamble length of the low bit-rate signal exists, possibly the pulse of the discrimination result is output subsequent to the non-signal so as to overlap the preamble pattern of the high bit-rate signal. In such cases, the tailing edge output by the bit-rate discrimination circuit 14 for the low bit-rate signal exceeds the correction performed by the delay circuits 19 and 20 of the fourth example, thereby causing the false discrimination.

Figure 11:
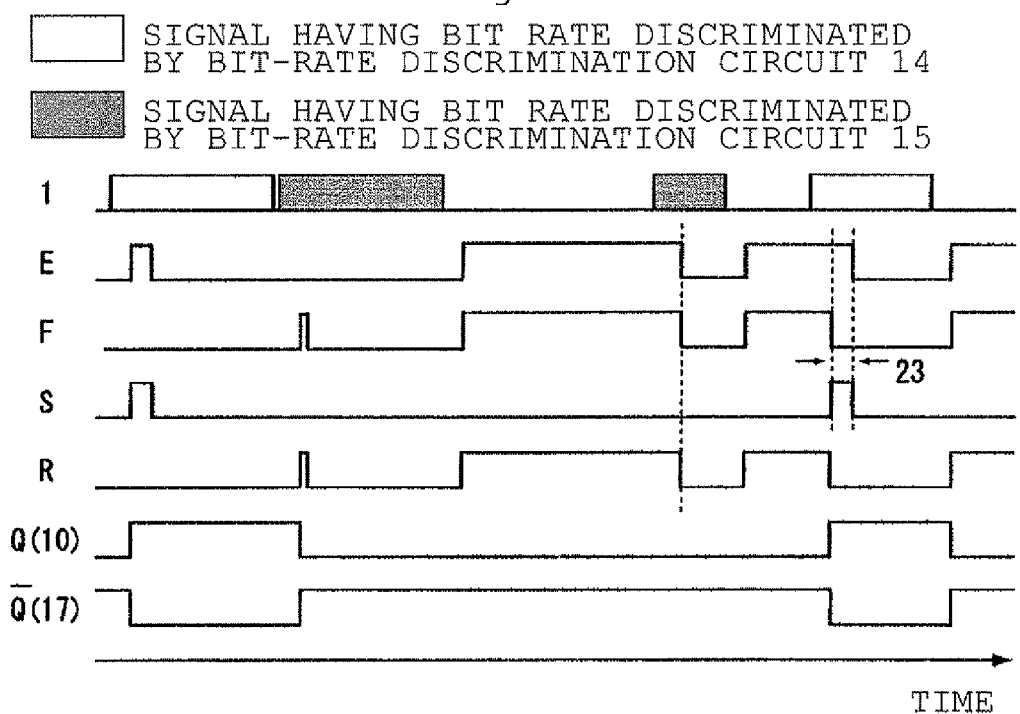
FIG. 11 is a timing chart illustrating an operation of an application example of the fourth example of the invention.

FIG. 11 is a timing chart illustrating the operation of an application example of the fourth example of the invention. The numerals in FIG. 11 denote the components similar to those in FIG. 10, and the numeral 23 denotes a time difference of the tailing edge of the pulse output from the bit-rate discrimination circuit when the low bit-rate signal is input subsequent to the non-signal state longer than the preamble length of the low bit-rate signal. In the application example of FIG. 11, the delay time difference between the delay circuits 19 and 20 is corrected by adding a delay time corresponding to the preamble length of the high bit-rate signal to the value of FIG. 9. Therefore, it is found that, during the input of the low bit-rate signal subsequent to the non-signal state longer than the preamble length of the low bit-rate signal, the malfunction does not occur when the time difference 23 of the tailing edge of the pulse output from the bit-rate discrimination circuit is similar to the time difference enough to operate the AND circuit 22 and the RS-FF circuit 16.

Fifth Example

Figure 12:
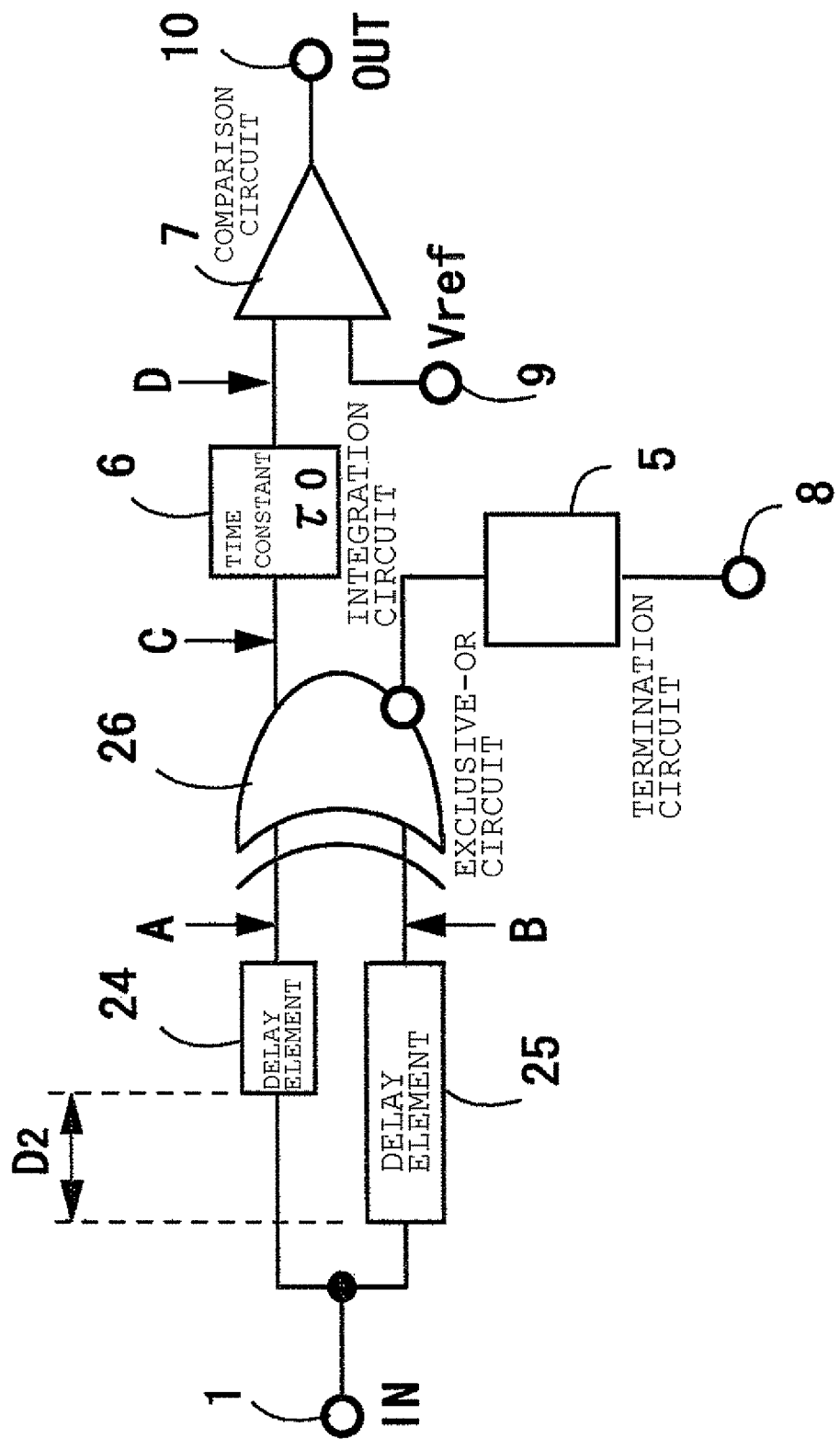
FIG. 12 is a view illustrating a configuration of a bit-rate discrimination circuit according to a fifth example of the invention.

FIG. 12 illustrates a configuration of a bit-rate discrimination circuit according to a fifth example of the invention. In FIG. 12, the component similar to that of FIG. 1 is denoted by the same numeral, the numerals 24 and 25 denote delay circuits, and the numeral 26 denotes an exclusive-OR circuit (exclusive logical addition circuit). Because the exclusive-NOR circuit 4 is used in the first to fourth examples, the exclusive-NOR circuit 4 outputs the same-code continuation of "1" with respect to the same-code continuation and non-signal state which are longer than the preamble, causing the false discrimination. In order to solve the problem, in the bit-rate discrimination circuit of the fifth example, the delay time difference generated by the delay circuits 24 and 25 is adjusted to the length of an odd-numbered multiple of a half of the preamble pattern period of the high bit-rate signal input to the bit-rate discrimination circuit.

The bit-rate discrimination circuit of the fifth example is effectively operated, when polarity of the preamble signal pattern of the high bit-rate signal is inverted at a half of the period while an inverted code of the first-half pattern becomes the second-half pattern. At this point, when the delay difference of the odd-numbered multiple of a half of the preamble period is provided, because the input signal of the exclusive-OR circuit 26 becomes a complimentary signal (differential signal), the same-code continuation of "1" is output. Because the same-code continuation of "0" is output for the input of the same-code continuation such as the non-signal, the false discrimination does not occur unless the same pattern as the preamble is continued for as long as the preamble in the payload portion.

FIGS. 13A and 13B are the timing charts illustrating an operation of the fifth example of the invention. The numerals in FIGS. 13A and 13B are denote the components similar to those of FIG. 2. In FIGS. 13A and 13B, an alternating signal "1010" is used as the simplest preamble pattern. FIG. 13A illustrates an operation to the high bit-rate signal, and FIG. 13B illustrates an operation to the low bit-rate signal. As illustrated in FIG. 13A, because of the two-bit preamble period, the operation when a delay time difference $D_2$ of one bit (equal to one time a half of the preamble pattern period) is provided between the delay circuits 24 and 25 is illustrated. The signals at the nodes A and B are input to the exclusive-OR circuit 26 with the delay time difference $D_2$, and the exclusive-OR circuit 26 outputs the signal as the voltage at the node C. As can be seen from FIG. 13A, the preamble pattern becomes the same-code continuation (in FIG. 13A, the portion indicated by $\tau_0$) of the code "1". When the integrator 6 is designed such that the time constant of the integrator 6 becomes $\tau_0$, the integrator 6 responds to the same-code continuation having the length of about preamble, and can output the voltage that exceeds the threshold of the comparator 7. When the random signal of the payload portion is input, the exclusive-OR circuit 26 outputs the inconsistency between the signals having mark ratios of 1/2, the output signal probabilistically becomes the mark ratio of 1/2, and the integral output is decreased to an average voltage of a half of the same-code continuation of "1". As a result, the finite-width pulse signal having the leading edge in the middle of the preamble is output to the output terminal 10 of the comparator 7.

On the other hand, when the low bit-rate signal is input as illustrated in FIG. 13B, because the delay difference between the signals at the nodes A and B is not matched with the preamble period (in this case, the pattern is identical to that of the high bit-rate signal and the bit-rate is one third that of the high bit-rate signal) of the low bit-rate signal, the exclusive-OR circuit 26 does not output same-code continuation of "1" in the preamble patter (in this case, the output becomes the signal having the mark ratio of 1/3). Therefore, because the output of the integrator 6 does not exceed the threshold of the comparator 7, the pulse signal is not output to the output terminal 10 of the comparator 7.

As described above, when the configuration of the fifth example is utilized, not only can the function equal to that of the first example be realized, but also the false discrimination does not occur even if the same-code continuation is included in the payload or the long non-signal state is included between the signals.

Sixth Example

Figure 14:
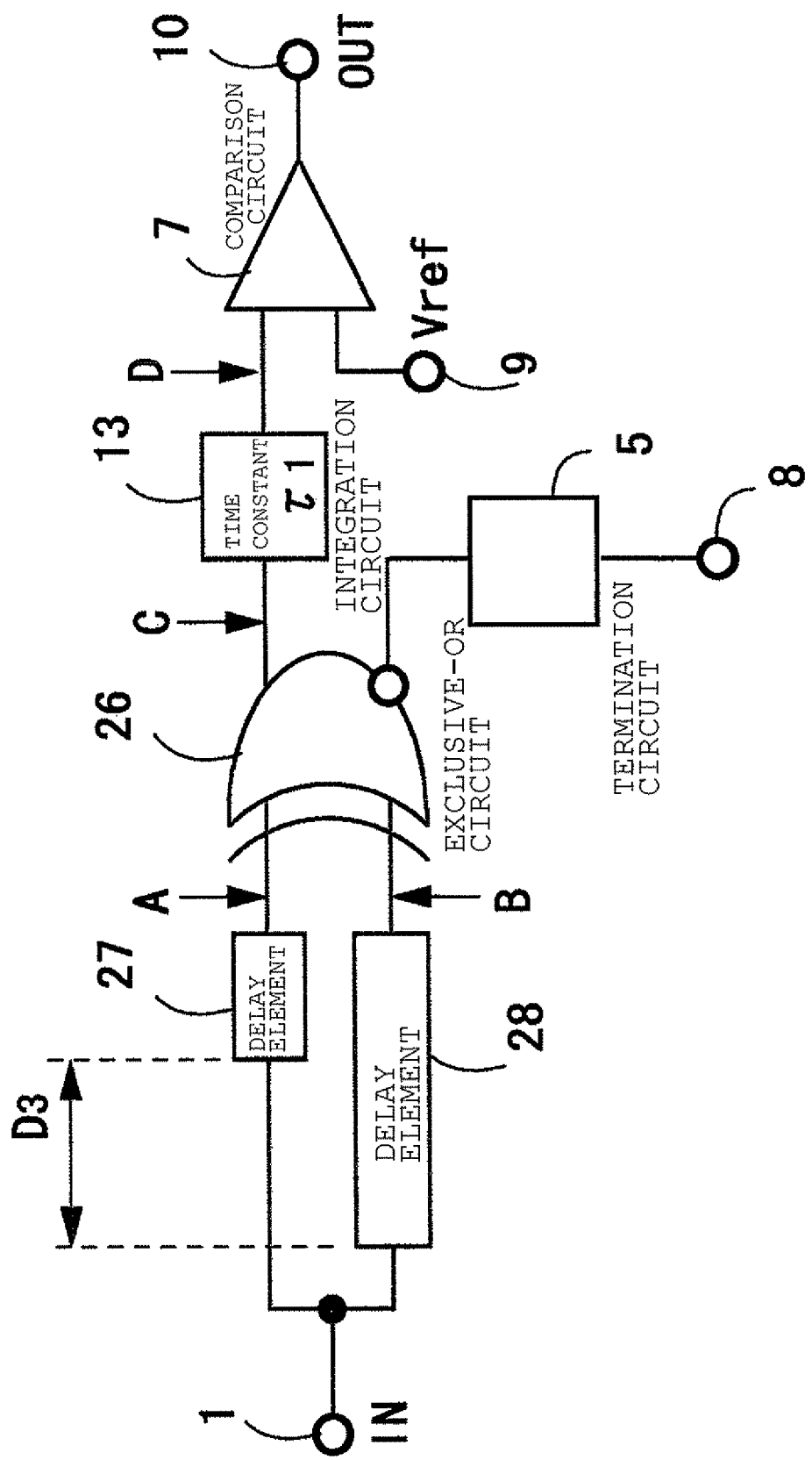
FIG. 14 is a view illustrating a configuration of a bit-rate discrimination circuit according to a sixth example of the invention.

FIG. 14 illustrates a configuration of a bit-rate discrimination circuit according to a sixth example of the invention. In FIG. 14, the component similar to that of FIGS. 3 and 12 is denoted by the same numeral, and the numerals 27 and 28 denote delay circuits. In the sixth example, the problem of the false discrimination caused by the use of the exclusive-NOR circuit 4 of the second example (FIG. 3) is solved similarly to the fifth example (FIG. 12). In the bit-rate discrimination circuit of the sixth example, a delay time difference $D_3$ generated by the delay circuits 27 and 28 is adjusted to the length of the odd-numbered multiple of a half of the preamble pattern period of the low bit-rate signal input to the bit-rate discrimination circuit. The bit-rate discrimination circuit of the sixth example is effectively operated, when the polarity of the preamble signal pattern of the low bit-rate signal is inverted at a half of the period while the inverted code of the first-half pattern becomes the second-half pattern similarly to the fifth example (FIG. 12).

FIGS. 15A and 15B are the timing charts illustrating an operation of the sixth example of the invention. The numerals in FIGS. 15A and 15B denote the components similar to those in FIG. 4. In FIGS. 15A and 15B, the alternating signal of "1010" is used as the simplest preamble pattern similarly to FIG. 13. FIG. 15A illustrates an operation to the low bit-rate signal, and FIG. 15B illustrates an operation to the high bit-rate signal. As is clear from FIG. 15A, similarly to the descriptions of FIGS. 4A and 13A, the finite-width pulse signal having the leading edge in the middle of the preamble is output to the output terminal 10 of the comparator 7.

For the input of the high bit-rate signal, when the preamble period of the low bit-rate signal is not the odd-numbered multiple of the preamble period of the high bit-rate signal, similarly to the description of FIG. 13B, because the exclusive-OR circuit 26 does not output the same-code continuation in the preamble pattern, the output of the integrator 13 does not exceed the threshold of the comparator 7. However, similarly to the description of FIG. 4B, when the preamble period of the low bit-rate signal is the odd-numbered multiple of the preamble period of the high bit-rate signal, outputs of the exclusive-OR circuit 26 become the same-code continuation. Assuming that the time constant $\tau_1$ of the integrator 13 is substantially equal to the preamble length of the low bit-rate signal, $\tau_0 < \tau_1$ is obtained because usually the preamble length of the high bit-rate signal is shortened in inverse proportion to the bit-rate. Assuming that the integral value of the output of the exclusive-OR circuit 26 is decreased in the payload portion, when the threshold voltage (reference voltage Vref) is set such that the continuous code having the length of about $\tau_0$ does not exceed the threshold while the same-code continuation having the length of about $\tau_1$ just exceeds the threshold, the adjustment can be made such that the finite-width pulse signal having the leading edge in the middle of the preamble is not output with respect to the input of the high bit-rate signal.

As described above, when the configuration of the sixth example is utilized, not only can the function equal to that of the second example be realized, but also the false discrimination does not occur even if the same-code continuation is included in the payload or the long non-signal state is included between the signals.

Seventh Example

Figure 16:
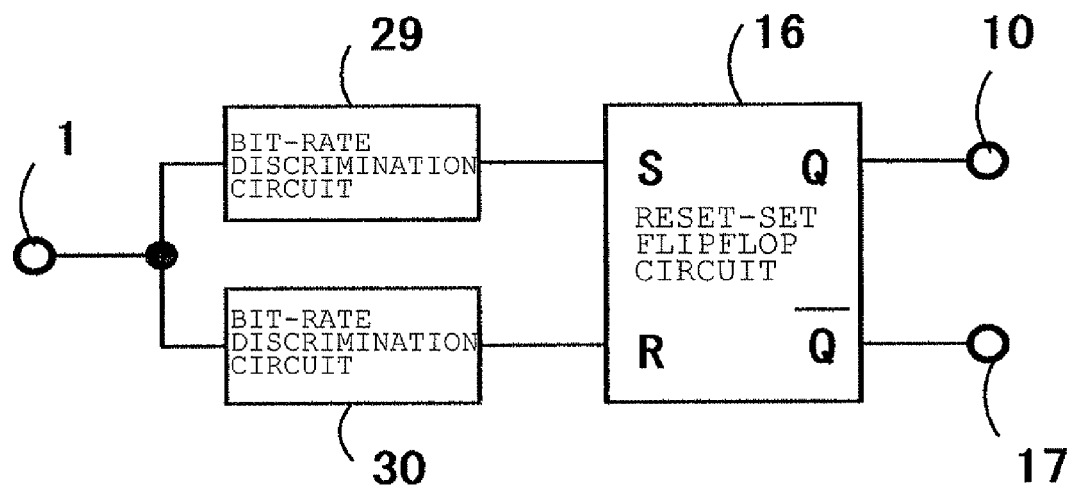
FIG. 16 is a view illustrating a configuration of a bit-rate discrimination apparatus according to a seventh example of the invention.
Figure 17:
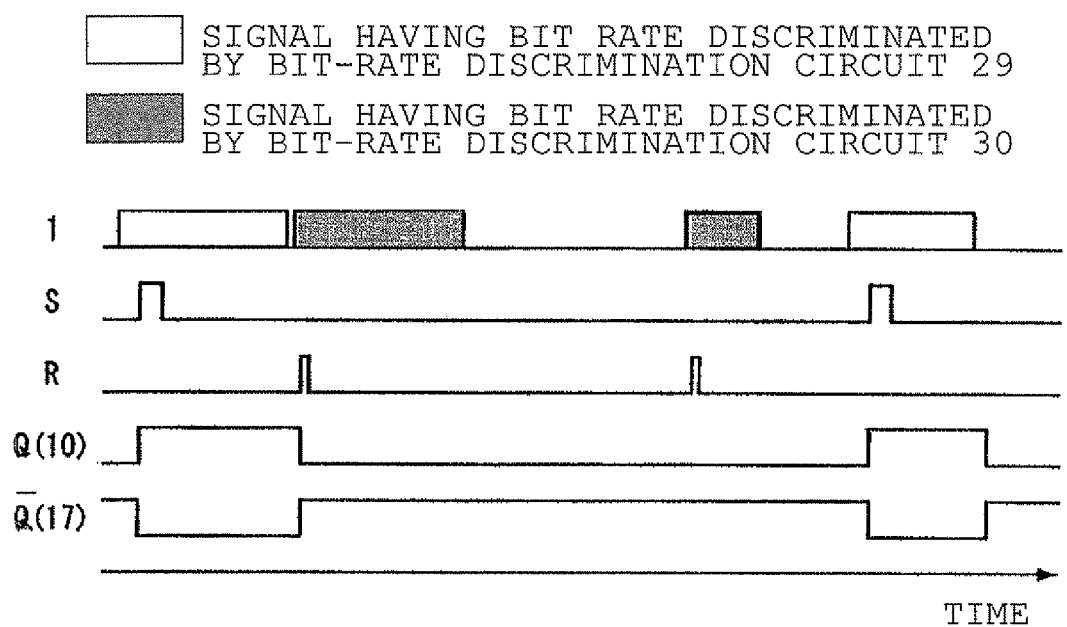
FIG. 17 is a timing chart illustrating an operation of the seventh example of the invention.

FIG. 16 illustrates a configuration of a bit-rate discrimination apparatus according to a seventh example of the invention. In FIG. 16, the component similar to that of FIG. 5 is denoted by the same numeral, and the numerals 29 and 30 denote bit-rate discrimination circuits of the fifth example (FIG. 12) or the sixth example (FIG. 14). FIG. 17 is a timing chart illustrating an operation of the seventh example. The numerals in FIG. 17 denote voltages at nodes denoted by the same numerals in FIG. 16. It is assumed that the bit-rate discrimination circuits 29 and 30 discriminate the signals having different bit-rates, respectively (in FIG. 16, the numeral 29 denotes the low bit-rate signal discrimination circuit). When each of the bit-rate discrimination circuits 29 and 30 outputs the pulse signal as the discrimination signal to the preamble patter of the signal having each bit-rate, the signals in FIG. 17 are obtained by the output terminal 10 and the inverting output terminal 17. The discrimination as to signal having which bit-rate is input can be made by the output signal. In the seventh example, it is found that the false discrimination does not occur for the long non-signal state like the fourth example.

Eighth Example

Figure 18:
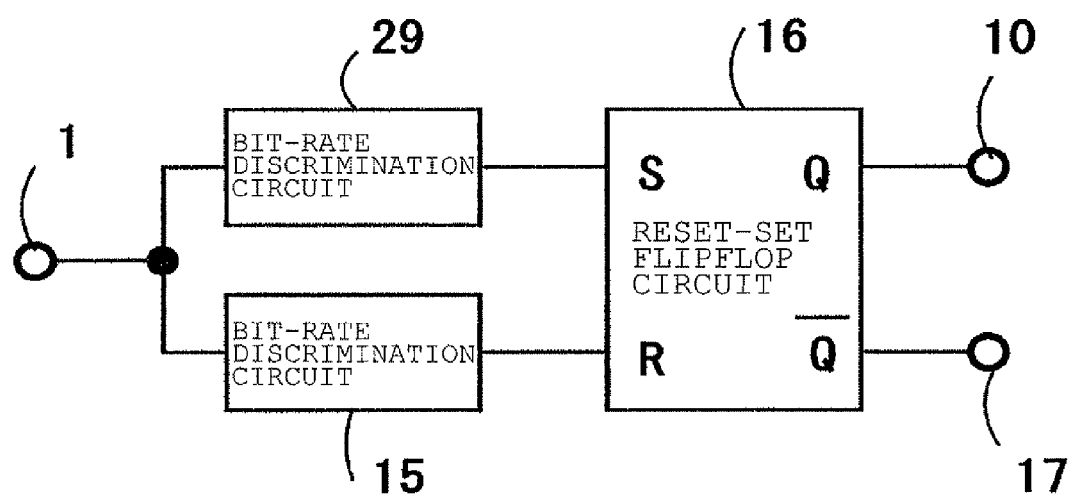
FIG. 18 is a view illustrating a configuration of a bit-rate discrimination apparatus according to an eighth example of the invention.
Figure 19:
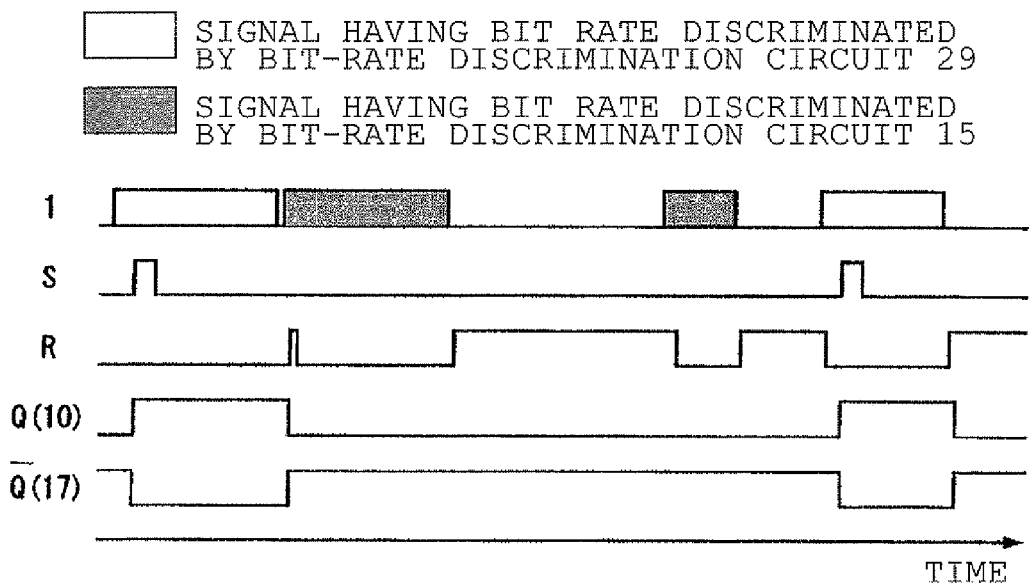
FIG. 19 is a timing chart illustrating an operation of the eighth example of the invention.

FIG. 18 illustrates a configuration of a bit-rate discrimination apparatus according to an eighth example of the invention. In FIG. 18, the component similar to that of FIGS. 5 and 16 is denoted by the same numeral. The discrimination circuit 15 of the first example (FIG. 1) and the discrimination circuit 29 of the sixth example (FIG. 14) are used in the bit-rate discrimination apparatus of the eighth example. As illustrated in FIG. 19, because the false discrimination does not occur at the S terminal to which the signal is output from the bit-rate discrimination circuit 29, the effect similar to that of the fourth example (FIG. 8) is obtained. Therefore, it is found that the false discrimination does not occur when the discrimination circuit 15 of the first example and the discrimination circuit 29 of the sixth example are operated while combined.

Ninth Example

Figure 20:
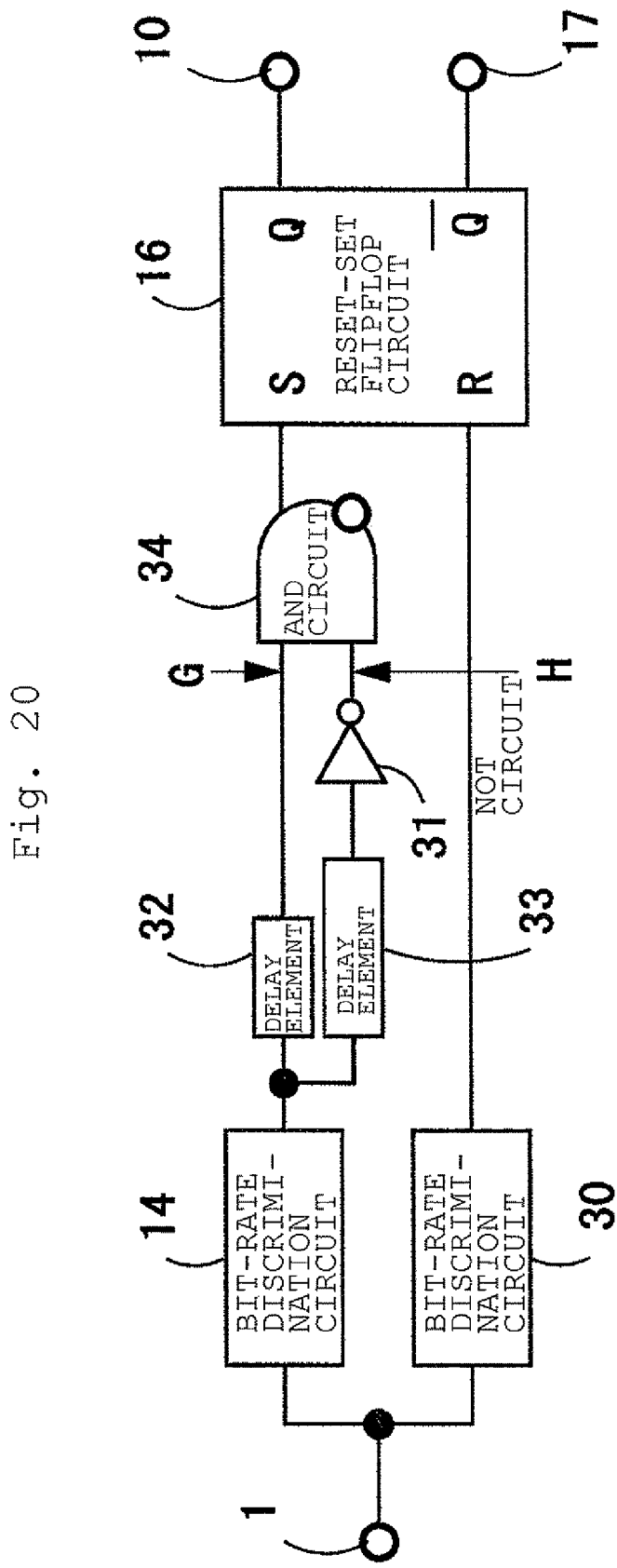
FIG. 20 is a view illustrating a configuration of a bit-rate discrimination apparatus according to a ninth example of the invention.

FIG. 20 illustrates a configuration of a bit-rate discrimination apparatus according to a ninth example of the invention.

Figure 21:
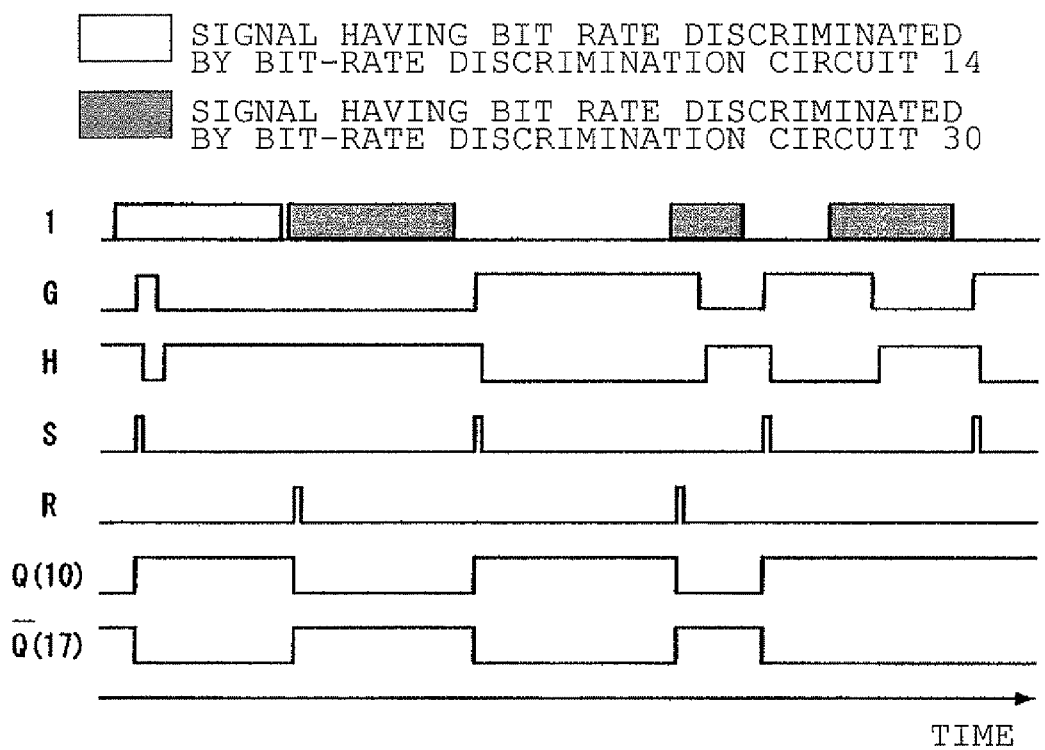
FIG. 21 is a timing chart illustrating an operation of the ninth example of the invention.

In FIG. 20, the component similar to that in FIG. 18 is denoted by the same numeral, the numeral 31 denotes a NOT circuit, the numerals 32 and 33 denote delay circuits, and the numeral 34 denotes an AND circuit. The bit-rate discrimination circuit 14 of the second example (FIG. 3) and the bit-rate discrimination circuit 30 of the fifth example (FIG. 12) are used in the bit-rate discrimination apparatus of the ninth example. In the bit-rate discrimination circuit 14, the false discrimination occurs when the long non-signal state, the same-code continuation, or the preamble period of the low bit-rate signal is the integral multiple of the preamble period of the high bit-rate signal. In the ninth example, a constant delay time difference (time difference to which the RS-FF circuit 16 can respond) is generated by the delay circuits 32 and 33, the AND circuit 34 compresses the output pulse of the bit-rate discrimination circuit 14 to the width of the delay time difference while only the leading edge portion remains, thereby avoiding the false discrimination. As is clear from the timing chart in FIG. 21, the false discrimination does not occur.

Tenth Example

Figure 22:
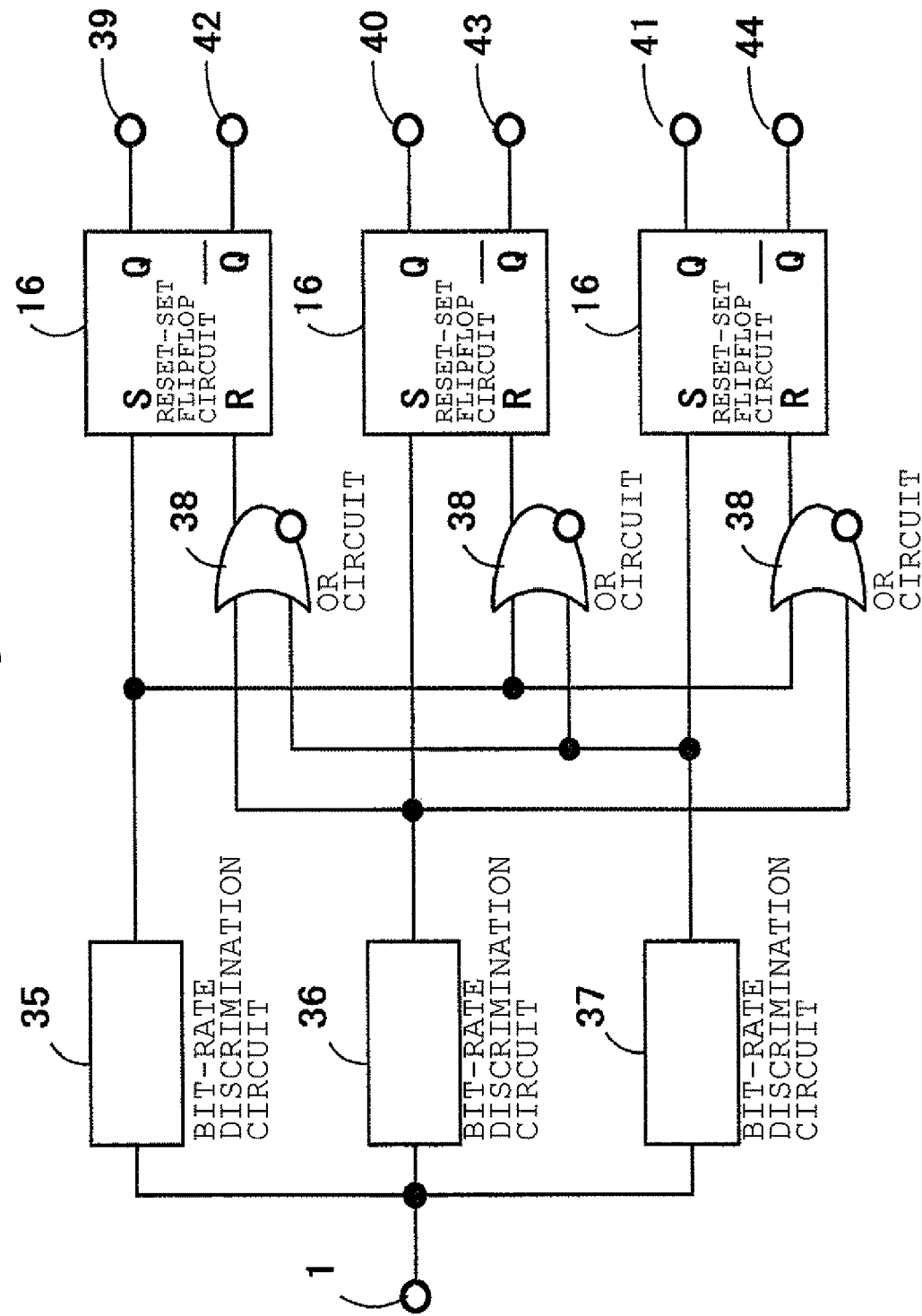
FIG. 22 is a view illustrating a configuration of a bit-rate discrimination apparatus according to a tenth example of the invention.

FIG. 22 illustrates a configuration of a bit-rate discrimination apparatus according to a tenth example of the invention. In FIG. 22, the component similar to that in FIG. 18 is denoted by the same numeral, the numerals 35, 36, and 37 denote the bit-rate discrimination circuits of the first example (FIG. 1), the second example (FIG. 3), the fifth example (FIG. 12), or the sixth example (FIG. 14), the numeral 38 denotes an OR circuit, the numerals 39, 40, and 41 denote output terminals, and the numerals 42, 43, and 44 denote inverting output terminals. A combination of three or more bit-rate discrimination circuits is illustrated in the tenth example. Assuming that the bit-rate discrimination circuits 35, 36, and 37 are configured on the condition that the malfunction does not occur, the third example (FIG. 5) in which the two bit-rate discrimination circuits are used can be extended to the tenth example in FIG. 22 in which plural discrimination circuits are used. When OR of the outputs of the bit-rate discrimination circuits except the bit-rate discrimination circuit input to the S terminal is input to the R terminal of each RS-FF circuit 16, the bit-rate can be discriminated from the output signal of each RS-FF circuit 16.

Eleventh Example

Figure 23:
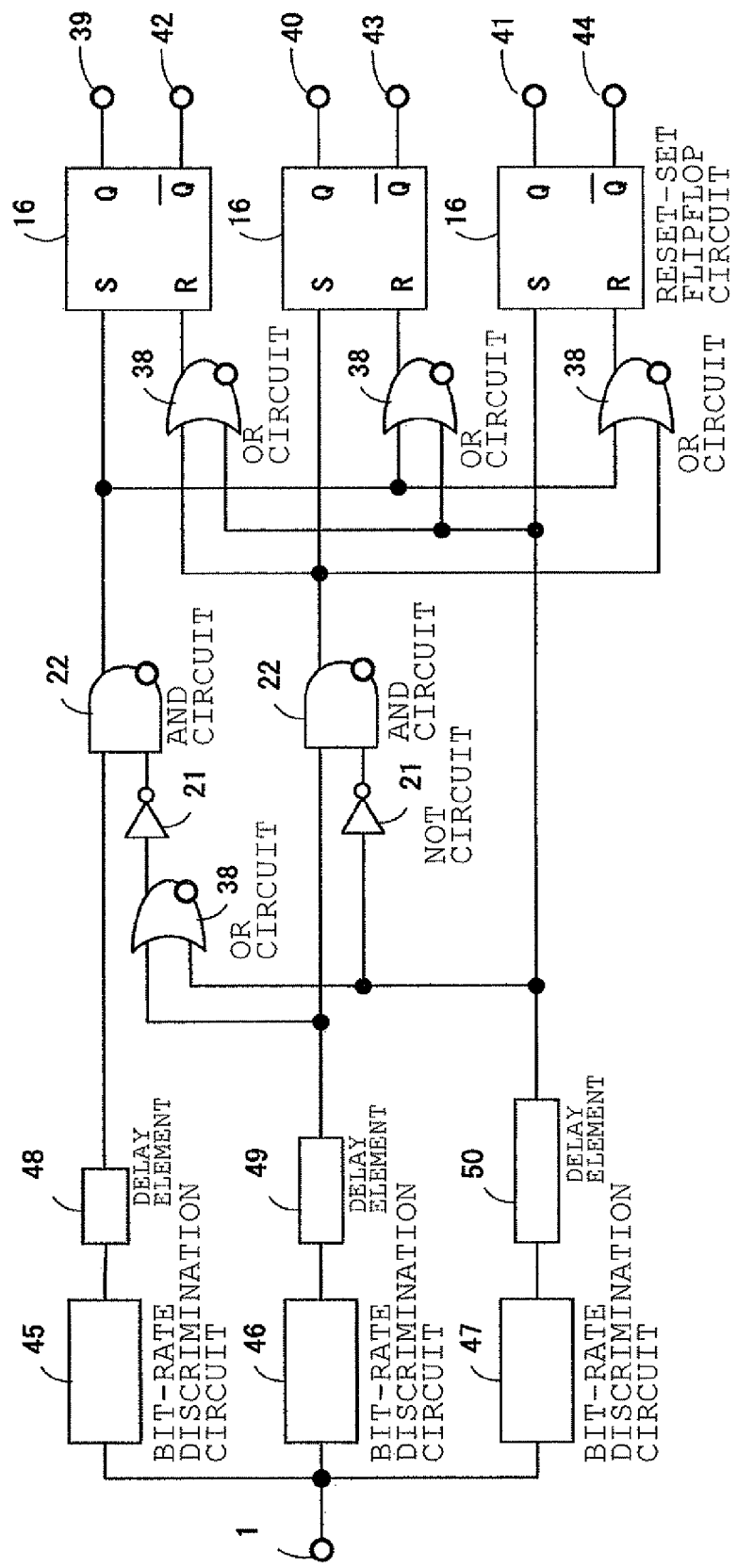
FIG. 23 is a view illustrating a configuration of a bit-rate discrimination apparatus according to an eleventh example of the invention.

FIG. 23 illustrates a configuration of a bit-rate discrimination apparatus according to an eleventh example of the invention. In FIG. 23, the component similar to that in FIG. 22 is denoted by the same numeral, the numerals 45, 46, and 47 denote bit-rate discrimination circuits of the first example (FIG. 1) or the second example (FIG. 3), and the numerals 48, 49, and 50 denote delay circuits. For the use of the plural bit-rate discrimination circuits of the first and second examples in which the consistency discrimination is utilized, the bit-rate discrimination circuit of the fourth example (FIG. 8) can be extended to take the configuration of the eleventh example. The tailing edges of the pulse signals output from the bit-rate discrimination circuits 45, 46, and 47 are aligned with one another using the delay circuits 48, 49, and 50, and the output of the bit-rate discrimination circuit for the highest-bit-rate signal is set to "1" while the outputs of the remaining bit-rate discrimination circuits are forcibly set to "0" when the bit-rate discrimination circuits 45, 46, and 47 simultaneously output "1", which allows the prohibition input to be avoided. In FIG. 23, the numeral 47 denotes the bit-rate discrimination circuit that discriminates the highest-bit-rate signal, and the numeral 45 denotes the bit-rate discrimination circuit that discriminates the lowest-bit-rate signal. A signal, in which NOR of the outputs of the middle-bit-rate discrimination circuit 46 and the highest-bit-rate discrimination circuit 47 is computed and AND of the NOR output and the discrimination output of the bit-rate discrimination circuit 45 is computed, is set to the discrimination output in the lowest-bit-rate discrimination circuit 45. A signal, in which NOT of the output of the highest-bit-rate discrimination circuit 47 is computed and AND of the NOT output and the discrimination output of the bit-rate discrimination circuit 46 is computed, is set to the discrimination output in the middle-bit-rate discrimination circuit 46. That is, the signal, in which NOR of the outputs of all the bit-rate discrimination circuits that discriminate the signal faster than the bit-rate discriminated by the specific bit-rate discrimination circuit is computed and AND of the NOR output and the discrimination output of the specific bit-rate discrimination circuit is computed, is set to the discrimination output in the specific bit-rate discrimination circuit.

Twelfth Example

Figure 24:
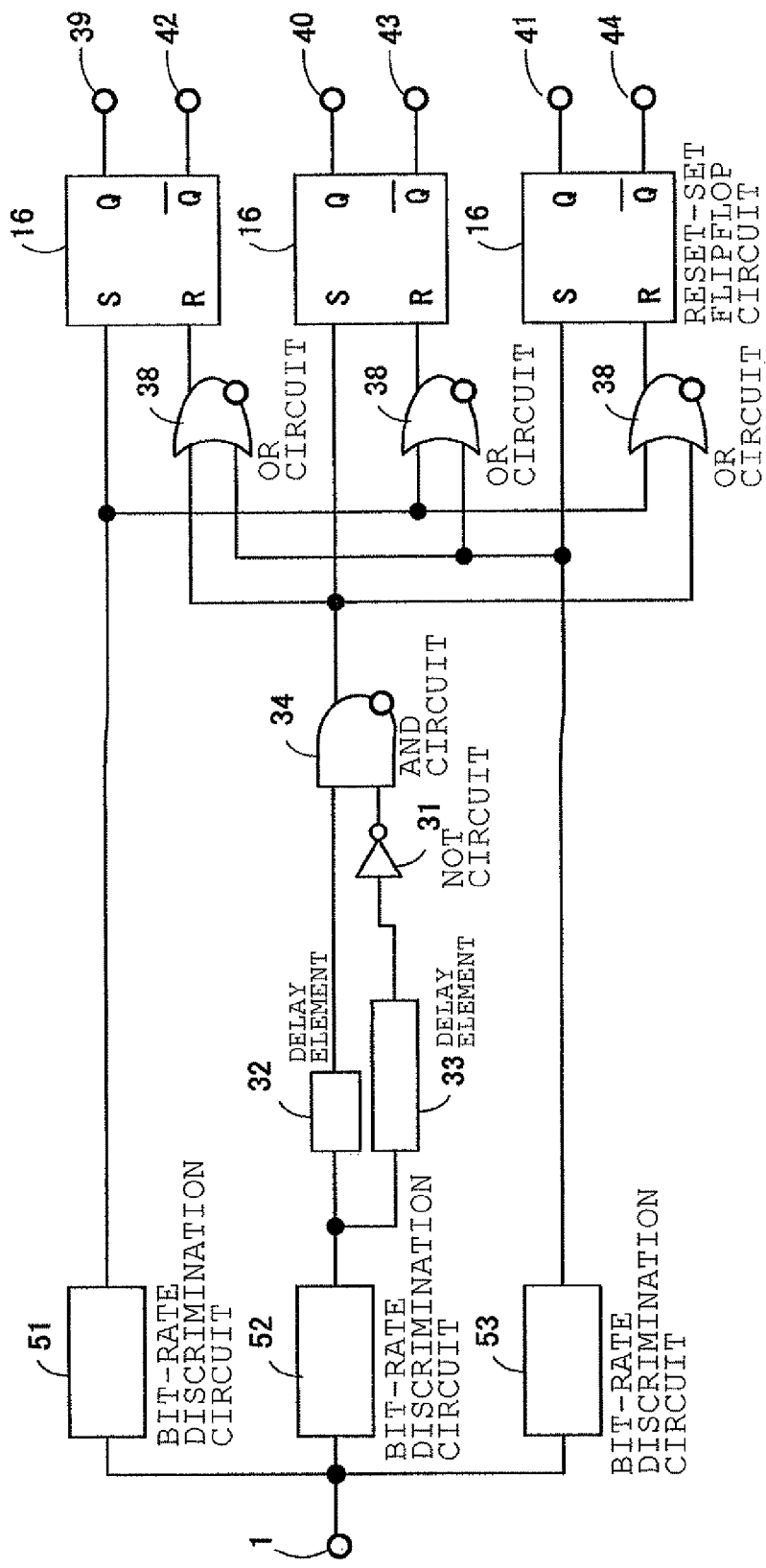
FIG. 24 is a view illustrating a configuration of a bit-rate discrimination apparatus according to a twelfth example of the invention.
Figure 25:
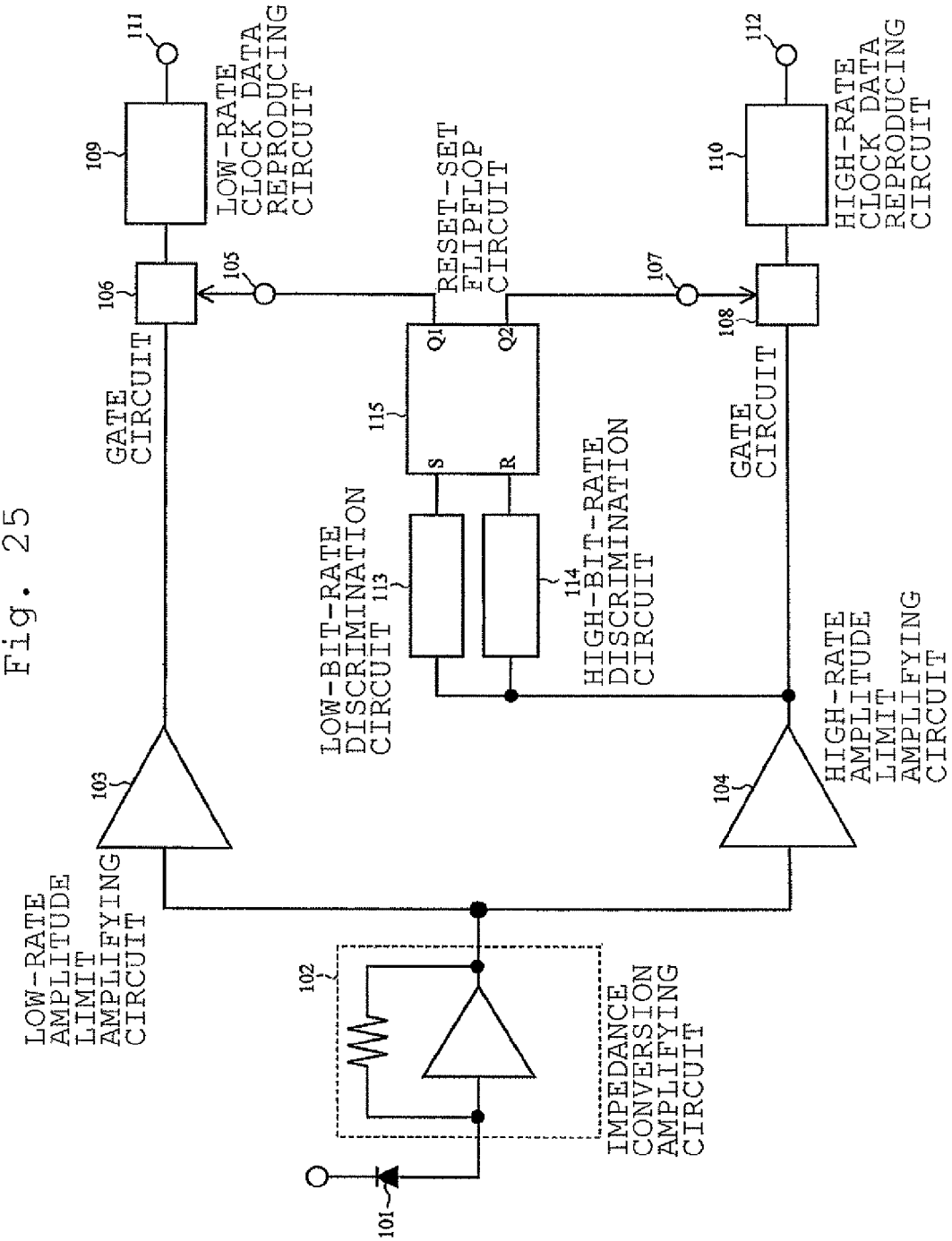
FIG. 25 is a block diagram illustrating a conventional receiver.
Figure 26:
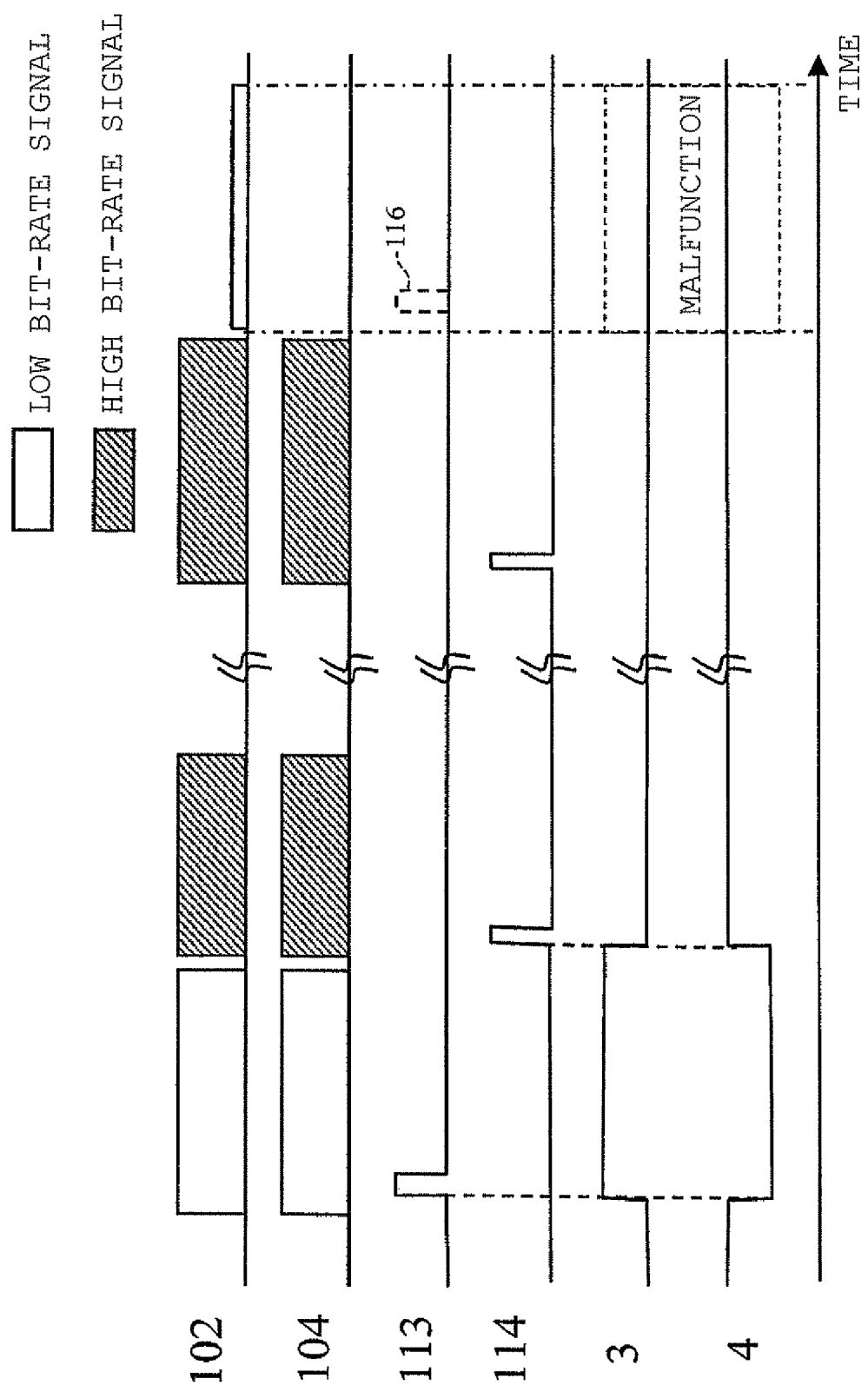
FIG. 26 illustrates a timing chart of the conventional receiver.

FIG. 24 illustrates a configuration of a bit-rate discrimination apparatus according to a twelfth example of the invention. In FIG. 24, the component similar to that in FIGS. 20 and 23 is denoted by the same numeral, the numerals 51 and 53 denote the bit-rate discrimination circuits of the fifth example (FIG. 12) or the sixth example (FIG. 14), and the numeral 52 denotes the bit-rate discrimination circuit of the first example (FIG. 1) or the second example (FIG. 3). In the configuration of the twelfth example, only one bit-rate discrimination circuit of the first and second examples in which the consistency discrimination is utilized is used, and other bit-rate discrimination circuits are formed by the bit-rate discrimination circuit of the fifth and sixth examples. As a result, the effect similar to that of the ninth example (FIG. 20) is obtained.

Other Examples

In the above-described examples, for the sake of convenience, the same preamble pattern is used in the high bit-rate signal and the low bit-rate signal. However, it is not always necessary that the same preamble pattern be used in the high bit-rate signal and the low bit-rate signal. A delay circuit or a transmission line may be used as the delay circuit as long as the delay circuit or the transmission line provides the delay, and the delay circuit is not limited in terms of a circuit configuration or a material. In the examples, the reset-set flipflop circuit is used as the storage circuit, and the logic circuit is used in order to avoid the prohibition input. When the logic circuit is operated in the similar way, the similar effect is obtained with the logic circuit having another configuration. In the drawings of the circuit configurations, for the sake of convenience, the interface of the element circuit is illustrated as the single-end configuration. Alternatively a differential interface may be used. Particularly, in the portion in which the NOT circuit is used after the branching, use of a differential output interface can omit the NOT circuit.

As described above, in the examples, the bit-rate is discriminated by utilizing the periodicity of the known preamble signal. More specifically, the repetition of the identical pattern is converted into the consecutive identical signal to generate the consecutive identical signal (having a length of several tens of bits to several thousand bits). Although the consecutive identical signal is longer than the same-code continuation length included in the signal, the consecutive identical signal is shorter than the time constant necessary for the conventional circuit by about one to three digits. Therefore, the integration time can be shortened to the same degree as the generated consecutive identical signal length, and the bit-rate can be discriminated at high speed within the preamble signal receiving time. Further, the finite-width pulse signal of the discrimination result is retained in the storage circuit, so that the discrimination result can be retained until the discrimination result is changed.

Second Embodiment

The following second embodiment is examples of the configuration of the invention. However, the invention is not limited to the examples. In the second embodiment and the drawings related to the second embodiment, the same component is denoted by the same numeral.

Thirteenth Example

Figure 27:
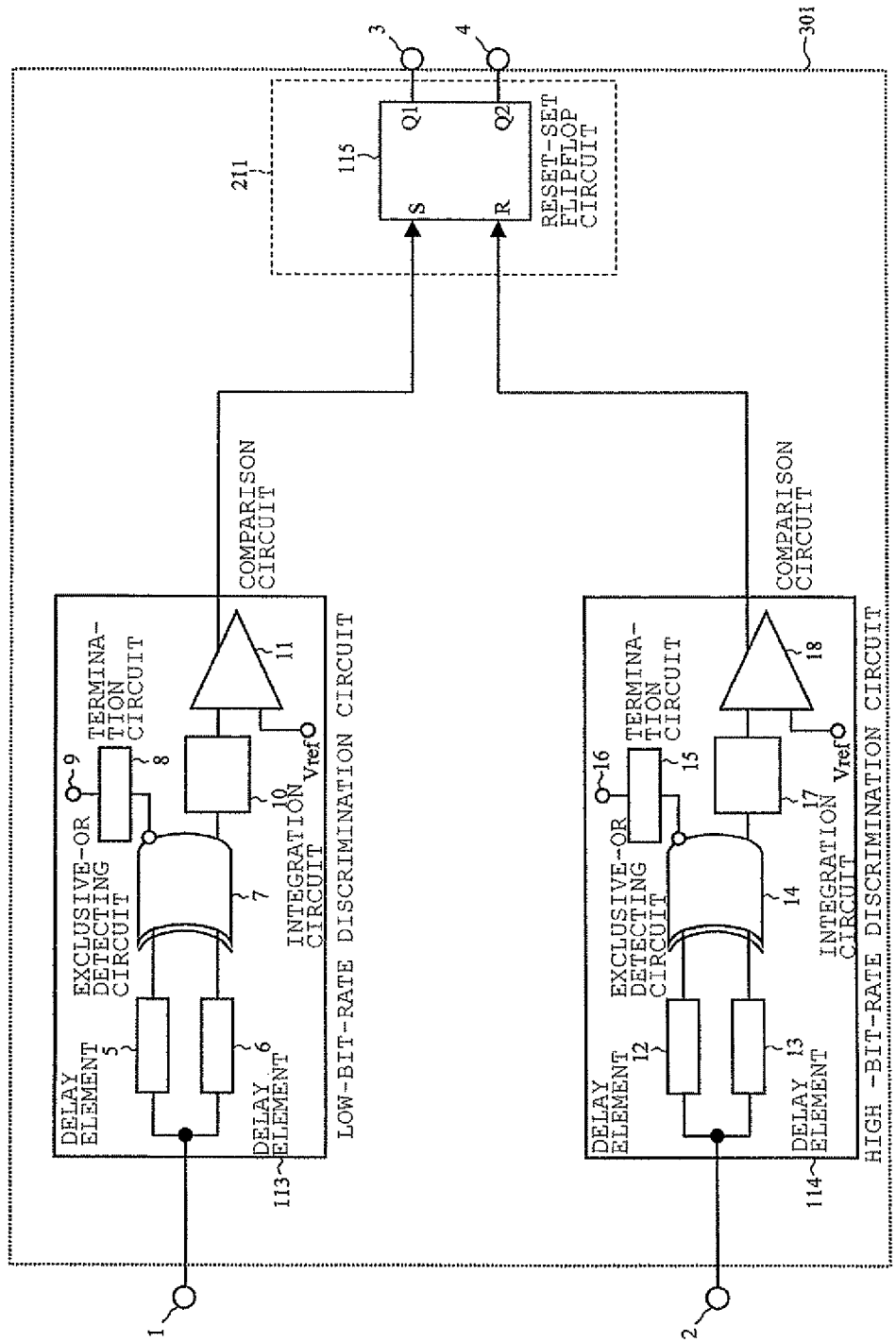
FIG. 27 is a block diagram illustrating a configuration of a bit-rate discrimination apparatus according to the invention.

FIG. 27 is a block diagram illustrating a configuration of a bit-rate discrimination apparatus according to a thirteenth example of the invention. The bit-rate discrimination apparatus of the thirteenth example includes a control unit 301 that outputs a control signal, the control signal controlling a gate circuit such that a low-bit-rate signal in an input signal is passed through a first path and a high-bit-rate signal faster than the low-bit-rate signal in the input signal is passed through a second path, the input signal being input to the first path and the second path, the gate circuit that passes or cuts the signal being connected to each of the first path and the second path. The control unit 301 includes: a first input port 1 that obtains the input signal in front of the gate circuit of the first path; a second input port 2 that obtains the input signal in front of the gate circuit of the second path; a low-bit-rate discrimination circuit 113 that is connected to the first input port 1 to discriminate whether the bit-rate of the input signal is identical to the set low bit-rate; a high-bit-rate discrimination circuit 114 that is connected to the second input port 2 to discriminate whether the bit-rate of the input signal is identical to the set high bit-rate; and a signal output circuit 211 that includes a first control port 3 connected to the gate circuit of the first path and a second control port 4 connected to the gate circuit of the second path, and outputs the control signal from each of the first control port 3 and the second control port 4 based on discrimination result of each of the low-bit-rate discrimination circuit 113 and the high-bit-rate discrimination circuit 114. The bit-rate of the input signal from each of the first input port 1 and the second input port 2 is determined based on a preamble pattern included in the input signal, thereby preventing a control malfunction of the gate circuit.

The first path and the second path, to which the gate circuits are connected, are not illustrated in FIG. 27. In front of the gate circuit of the first path, the first input port 1 partially obtains the input signal passed through the first path. In front of the gate circuit of the second path, the second input port 2 partially obtains the input signal passed through the second path.

The low-bit-rate discrimination circuit 113 discriminates whether the bit-rate of the input signal passed through the first path is the low bit-rate and outputs the discrimination result. The high-bit-rate discrimination circuit 114 discriminates whether the bit-rate of the input signal passed through the second path is the high bit-rate and outputs the discrimination result.

The discrimination results are input to the signal output circuit 211 from the low-bit-rate discrimination circuit 113 and the high-bit-rate discrimination circuit 114, and the signal output circuit 211 outputs the control signal from the first control port 3 and the second control port 4. The first control port 3 and the gate circuit of the first path are connected, and the second control port 4 and the gate circuit of the second path are connected, so that the signal output circuit 211 can control the opening and closing of the gate circuit using the control signal. Specifically, when the bit-rate of the input signal is the low bit-rate, the signal output circuit 211 outputs the control signal such that the gate circuit of the first path is opened within the preamble pattern of the input signal while the gate circuit of the second path is closed. When the bit-rate of the input signal is the high bit-rate, the signal output circuit 211 outputs the control signal such that the gate circuit of the second path is opened within the preamble pattern of the input signal while the gate circuit of the first path is closed.

In the bit-rate discrimination apparatus in FIG. 27, the low-bit-rate discrimination circuit 113 that branches the input signal into two signals includes: delay circuits 5 and 6 that generate a delay difference corresponding to an odd-numbered multiple of a half period of the preamble pattern of the input signal between the two branched signals; an exclusive-OR circuit 7 to which the two signals having the delay difference are input from the delay circuits 5 and 6, and which produces a consecutive identical signal when the codes of the two signals are different from each other; an integrator 10 that integrates the consecutive identical signal from the exclusive-OR circuit 7; and a comparator 11 that makes discrimination with a predetermined threshold and the consecutive identical signal integral value integrated by the integrator 10. The high-bit-rate discrimination circuit 114 that branches the input signal into two signals includes: delay circuits 12 and 13 that generate a delay difference corresponding to an odd-numbered multiple of a half period of the preamble pattern of the input signal between the two branched signals; an exclusive-OR circuit 14 to which the two signals having the delay difference are input from the delay circuits 12 and 13, and which produces a consecutive identical signal when the codes of the two signals are different from each other; an integrator 17 that integrates the consecutive identical signal from the exclusive-OR circuit 14; and a comparator 18 that makes discrimination with a predetermined threshold and the consecutive identical signal integral value integrated by the integrator 17. The low-bit-rate discrimination circuit 113 outputs a pulse signal having a finite width within the preamble period pattern when the input signal has the low bit-rate. The high-bit-rate discrimination circuit 114 outputs a pulse signal having a finite width within the preamble period pattern when the input signal has the high bit-rate. The exclusive-OR circuit (7 and 14) is an exclusive logical addition circuit.

The signal output circuit 211 includes a determination circuit to which the pulse signal is input as a control determining signal from each of the low-bit-rate discrimination circuit 113 and the high-bit-rate discrimination circuit 114, and which produces the control signal and maintains a state of the control signal until the bit-rate of the input signal is changed. For example, the determination circuit is a reset-set flipflop circuit 115. For the reset-set flipflop circuit 115, the control determining signal is input to each of a set terminal S and a reset terminal R, and an output terminal Q1 and the first control port 3 are connected and an inverting output terminal Q2 and the second control port 4 are connected. The determination circuit is identical to the storage circuit of the first to twelfth examples.

The bit-rate discrimination apparatus of the thirteenth example is effectively operated, when the preamble pattern of the input signal has a period pattern, in which polarity is inverted at a half of the period and the inverted code of the first-half pattern becomes the second-half pattern. For example, the preamble pattern is "1010101010 . . . ".

In a bit-rate discrimination method for the bit-rate discrimination apparatus, the input signal is obtained in front of the gate circuit of the first path and input to the low-bit-rate discrimination circuit 113, the input signal is obtained in front of the gate circuit of the second path and input to the high-bit-rate discrimination circuit 114, the input signal is branched into two signals by each of the low-bit-rate discrimination circuit 113 and the high-bit-rate discrimination circuit 114, and the delay difference corresponding to the odd-numbered multiple of a half period of the preamble pattern of the input signal is generated between the two branched signals. In the bit-rate discrimination method for the bit-rate discrimination apparatus, the consecutive identical signal is generated to make the discrimination with a predetermined threshold and a value obtained by integrating the consecutive identical signal, when codes of the two signals having the delay difference are different from each other, the low-bit-rate discrimination circuit 113 outputs the pulse signal having the finite width within the preamble period pattern when the input signal has the low bit-rate, the high-bit-rate discrimination circuit 114 outputs the pulse signal having the finite width within the preamble period pattern when the input signal has the high bit-rate, and the control signal that controls the gate circuit is output based on the pulse signal from each of the low-bit-rate discrimination circuit 113 and the high-bit-rate discrimination circuit 114.

The delay circuits 5 and 6 included in the low-bit-rate discrimination circuit 113 and the delay circuits 12 and 13 included in the high-bit-rate discrimination circuit 114 are adjusted to the length of the odd-numbered multiple of a half of the pattern period of the preamble of the low-bit-rate signal and the length of the odd-numbered multiple of a half of the pattern period of the preamble of the high-bit-rate signal, respectively. The time constants of the integrator 10 included in the low-bit-rate discrimination circuit 113 and the integrator 17 included in the high-bit-rate discrimination circuit 114 are set to the length of about preamble of the low-bit-rate signal and the length of about preamble of the high-bit-rate signal, respectively.

For the sake of convenience, FIG. 27 illustrates an example in which the delay circuits 5 and 6 are connected to the low-bit-rate discrimination circuit 113 while the delay circuits 12 and 13 are connected to the high-bit-rate discrimination circuit 114. Only one of the delay circuits may be provided when the delay circuit is equal to the length of the odd-numbered multiple of a half of the pattern period of each preamble. The integrator 10 and the integrator 17 may be omitted, when the comparator 11 and the comparator 18 have the response speeds equal to the time constants of the integrator 10 and integrator 17.

Figure 28:
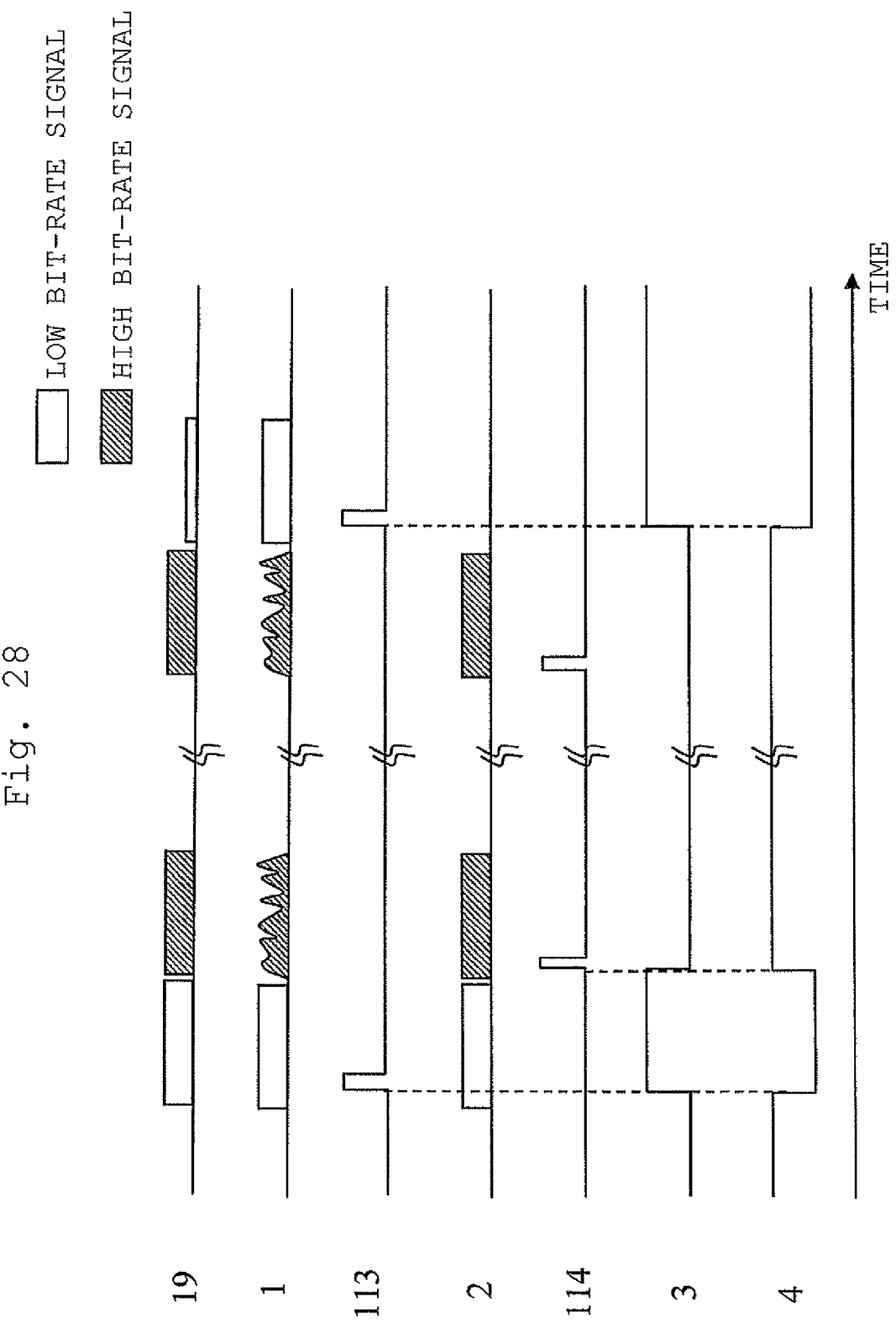
FIG. 28 is a timing chart illustrating an operation of the bit-rate discrimination apparatus according to the invention.

FIG. 28 is a timing chart illustrating an operation of the bit-rate discrimination apparatus in FIG. 27. At this point, in an input signal 19, similarly to the conventional example, it is assumed that the high-bit-rate signal and the low-bit-rate signal whose light-receiving sensitivity is equal to or lower than that of the high-bit-rate signal and having a low voltage value are input after the low-bit-rate signal and the high-bit-rate signal are followed by the long non-signal state.

The numerals in FIG. 28 denote output signal voltage values from the devices denoted by the numerals in FIG. 27. In the signal input to the first input port 1, a waveform of the high-bit-rate signal collapses by the band limitation because the signal is passed through the element having the band corresponding to the low bit-rate. In the signal input to the second input port 2, because the light-receiving sensitivity is reduced in exchange for securing the band of the high-bit-rate signal, it is assumed that the low-bit-rate signal whose light-receiving sensitivity is equal to or lower than that of the high bit-rate signal is not output.

When the signal denoted by the numeral 1 in FIG. 28 is input to the first input port 1, the low-bit-rate discrimination-circuit 113 outputs the finite-width pulse signal within the preamble pattern time of the low-bit-rate signal. When the signal denoted by the numeral 2 in FIG. 28 is input to the second input port 2, the high-bit-rate discrimination circuit 114 outputs the finite-width pulse signal within the preamble pattern time of the high-bit-rate signal. The pulse signal is input as the control determining signal from the low-bit-rate discrimination circuit 113 to the set terminal S of the reset-set flip-flop circuit 115, and the pulse signal is input as the control determining signal from the high-bit-rate discrimination circuit 114 to the reset terminal R of the reset-set flipflop circuit 115, whereby the outputs of the reset-set flipflop circuit 115 become the numerals 3 and 4 in FIG. 28. As illustrated in the output results, the bit-rate discrimination apparatus in FIG. 27 can discriminate as to signal having which bit-rate is input. Thus, in the bit-rate discrimination apparatus in FIG. 27, the low-bit-rate discrimination circuit 113 is connected to the first input port 1, and the high-bit-rate discrimination circuit 114 is connected to the second input port 2, thereby avoiding the false discrimination.

Alternatively, the pulse signal from the low-bit-rate discrimination circuit 113 may be input to the reset terminal R of the reset-set flipflop circuit 115, and the pulse signal from the high-bit-rate discrimination circuit 114 may be input to the set terminal S of the reset-set flipflop circuit 115. In this manner, the similar effect can be obtained.

Fourteenth Example

Figure 29:
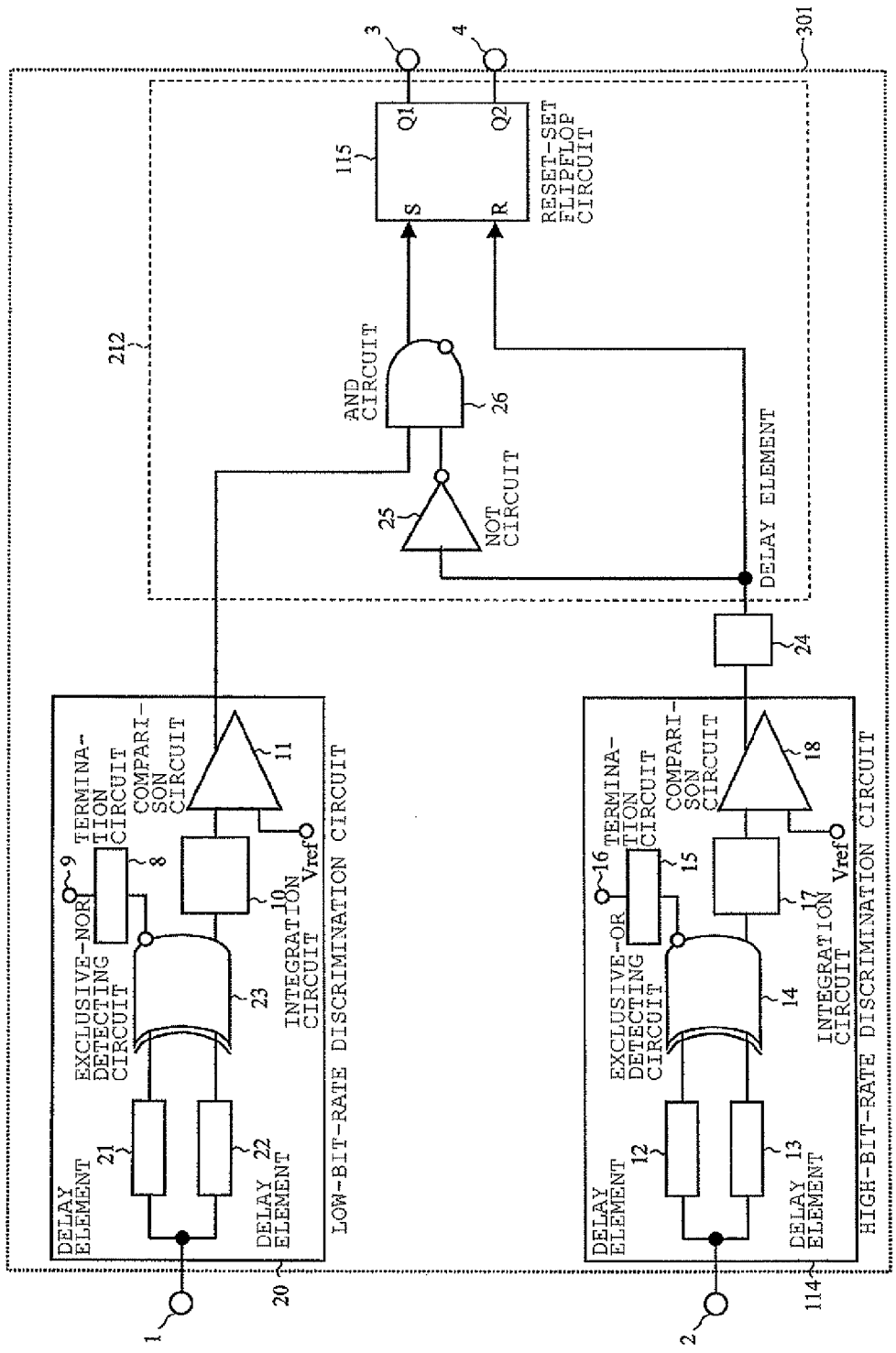
FIG. 29 is a block diagram illustrating a configuration of a bit-rate discrimination apparatus according to the invention.

FIG. 29 is a block diagram illustrating a configuration of a bit-rate discrimination apparatus according to a fourteenth example of the invention. The bit-rate discrimination circuit in FIG. 29 includes a low-bit-rate discrimination circuit 20 and a signal output circuit 212 instead of the low-bit-rate discrimination circuit 113 and the signal output circuit 211 of the bit-rate discrimination apparatus in FIG. 27. The portion that is different from that of the bit-rate discrimination apparatus in FIG. 27 will be described below.

In the bit-rate discrimination apparatus in FIG. 29, the low-bit-rate discrimination circuit 20 that branches the input signal into two signals includes: delay circuits 21 and 22 that generate a delay difference corresponding to an integral multiple of the period of the preamble pattern of the input signal between the two branched signals; an exclusive-NOR circuit 23 to which the two signals having the delay difference are input from the delay circuits 21 and 22, and which produces a consecutive identical signal when the codes of the two signals are identical to each other; the integrator 10 that integrates the consecutive identical signal from the exclusive-NOR circuit 23; and the comparator 11 that makes discrimination with a predetermined threshold and the consecutive identical signal integral value integrated by the integrator 10. Because the low-bit-rate discrimination circuit 20 includes the exclusive-NOR circuit 23, the low-bit-rate discrimination circuit 20 outputs the pulse signal when the input signal is in the non-signal state. The exclusive-NOR circuit 23 is an exclusive negative logical addition circuit.

The signal output circuit 212 includes: an AND circuit 26 to which the pulse signal from the low-bit-rate discrimination circuit 20 and an inverting pulse signal of the pulse signal from the high-bit-rate discrimination circuit 114 are input; and the determination circuit to which the output result of the AND circuit 26 and the pulse signal from the high-bit-rate discrimination circuit 114 are input as the control determining signal, and which produces the control signal and maintains a state of the control signal until the bit-rate of the input signal is changed. For example, the determination circuit is the reset-set flipflop circuit 115.

The bit-rate discrimination apparatus of the fourteenth example is effectively operated, when the preamble pattern included in the high-bit-rate input signal has a period pattern, in which the polarity is inverted at a half of the period and the inverted code of the first-half pattern becomes the second-half pattern, and when the preamble pattern included in the low-bit-rate input signal has integral period patterns. For example, the low-bit-rate preamble pattern is "110101, 110101, 110101, . . . ".

In a bit-rate discrimination method of the bit-rate discrimination apparatus, the input signal is obtained in front of the gate circuit of the first path and input to the low-bit-rate discrimination circuit 20, the input signal is obtained in front of the gate circuit of the second path and input to the high-bit-rate discrimination circuit 114, the input signal is branched into two signals by the high-bit-rate discrimination circuit 114, and the delay difference corresponding to the odd-numbered multiple of a half period of the preamble pattern of the input signal is generated between the two branched signals. In the bit-rate discrimination method of the bit-rate discrimination apparatus, the consecutive identical signal is generated to make the discrimination with a predetermined threshold and a value obtained by integrating the consecutive identical signal when the codes of the two signals having the delay difference are different from each other, the high-bit-rate discrimination circuit 114 outputs the pulse signal having the finite width within the preamble period pattern when the input signal has the high bit-rate, the input signal is branched into two signals by the low-bit-rate discrimination circuit 20, and the delay difference corresponding to the integral multiple of a period of the preamble pattern of the input signal is generated between the two branched signals. In the bit-rate discrimination method of the bit-rate discrimination apparatus, the consecutive identical signal is generated to make the discrimination with a predetermined threshold and a value obtained by integrating the consecutive identical signal when the codes of the two signals having the delay difference are identical to each other, the low-bit-rate discrimination circuit 20 outputs the pulse signal when the input signal is in the non-signal state, and the inverting pulse signal of the pulse signal from the high-bit-rate discrimination circuit 114 and the pulse signal from the low-bit-rate discrimination circuit 20 are input to the AND circuit 26, and the control signal that controls the gate circuit is output based on the output result from the AND circuit 26 and the pulse signal from the high-bit-rate discrimination circuit 114.

The delay circuits 21 and 22 included in the low-bit-rate discrimination circuit 20 are adjusted to the length of the integral multiple of the pattern period of the preamble of the low-bit-rate signal. The delay circuits 12 and 13 included in the high-bit-rate discrimination circuit 114 are adjusted as described in FIG. 27. For the sake of convenience, FIG. 29 illustrates an example in which the delay circuits 21 and 22 are connected to the low-bit-rate discrimination circuit 20 while the delay circuits 12 and 13 are connected to the high-bit-rate discrimination circuit 114. However it is possible to use only one of the delay circuits 21 or 22 included in the low-bit-rate discrimination circuit 20 if the delay circuit is equal to the length of the integral multiple of the preamble pattern period. As described in FIG. 27, it is possible to use only one of the delay circuits 12 or 13 of the high-bit-rate discrimination circuit.

The time constants of the integrator 10 included in the low-bit-rate discrimination circuit 20 and the integrator 17 included in the high-bit-rate discrimination circuit 114 are set as described in FIG. 27. The integrator may be omitted as described in FIG. 27.

Figure 30:
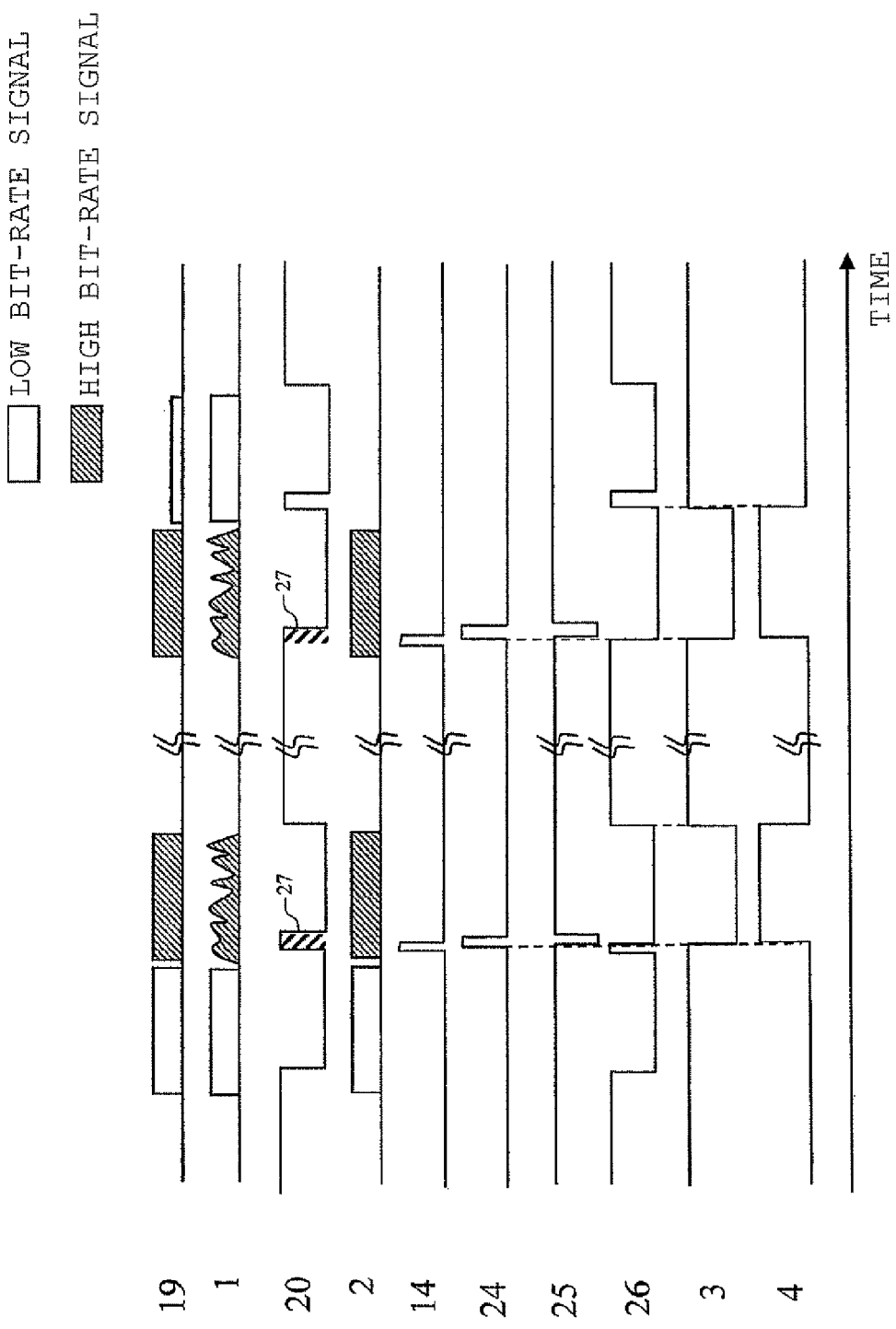
FIG. 30 is a timing chart illustrating an operation of the bit-rate discrimination apparatus according to the invention.

FIG. 30 is a timing chart illustrating an operation of the bit-rate discrimination apparatus in FIG. 29. At this point, the input signal 19 is similar to the input signal 19 in FIG. 28. The numerals in FIG. 30 denote output signal voltage values from the devices denoted by the numerals in FIG. 29. The signals input to the first input port 1 and second input port 2 are similar to those in FIG. 28.

Because the low-bit-rate discrimination circuit 20 includes the exclusive-NOR circuit 23, the low-bit-rate discrimination circuit 20 outputs the pulse in the non-signal state. Because the waveform of the high-bit-rate signal input to the first input port 1 collapses, there is a risk of smoothing the preamble pattern of the high-bit-rate signal due to the collapsed waveform. Therefore, possibly the exclusive-NOR circuit 23 discriminates the consistency and the low-bit-rate discrimination circuit 20 outputs a false output 27 within the preamble time of the high-bit-rate signal. When the signal denoted by the numeral 2 in FIG. 30 is input to the second input port 2, similarly to the description in FIG. 28, the high-bit-rate discrimination circuit 114 outputs the finite-width pulse signal within the preamble pattern time of the high-bit-rate signal.

Similarly to the descriptions in FIGS. 27 and 28, when the pulse signal from the low-bit-rate discrimination circuit 20 and the pulse signal from the high-bit-rate discrimination circuit 114 are input to the reset-set flipflop circuit 115, as is clear from the numerals 20 and 114 in FIG. 30, the reset-set flipflop circuit 115 becomes the "prohibition input" in which the set signal and the reset signal are simultaneously input, thereby possibly causing a malfunction. The malfunction is caused by the false output 27 from the exclusive-NOR circuit 23 included in the low-bit-rate discrimination circuit 20 during the input of the high-bit-rate signal. In order to avoid the malfunction, in the fourteenth example, the tailing edge of the false output 27 and the leading edge of the output signal from the NOT circuit 25 are aligned with each other using the delay circuit 24 and the NOT circuit 25, and the false output 27 and the output signal are input to the AND circuit 26, whereby the signal input to the set terminal S of the reset-set flipflop circuit 115 is forcibly converted into "0". This is because a priority is placed on the pulse signal from the high-bit-rate discrimination circuit 114 when "1" is simultaneously input to the set terminal S and the reset terminal R.

The output result from the AND circuit 26 is input as the control determining signal to the set terminal S of the reset-set flipflop circuit 115, the pulse signal from the high-bit-rate discrimination circuit 114 is input as the control determining signal to the reset terminal R of the reset-set flipflop circuit 115, whereby the outputs of the reset-set flipflop circuit 115 become the numerals 3 and 4 in FIG. 30. As illustrated in the output results, the bit-rate discrimination apparatus in FIG. 29 can discriminate as to signal having which bit-rate is input. Thus, the bit-rate discrimination apparatus in FIG. 29 avoids the false discrimination caused by the simultaneous input to the reset-set flipflop circuit 115.

Alternatively, the output result from the AND circuit 26 may be input to the reset terminal R of the reset-set flipflop circuit 115, and the pulse signal from the high-bit-rate discrimination circuit 114 may be input to the set terminal S of the reset-set flipflop circuit 115. In this manner, the similar effect can be obtained.

Fifteenth Example

Figure 31:
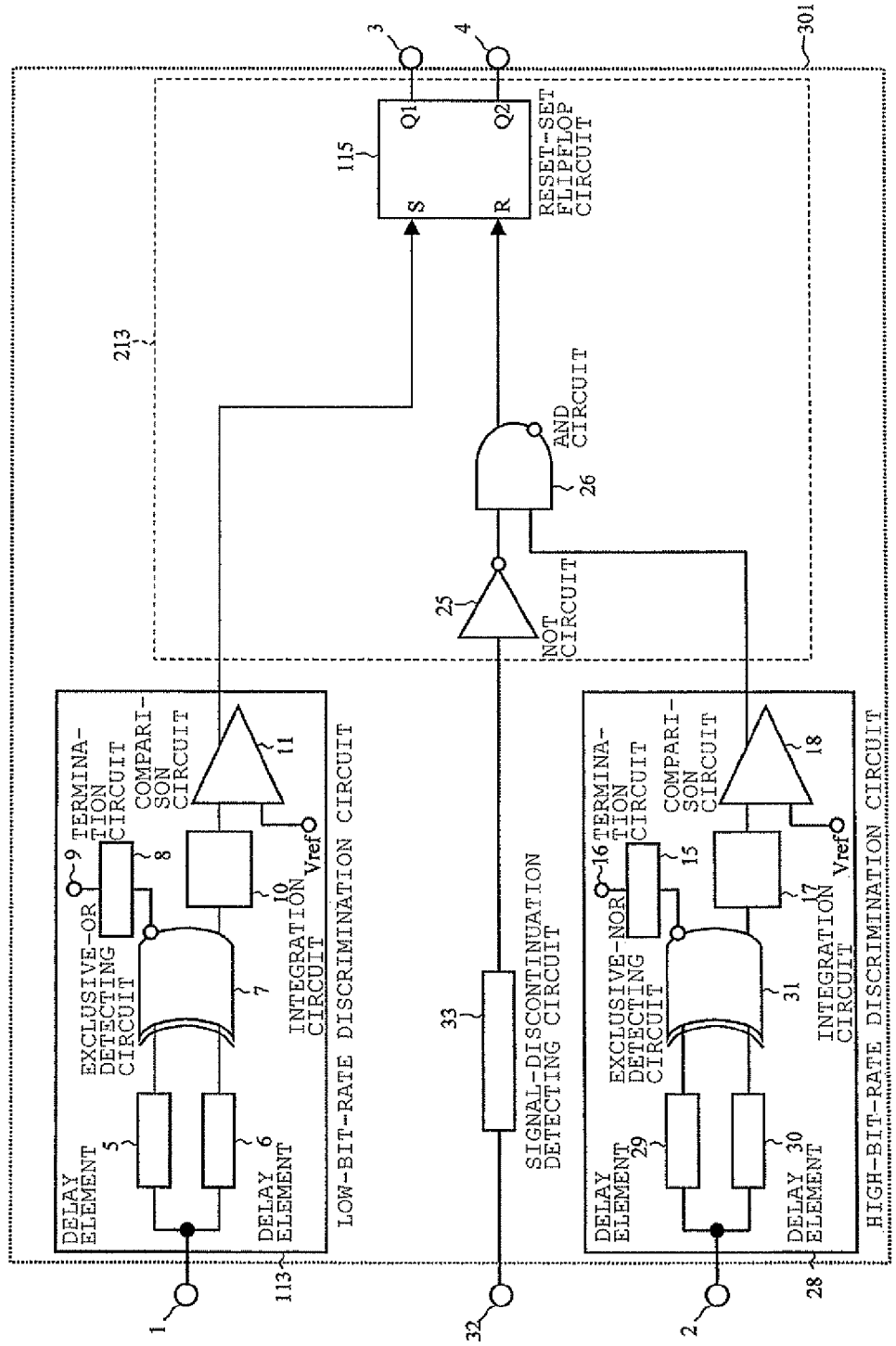
FIG. 31 is a block diagram illustrating a configuration of a bit-rate discrimination apparatus according to the invention.

FIG. 31 is a block diagram illustrating a configuration of a bit-rate discrimination apparatus according to a fifteenth example of the invention. The bit-rate discrimination circuit in FIG. 31 includes a high-bit-rate discrimination circuit 28 and a signal output circuit 213 instead of the high-bit-rate discrimination circuit 114 and the signal output circuit 211 of the bit-rate discrimination apparatus in FIG. 27. The bit-rate discrimination circuit in FIG. 31 further includes a signal-discontinuation detecting circuit 33. The portion that is different from the bit-rate discrimination apparatus in FIG. 27 will be described below.

The bit-rate discrimination apparatus in FIG. 31 further includes the signal-discontinuation detecting circuit 33 that outputs the finite-width pulse signal when at least one of the input signals input to the first input port 1 and second input port 2 is smaller than a predetermined amplitude.

In the bit-rate discrimination apparatus in FIG. 31, the high-bit-rate discrimination circuit 28 that branches the input signal into two signals includes: delay circuits 29 and 30 that generate a delay difference corresponding to the integral multiple of the period of the preamble pattern of the input signal between the two branched signals; an exclusive-NOR circuit 31 to which the two signals having the delay difference are input from the delay circuits 29 and 30, and which produces a consecutive identical signal when the codes of the two signals are identical to each other; the integrator 17 that integrates the consecutive identical signal from the exclusive-NOR circuit 31; and the comparator 18 that makes discrimination using a predetermined threshold and the consecutive identical signal integral value integrated by the integrator 17. For the same reason as the second example, the high-bit-rate discrimination circuit 28 outputs the pulse signal when the input signal is in the non-signal state. The exclusive-NOR circuit 31 is an exclusive negative logical addition circuit.

The signal output circuit 213 includes: the AND circuit 26 to which the pulse signal from the high-bit-rate discrimination circuit 28 and an inverting pulse signal of the pulse signal from the signal-discontinuation detecting circuit 33 are input; and the determination circuit to which the output result of the AND circuit 26 and the pulse signal from the low-bit-rate discrimination circuit 113 are input as the control determining signal, and which produces the control signal and maintains the state of the control signal until the bit-rate of the input signal is changed. For example, the determination circuit is the reset-set flipflop circuit 115.

The bit-rate discrimination apparatus of the fifteenth example is effectively operated, when the preamble pattern included in the high-bit-rate input signal has the integral period patterns, and when the preamble pattern included in the low-bit-rate input signal has the period pattern in which the polarity is inverted at a half of the period and the inverted code of the first-half pattern becomes the second-half pattern.

In a bit-rate discrimination method of the bit-rate discrimination apparatus, the input signal is obtained in front of the gate circuit of the first path and input to the low-bit-rate discrimination circuit 113, the input signal is obtained in front of the gate circuit of the second path and input to the high-bit-rate discrimination circuit 28, the input signal is branched into two signals by the high-bit-rate discrimination circuit 28, and the delay difference corresponding to the integral multiple of the period of the preamble pattern of the input signal is generated between the two branched signals. In the bit-rate discrimination method of the bit-rate discrimination apparatus, the consecutive identical signal is generated to make the discrimination with a predetermined threshold and a value obtained by integrating the consecutive identical signal when the codes of the two signals having the delay difference are identical to each other, the high-bit-rate discrimination circuit 28 outputs a pulse signal when the input signal is in the non-signal state, the input signal is branched into two signals by the low-bit-rate discrimination circuit 113, and the delay difference corresponding to the odd-numbered multiple of a half period of the preamble pattern of the input signal is generated between the two branched signals. In the bit-rate discrimination method of the bit-rate discrimination apparatus, the consecutive identical signal is generated to make the discrimination with a predetermined threshold and a value obtained by integrating the consecutive identical signal when the codes of the two signals having the delay difference are different from each other, the low-bit-rate discrimination circuit 113 outputs the pulse signal having the finite width within the preamble period pattern when the input signal has the low bit-rate, the inverting pulse signal of the pulse signal having the finite width and the pulse signal from the high-bit-rate discrimination circuit 28 are input to the AND circuit 26 when at least one of the input signals input to the first input port 1 and the second input port 2 is smaller than a predetermined amplitude, and the control signal that controls the gate circuit is output based on the output result from the AND circuit 26 and the pulse signal from the low-bit-rate discrimination circuit 113.

The delay circuits 5 and 6 included in the low-bit-rate discrimination circuit 113 are adjusted as described in FIG. 27. The delay circuits 29 and 30 included in the high-bit-rate discrimination circuit 28 are adjusted to the length of the integral multiple of the preamble pattern period of the high-bit-rate signal. For the sake of convenience, FIG. 31 illustrates an example in which the delay circuits 5 and 6 are connected to the low-bit-rate discrimination circuit 113 while the delay circuits 29 and 30 are connected to the high-bit-rate discrimination circuit 28. As described in FIG. 27, it is possible to use only one of the delay circuits of the low-bit-rate discrimination circuit 113. It is possible to use only one of the delay circuits 29 or 30 included in the high-bit-rate discrimination circuit 28 if the delay circuit is equal to the length of the integral multiple of the preamble pattern period.

The time constants of the integrator 10 included in the low-bit-rate discrimination circuit 113 and the integrator 17 included in the high-bit-rate discrimination circuit 28 are set as described in FIG. 27. The integrator may be omitted as described in FIG. 27.

Figure 32:
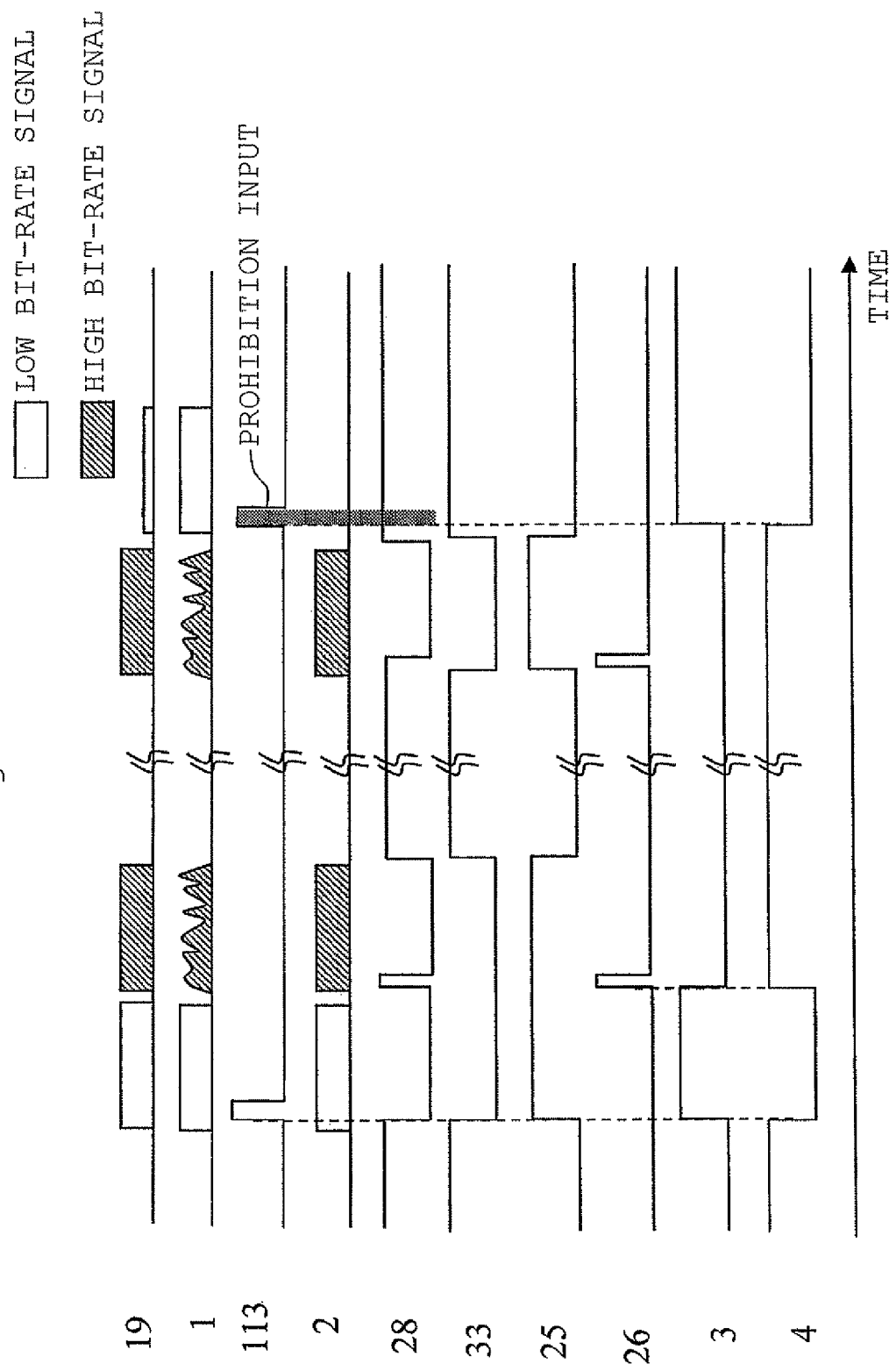
FIG. 32 is a timing chart illustrating an operation of the bit-rate discrimination apparatus according to the invention.

FIG. 32 is a timing chart illustrating an operation of the bit-rate discrimination apparatus in FIG. 31. At this point, the input signal 19 is similar to the input signal 19 in FIG. 28. The numerals in FIG. 32 denote output signal voltage values from the devices denoted by the numerals in FIG. 31. The signals input to the first input port 1 and second input port 2 are similar to those in FIG. 28.

When the signal denoted by the numeral 1 in FIG. 32 is input to the first input port 1, similarly to the description of FIG. 28, the low-bit-rate discrimination circuit 113 outputs the finite-width pulse signal within the preamble pattern time of the low-bit-rate signal. Because the high-bit-rate discrimination circuit 28 includes the exclusive-NOR circuit 31, the high-bit-rate discrimination circuit 28 outputs the pulse signal in the non-signal state. Assuming that $\tau_1$ is the time constant of the integrator 17 of the high-bit-rate discrimination circuit 28 and $\tau_0$ is the time constant of the integrator 10 of the low-bit-rate discrimination circuit 113, the relationship of $\tau_1 < \tau_0$ holds because usually the preamble length is in inverse proportion to the bit-rate.

Similarly to the descriptions of FIGS. 27 and 28, when the pulse signal from the low-bit-rate discrimination circuit 113 and the pulse signal from the high-bit-rate discrimination circuit 28 are input to the reset-set flipflop circuit 115, possibly the reset-set flip-flop circuit 115 becomes the "prohibition input" in which the set signal and the reset signal are simultaneously input, thereby may causing the malfunction. The malfunction is caused by overlapping of two factors, that is, the exclusive-NOR circuit 31 is included in the high-bit-rate discrimination circuit 28, and the low-bit-rate signal is not output because of the input of the low-bit-rate signal whose light-receiving sensitivity is equal to or lower than that of the high-bit-rate signal. Therefore, in the fifteenth example, the third input port 32 is newly provided, and the signal-discontinuation detecting circuit 33 (time constant $\tau_1$) is connected to the third input port 32 to avoid the false discrimination. The signal-discontinuation detecting circuit 33 outputs a voltage when the voltage value is equal to or lower than a certain threshold. The output voltage of the signal-discontinuation detecting circuit 33 is input to the NOT circuit 25, and the output voltage is logically converted into a signal that "the voltage is output only when the signal is output". When the output result of the NOT circuit 25 and the pulse signal from the high-bit-rate discrimination circuit 28 are input to the AND circuit 26, the finite-width pulse signal is output only within the preamble pattern time of the high-bit-rate signal (the numeral 26 in FIG. 32). The pulse signal from the low-bit-rate discrimination circuit 113 in FIG. 32 and the pulse signal from the AND circuit 26 are input to the reset-set flipflop circuit 115 in the way similar to that of the signal output circuit 211 in FIG. 27. That is, the pulse signal from the low-bit-rate discrimination circuit 113 is input to the set terminal S of the reset-set flip-flop circuit 115, and the pulse signal from the AND circuit 26 is input to the reset terminal R of the reset-set flip-flop circuit 115, whereby the outputs of the reset-set flip-flop circuit 115 become the numerals 3 and 4 in FIG. 32. As illustrated in the output results, the bit-rate discrimination apparatus in FIG. 31 can discriminate as to signal having which bit-rate is input. Thus, the bit-rate discrimination apparatus in FIG. 31 avoids the false discrimination attributed to the two factors.

Alternatively, the pulse signal from the low-bit-rate discrimination circuit 113 may be input to the reset terminal R of the reset-set flipflop circuit 115, and the pulse signal from the AND circuit 26 may be input to the set terminal S of the reset-set flipflop circuit 115. In this manner, the similar effect can be obtained.

Sixteenth Example

Figure 33:
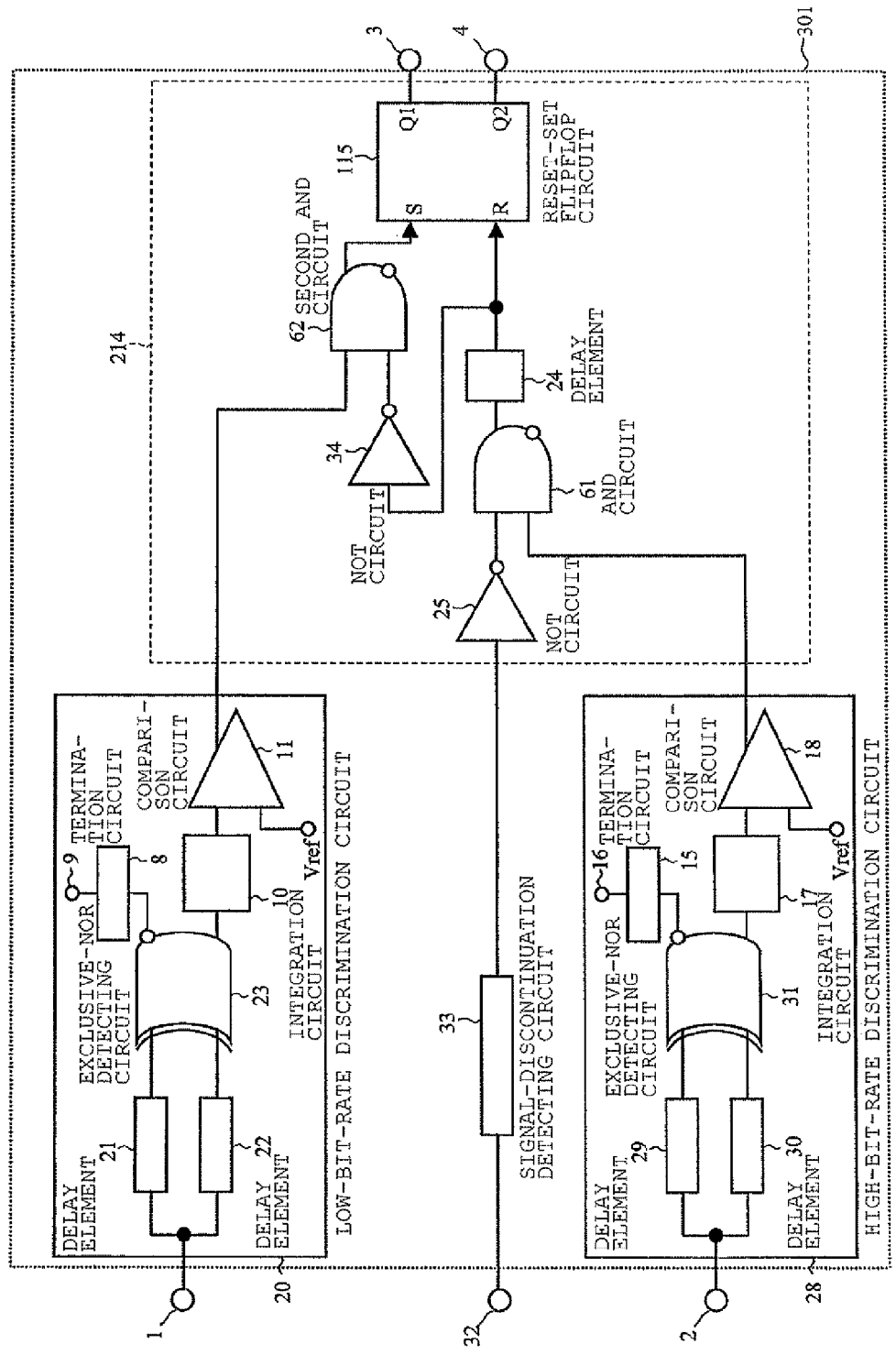
FIG. 33 is a block diagram illustrating a configuration of a bit-rate discrimination apparatus according to the invention.

FIG. 33 is a block diagram illustrating a configuration of a bit-rate discrimination apparatus according to a sixteenth example of the invention. The bit-rate discrimination circuit in FIG. 33 includes the low-bit-rate discrimination circuit 20 in FIG. 29 and the high-bit-rate discrimination circuit 28 and signal output circuit 214 in FIG. 31 instead of the low-bit-rate discrimination circuit 113, high-bit-rate discrimination circuit 114, and signal output circuit 211 of the bit-rate discrimination apparatus in FIG. 27. The bit-rate discrimination circuit in FIG. 33 further includes the signal-discontinuation detecting circuit 33 in FIG. 31. The portion that is different from that of the bit-rate discrimination apparatus in FIG. 27 will be described below.

Each of the low-bit-rate discrimination circuit 20 and the high-bit-rate discrimination circuit 28 outputs the pulse signal when the input signal is in the non-signal state.

The signal output circuit 214 includes: a first AND circuit 61 to which the pulse signal from the high-bit-rate discrimination circuit 28 and the inverting pulse signal of the pulse signal from the signal-discontinuation detecting circuit 33 are input; a second AND circuit 62 to which the output result from the first AND circuit 61 and the pulse signal from the low-bit-rate discrimination circuit 20 are input; and the determination circuit to which the output result of the first AND circuit 61 and the output result from the second AND circuit 62 are input as the control determining signal, and which produces the control signal and maintains a state of the control signal until the bit-rate of the input signal is changed. For example, the determination circuit is the reset-set flipflop circuit 115.

The bit-rate discrimination apparatus of the sixteenth example is effectively operated when the preamble pattern included in each of the high-bit-rate and low-bit-rate input signals has the integral number of period patterns.

In a bit-rate discrimination method of the bit-rate discrimination apparatus, the input signal is obtained in front of the gate circuit of the first path and input to the low-bit-rate discrimination circuit 20, the input signal is obtained in front of the gate circuit of the second path and input to a high-bit-rate discrimination circuit 28, the input signal is branched into two signals by each of the low-bit-rate discrimination circuit 20 and the high-bit-rate discrimination circuit 28, and the delay difference corresponding to the integral multiple of the period of the preamble pattern of the input signal is generated between the two branched signals. In the bit-rate discrimination method of the bit-rate discrimination apparatus, the consecutive identical signal is generated to make the discrimination with a predetermined threshold and a value obtained by integrating the consecutive identical signal when the codes of the two signals having the delay difference are identical to each other, each of the low-bit-rate discrimination circuit 20 and the high-bit-rate discrimination circuit 28 outputs the pulse signal when the input signal is in the non-signal state, the inverting pulse signal of the pulse signal having the finite width and the pulse signal from the high-bit-rate discrimination circuit are input to the first AND circuit 61 when at least one of the input signals of the first path and the second path is smaller than a predetermined amplitude, the inverting output result from the first AND circuit 61 and the pulse signal from the low-bit-rate discrimination circuit 20 are input to the second AND circuit 62, and the control signal that controls the gate circuit is output based on the output result from the first AND circuit 61 and the output result from the second AND circuit 62.

The delay circuits 21 and 22 included in the low-bit-rate discrimination circuit 20 and the delay circuits 29 and 30 included in the high-bit-rate discrimination circuit 28 are adjusted as described in FIGS. 29 and 31. As described in FIGS. 29 and 31, only one of the delay circuits may be provided. The time constants of the integrator 10 included in the low-bit-rate discrimination circuit 20 and the integrator 17 included in the high-bit-rate discrimination circuit 28 are set as described in FIG. 27. As described in FIG. 27, the integrator may be omitted.

Figure 34:
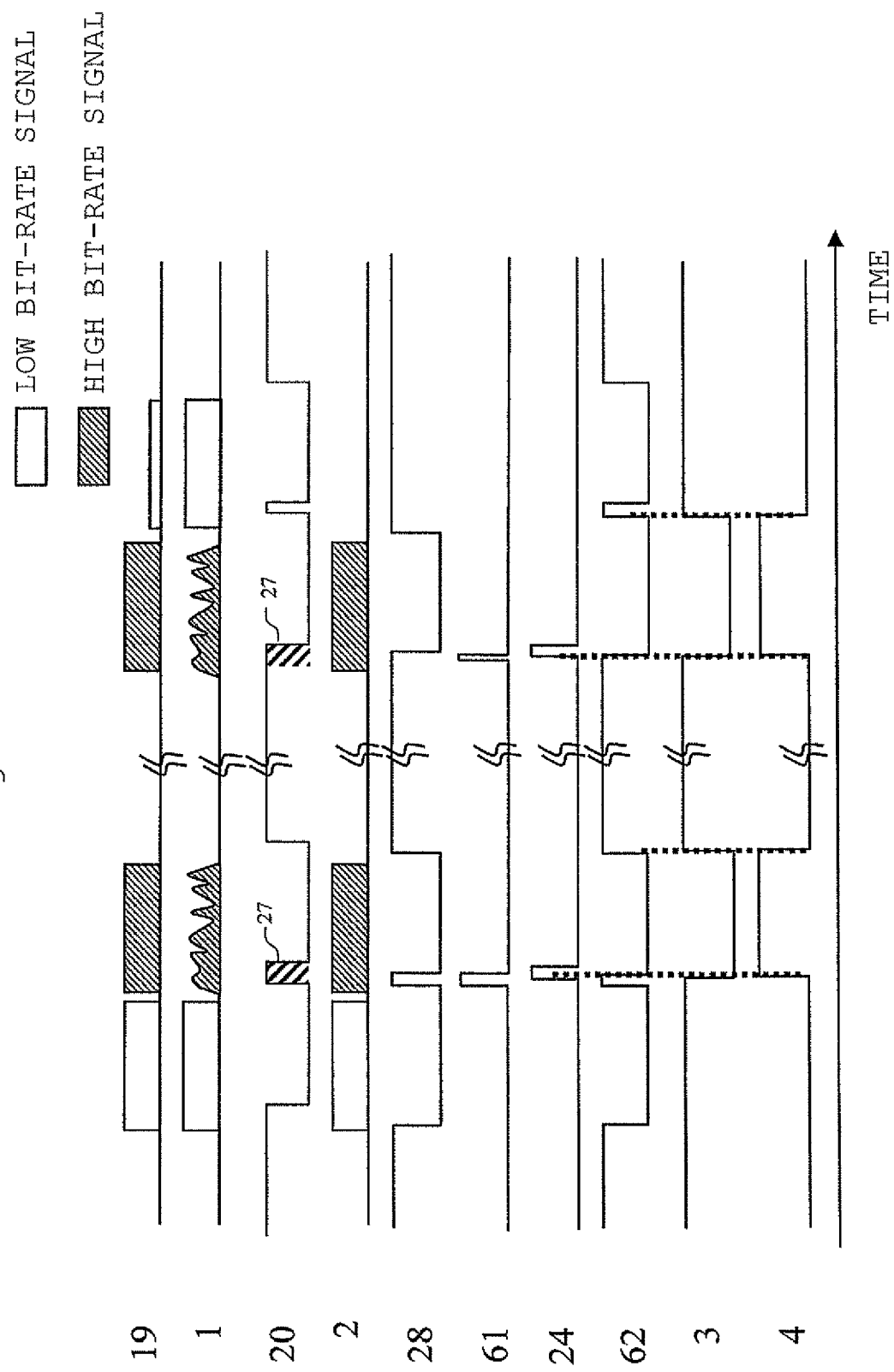
FIG. 34 is a timing chart illustrating an operation of the bit-rate discrimination apparatus according to the invention.

FIG. 34 is a timing chart illustrating an operation of the bit-rate discrimination apparatus in FIG. 33. At this point, the input signal 19 is similar to the input signal 19 in FIG. 28. The numerals in FIG. 34 denote output signal voltage values from the devices denoted by the numerals in FIG. 33. The signals input to the first input port 1 and second input port 2 are similar to those in FIG. 28.

Because the low-bit-rate discrimination circuit 20 and the high-bit-rate discrimination circuit 28 include the exclusive-NOR circuit 23 and the exclusive-NOR circuit 31, respectively, the low-bit-rate discrimination circuit 20 and the high-bit-rate discrimination circuit 28 output the pulse signals in the non-signal state. When the signal denoted by the numeral 1 in FIG. 32 is input to the first input port 1, similarly to the description of FIG. 30, possibly the low-bit-rate discrimination circuit 20 outputs the false output 27.

As is clear from the timing chart in FIG. 34, when the logically inverted signal of the signal-discontinuation detecting circuit 33 and the discrimination result from the high-bit-rate discrimination circuit 28 are input to the first AND circuit 61, the finite-width pulse signal is output only within the preamble pattern time of the high-bit-rate signal as described in FIG. 33. The output result from the low-bit-rate discrimination circuit 20 and the inverting output result from the first AND circuit 61 are input to the second AND circuit 62. That the output result from the second AND circuit 62 and the output result from the first AND circuit 61 are input to the reset-set flipflop circuit 115 is synonymous with the input of the signal input pattern in FIG. 30 to the reset-set flip-flop circuit 115, and the bit-rate discrimination apparatus in FIG. 33 can discriminate as to signal having which bit-rate is input when the priority is placed on the output result of the first AND circuit 61 similarly to the description of FIG. 30.

Alternatively, the output result from the second AND circuit 62 may be input to the reset terminal R of the reset-set flipflop circuit 115, and the output result from the first AND circuit 61 may be input to the set terminal S of the reset-set flipflop circuit 115. In this manner, the similar effect can be obtained.

Seventeenth Example

In the thirteenth to sixteenth examples, because the waveform of the high-bit-rate signal input to the first input port 1 collapses, the exclusive-NOR circuit 23 discriminates the consistency by inputting the smoothed signal to the exclusive-NOR circuit 23 and therefore possibly to output the false output 27 within the preamble pattern time of the high-bit-rate signal. Therefore, the bit-rate discrimination apparatus of the thirteenth to sixteenth examples is configured to avoid the problem.

However, not only the exclusive-OR circuit 7 and exclusive-NOR circuit 23 included in the low-bit-rate discrimination circuit and high-bit-rate discrimination circuit, but also the input signal whose waveform collapses possibly generates the false output from the exclusive-OR circuit 14 and exclusive-NOR circuit 31. The method for avoiding the false discrimination even if the false output is output out of the preamble pattern time will be described below.

Figure 35:
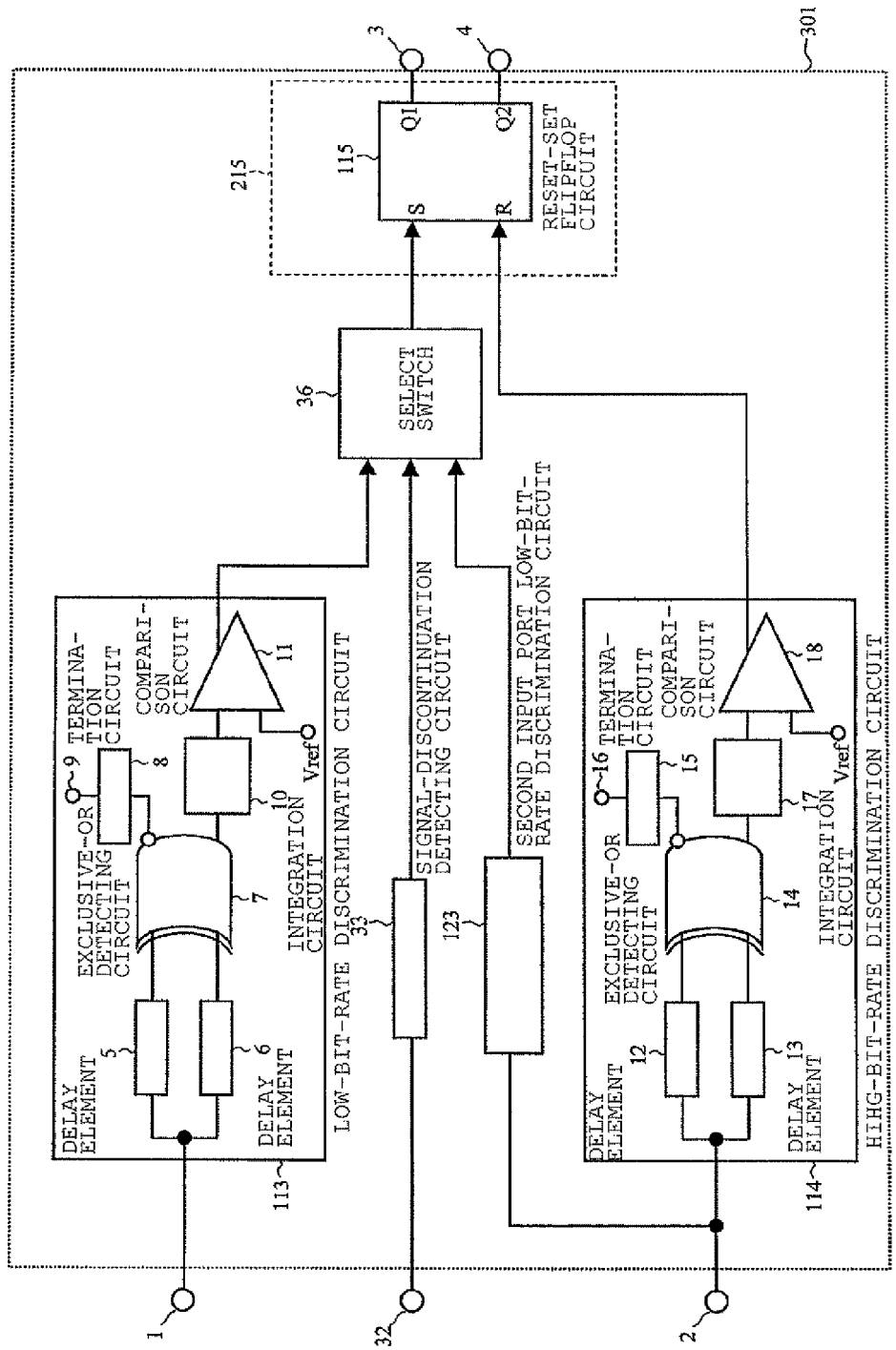
FIG. 35 is a block diagram illustrating a configuration of a bit-rate discrimination apparatus according to the invention.

FIG. 35 is a block diagram illustrating a configuration of a bit-rate discrimination apparatus according to a seventeenth example of the invention. The bit-rate discrimination circuit in FIG. 35 includes a signal output circuit 215 instead of the signal output circuit 211 of the bit-rate discrimination apparatus in FIG. 27. The bit-rate discrimination circuit in FIG. 35 also includes the signal-discontinuation detecting circuit 33 in FIG. 31. The bit-rate discrimination circuit in FIG. 35 also includes a second input port low-bit-rate discrimination circuit 123 and a select switch 36. The portion that is different from that of the bit-rate discrimination apparatus in FIG. 27 will be described below.

The second input port low-bit-rate discrimination circuit 123 is connected to the second input port 2 in parallel with the high-bit-rate discrimination circuit 114, and discriminates whether the bit-rate of the input signal is identical to the set low bit-rate. The configuration of the second input port low-bit-rate discrimination circuit 123 is similar to that of the low-bit-rate discrimination circuit 113 in FIG. 27, and the second input port low-bit-rate discrimination circuit 123 outputs the finite-width pulse signal within the preamble period pattern when the input signal has the low bit-rate. In FIG. 35, the internal configuration of the second input port low-bit-rate discrimination circuit 123 is omitted.

The select switch 36 selects the pulse signal of the low-bit-rate discrimination circuit 113 or the pulse signal of the second input port low-bit-rate discrimination circuit 123 using the pulse signal of the signal-discontinuation detecting circuit 33. A toggle switch can be cited as an example of the select switch 36.

The signal output circuit 215 includes the determination circuit to which the pulse signal selected by the select switch 36 and the pulse signal from the high-bit-rate discrimination circuit 114 are input as the control determining signal, and which produces the control signal and maintains the state of the control signal until the bit-rate of the input signal is changed. For example, the determination circuit is the reset-set flipflop circuit 115.

Figure 36:
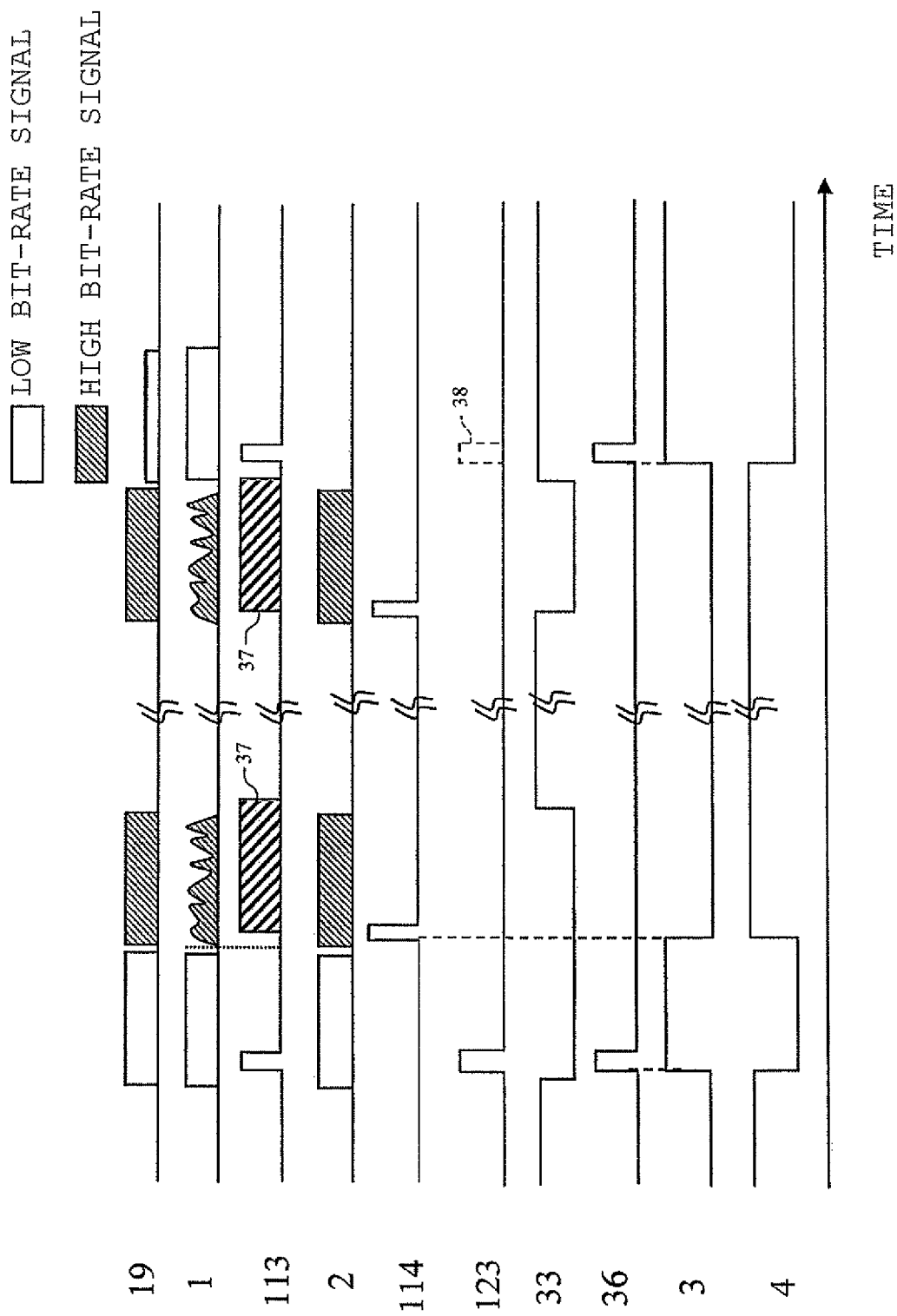
FIG. 36 is a timing chart illustrating an operation of the bit-rate discrimination apparatus according to the invention.

FIG. 36 is a timing chart illustrating an operation of the bit-rate discrimination apparatus in FIG. 35. At this point, the input signal 19 is similar to the input signal 19 in FIG. 28. The numerals in FIG. 36 denote output signal voltage values from the devices denoted by the numerals in FIG. 35. The signals input to the first input port 1 and second input port 2 are similar to those in FIG. 28.

As described in FIG. 28, the signals denoted by the numerals 1 and 2 in FIG. 36 are input to the first input port 1 and the second input port 2, respectively. The signal-discontinuation detecting circuit 33 (time constant $\tau_2$) is connected to the third input port 32 and outputs the finite-width pulse signal when the voltage that is equal to or lower than the light-receiving sensitivity of the high-bit-rate signal is input.

When the signal denoted by the numeral 1 in FIG. 36 is input to the first input port 1, the low-bit-rate discrimination circuit 113 outputs the finite-width pulse signal within the preamble pattern time of the low-bit-rate signal, and possibly the false output 37 is output due to the collapsed waveform of the high-bit-rate signal. When the signal denoted by the numeral 2 in FIG. 36 is input to the first input port 2, the high-bit-rate discrimination circuit 114 outputs the finite-width pulse signal within the preamble pattern time of the high-bit-rate signal. Although originally the second input port low-bit-rate discrimination circuit 123 installed at the second input port 2 outputs a finite-width pulse 38, the second input port low-bit-rate discrimination circuit 123 does not output the pulse 38 because of the input of the low-bit-rate signal whose light-receiving sensitivity is equal to or lower than that of the high-bit-rate signal. The output of the low-bit-rate discrimination circuit 113, the output of the second input port low-bit-rate discrimination circuit 123, and the output of the signal-discontinuation detecting circuit 33 are input to the select switch 36. Based on the output voltage of the signal-discontinuation detecting circuit 33, the select switch 36 selects one of the output of the low-bit-rate discrimination circuit 113 and the output of the second input port low-bit-rate discrimination circuit 123. Specifically, the select switch 36 selects the output of the low-bit-rate discrimination circuit 113 when the voltage value from the signal-discontinuation detecting circuit 33 is equal to or higher than a certain threshold, and selects the output of the second input port low-bit-rate discrimination circuit 123 when the voltage value from the signal-discontinuation detecting circuit 33 is lower than the threshold. The output of the low-bit-rate discrimination circuit 113 or the output of the second input port low-bit-rate discrimination circuit 123 is selected depending on the output voltage from the signal-discontinuation detecting circuit 33, thereby avoiding the false discrimination.

The output result from the select switch 36 is input to the set terminal S of the reset-set flipflop circuit 115, and the discrimination result from the high-bit-rate discrimination circuit 114 is input to the reset terminal R of the reset-set flipflop circuit 115, whereby the outputs of the reset-set flipflop circuit 115 become the numerals 3 and 4 in FIG. 36. As illustrated in the output results, the bit-rate discrimination apparatus in FIG. 35 can discriminate as to signal having which bit-rate is input. Therefore, the bit-rate discrimination apparatus in FIG. 35 avoids the false discrimination.

Alternatively, the output result from the select switch 36 may be input to the reset terminal R of the reset-set flipflop circuit 115, and the discrimination result from the high-bit-rate discrimination circuit 114 may be input to the set terminal S of the reset-set flipflop circuit 115. In this manner, the similar effect can be obtained. In the bit-rate discrimination apparatus in FIG. 35, the low-bit-rate discrimination circuit 113 and the high-bit-rate discrimination circuit 114 are used. However, the seventeenth example is independent of the configuration of the bit-rate discrimination apparatus, and the similar effect can be obtained even if the low-bit-rate discrimination circuit 20 in FIG. 29 and the high-bit-rate discrimination circuit 28 in FIG. 31 are used. As to the second input port low-bit-rate discrimination circuit 123, the similar effect is obtained even if the second input port low-bit-rate discrimination circuit 123 includes not the exclusive-OR circuit 7 but the exclusive-NOR circuit 23.

Eighteenth Example

In the thirteenth to seventeenth examples, a signal having which bit-rate is input is discriminated by the total discrimination of the discrimination results from the bit-rate discrimination circuits installed in the first input port 1 and the second input port 2, respectively. In an eighteenth example, the false discrimination can be avoided even if the bit-rate discrimination circuit that deals with each bit-rate is installed only in the second input port. The description of the configurations of the thirteenth to seventeenth examples is omitted.

Figure 37:
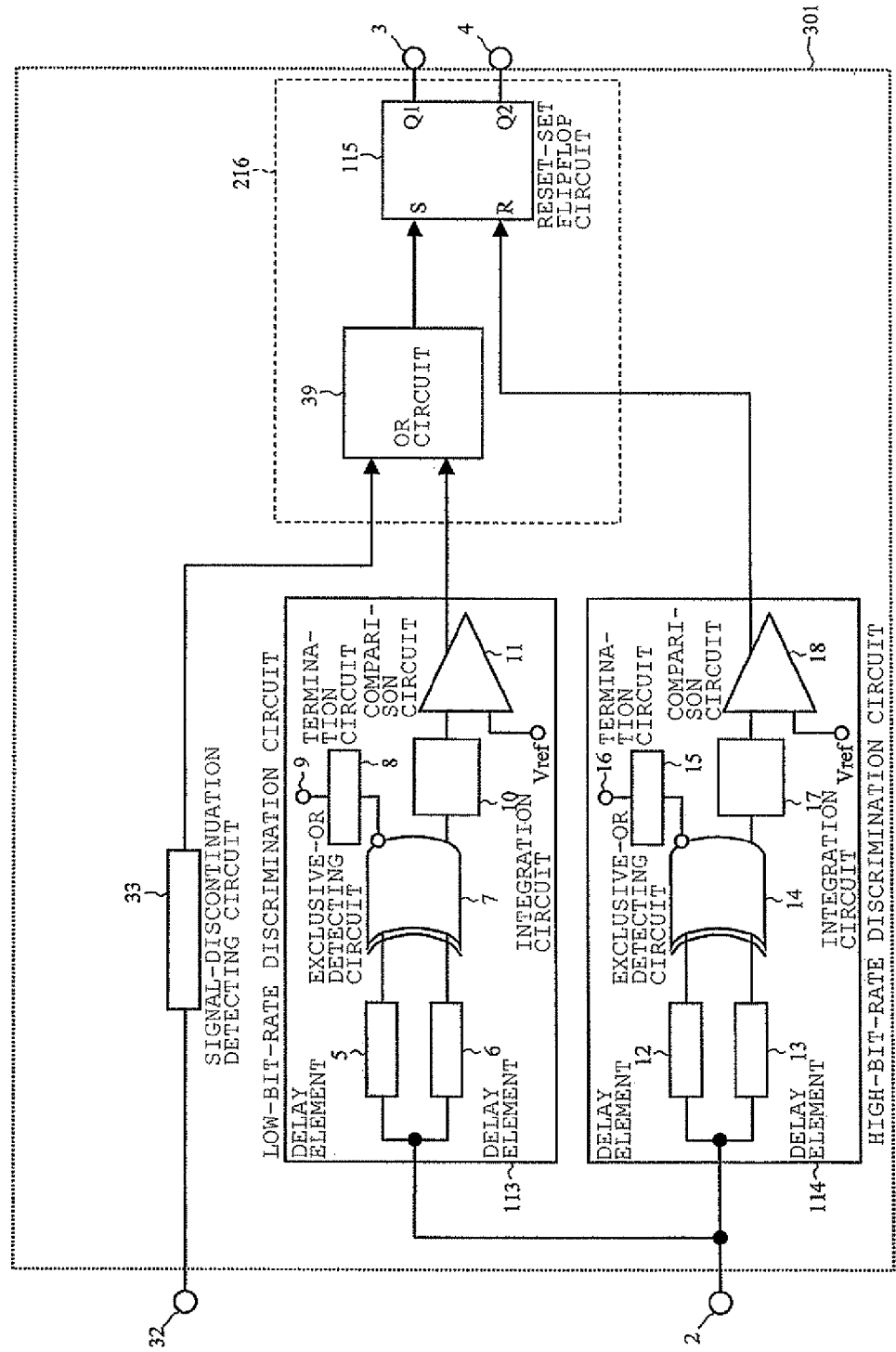
FIG. 37 is a block diagram illustrating a configuration of a bit-rate discrimination apparatus according to the invention.

FIG. 37 is a block diagram illustrating a configuration of a bit-rate discrimination apparatus according to the eighteenth example of the invention. The bit-rate discrimination apparatus of the eighteenth example includes a control unit that outputs a control signal, the control signal controlling the gate circuit such that the low-bit-rate signal in the input signal is passed through the first path and the high-bit-rate signal faster than the low-bit-rate signal in the input signal is passed through the second path, the input signal being input to the first path and the second path, the gate circuit that passes or cuts the signal being connected to each of the first path and the second path. The control unit includes: the second input port 2 that obtains the input signal in front of the gate circuit of the second path; the low-bit-rate discrimination circuit 113 that is connected to the second input port 2 to discriminate whether the bit-rate of the input signal is identical to the set low bit-rate; the high-bit-rate discrimination circuit 114 that is connected to the second input port 2 in parallel with the low-bit-rate discrimination circuit 113, and discriminates whether the bit-rate of the input signal is identical to the set high bit-rate; the signal-discontinuation detecting circuit 33 that outputs the pulse signal having the finite width when at least one of the input signals input to the first input port and the second input port is smaller than a predetermined amplitude; and a signal output circuit 216 that includes the first control port 3 connected to the gate circuit of the first path and the second control port 4 connected to the gate circuit of the second path, and outputs the control signal from each of the first control port 3 and the second control port 4 based on discrimination result of each of the high-bit-rate discrimination circuit 114 and the low-bit-rate discrimination circuit 113.

The low-bit-rate discrimination circuit 113 that branches the input signal into two signals includes: the delay circuits 5 and 6 that generate the predetermined delay difference based on the preamble pattern of the input signal between the two branched signals; the exclusive-OR circuit 7 to which the two signals having the delay difference are input from the delay circuits 5 and 6, and which produces the consecutive identical signal when the codes of the two signals are different from each other; the integrator 10 that integrates the consecutive identical signal from the exclusive-OR circuit 7; and the comparator 11 that makes the discrimination with a predetermined threshold and the consecutive identical signal integral value integrated by the integrator 10. The low-bit-rate discrimination circuit 113 outputs the finite-width pulse signal within the preamble period pattern when the input signal has the low bit-rate. The high-bit-rate discrimination circuit 114 that branches the input signal into two signals includes: the delay circuits 12 and 13 that generate the predetermined delay difference based on the preamble pattern of the input signal between the two branched signals; the exclusive-OR circuit 14 to which the two signals having the delay difference are input from the delay circuits 12 and 13, and which produces the consecutive identical signal when the codes of the two signals are different from each other; the integrator 17 that integrates the consecutive identical signal from the exclusive-OR circuit 14; and the comparator 18 that makes the discrimination with a predetermined threshold and the consecutive identical signal integral value integrated by the integrator 17. The high-bit-rate discrimination circuit 114 outputs the finite-width pulse signal within the preamble period pattern when the input signal has the high bit-rate. At this point, the predetermined delay difference is determined by the preamble pattern of the input signal. When the preamble pattern has the pattern in which the polarity is inverted at a half of the period and the inverted code of the first-half pattern becomes the second-half pattern, the predetermined delay difference is an amount corresponding to the odd-numbered multiple of a half period of the preamble pattern. On the other hand, when the preamble pattern has the integral period patterns, the predetermined delay difference is an amount corresponding to the integral multiple of the preamble pattern period.

The signal output circuit 216 includes: an OR circuit 39 to which the pulse signal from the signal-discontinuation detecting circuit 33 and the pulse signal from the low-bit-rate discrimination circuit 113 are input; and the determination circuit to which the output result of the OR circuit 39 and the pulse signal from the high-bit-rate discrimination circuit 114 are input as the control determining signal, and which produces the control signal and maintains a state of the control signal until the bit-rate of the input signal is changed. For example, the determination circuit is the reset-set flipflop circuit 115.

Figure 38:
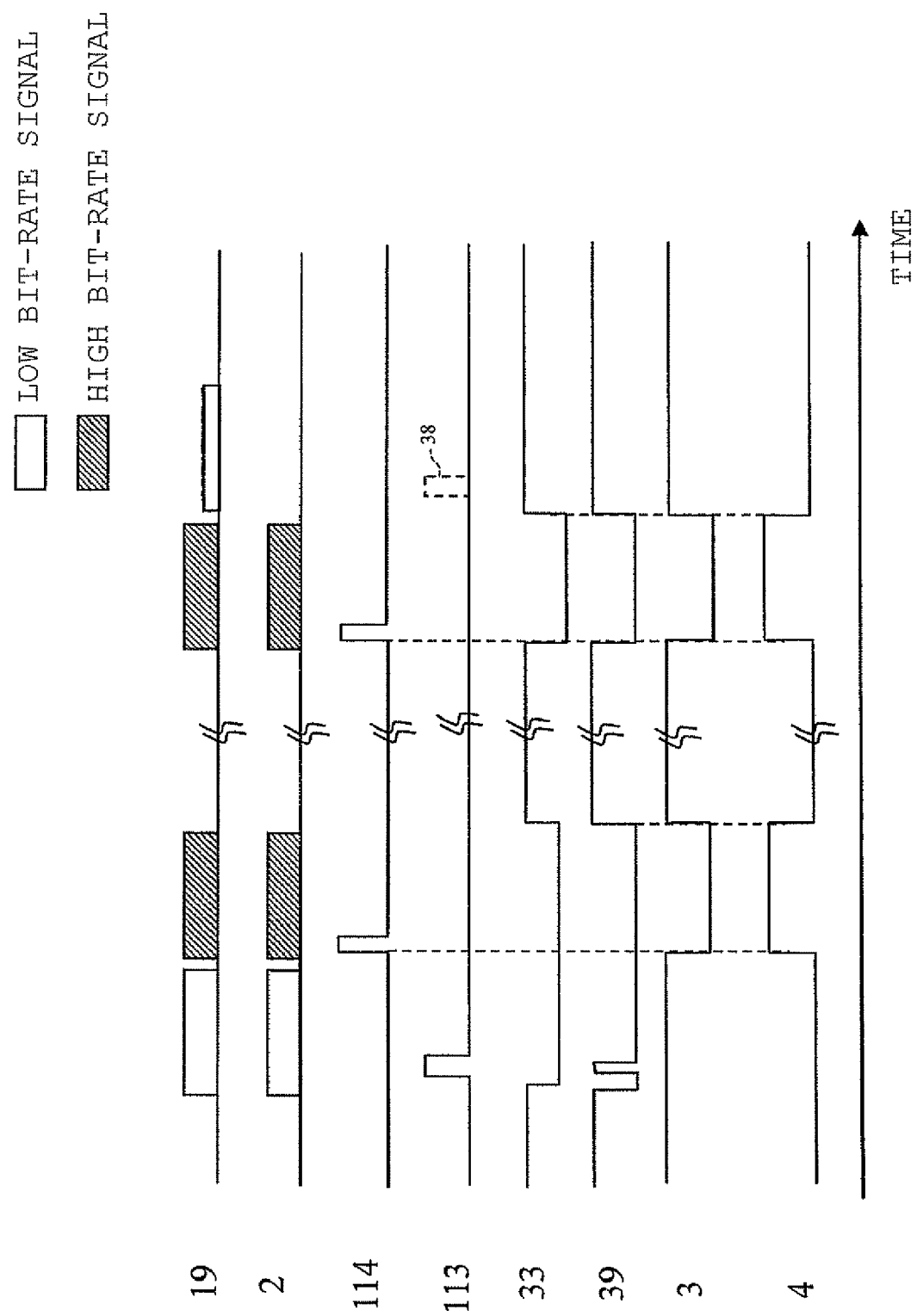
FIG. 38 is a timing chart illustrating an operation of the bit-rate discrimination apparatus according to the invention.

FIG. 38 is a timing chart illustrating an operation of the bit-rate discrimination apparatus in FIG. 37. At this point, the input signal 19 is similar to the input signal 19 in FIG. 28. The numerals in FIG. 38 denote output signal voltage values from the devices denoted by the numerals in FIG. 37. The signals input to the first input port 1 and second input port 2 are similar to those in FIG. 28.

Similarly to the description in FIG. 28, because the low-bit-rate signal is not output in the input signal input to the second input port 2, the low-bit-rate discrimination circuit 113 does not output the pulse 38. The signal-discontinuation detecting circuit 33 (time constant $\tau_1$) is connected to the third input port 32, and outputs the finite-width pulse signal when the voltage signal that is equal to or lower than the light-receiving sensitivity of the high-bit-rate signal is input. The discrimination result from the low-bit-rate discrimination circuit 113 and the output result from the signal-discontinuation detecting circuit 33 are output to the OR circuit 39, the output result from the OR circuit 39 is input to the set terminal S of the reset-set flipflop circuit 115, and the discrimination result from the high-bit-rate discrimination circuit 114 is input to the reset terminal R of the reset-set flipflop circuit 115, whereby the outputs of the reset-set flipflop circuit 115 become the numerals 3 and 4 in FIG. 38. As illustrated in the output results, the bit-rate discrimination apparatus in FIG. 37 can discriminate as to signal having which bit-rate is input.

Alternatively, the output result from the OR circuit 39 may be input to the reset terminal R of the reset-set flipflop circuit 115, and the discrimination result from the high-bit-rate discrimination circuit 114 may be input to the set terminal S of the reset-set flipflop circuit 115. In this manner, the same effect is obtained. In the bit-rate discrimination apparatus in FIG. 35, the low-bit-rate discrimination circuit 113 and the high-bit-rate discrimination circuit 114 are used. However, the eighteenth example is independent of the configuration of the bit-rate discrimination apparatus, and the similar effect can be obtained even if the low-bit-rate discrimination circuit 20 in FIG. 29 and the high-bit-rate discrimination circuit 28 in FIG. 31 are used.

The low-bit-rate discrimination circuit 113 and high-bit-rate discrimination circuit 114, which include the exclusive-OR circuits, are used in the eighteenth example. Alternatively, the low-bit-rate discrimination circuit 20 and high-bit-rate discrimination circuit 28, which include the exclusive-NOR circuits, may be used according to the preamble pattern of the input signal. Specifically, the low-bit-rate discrimination circuit and the high-bit-rate discrimination circuit include the exclusive-OR circuits when the preamble pattern of the input signal has the period pattern in which the polarity is inverted at a half of the period and the inverted code of the first-half pattern becomes the second-half pattern, and the low-bit-rate discrimination circuit and the high-bit-rate discrimination circuit include the exclusive-NOR circuits when the preamble pattern of the input signal has the integral period patterns. For example, the low-bit-rate discrimination circuit 113 and the high-bit-rate discrimination circuit 28 are adopted when the preamble pattern included in the high-bit-rate input signal has the integral period patterns while the preamble pattern included in the low-bit-rate input signal has the period pattern in which the polarity is inverted at a half of the period and the inverted code of the first-half pattern becomes the second-half pattern.

Nineteenth Example

The output signal from the reset-set flipflop circuit 115 of the bit-rate discrimination apparatus of the thirteenth to eighteenth examples is used as the control signal, and the gate circuit is opened and closed by the control signal, which allows a configuration of the signal discriminator that individually outputs signals from different output ports in each bit-rate.

Figure 39:
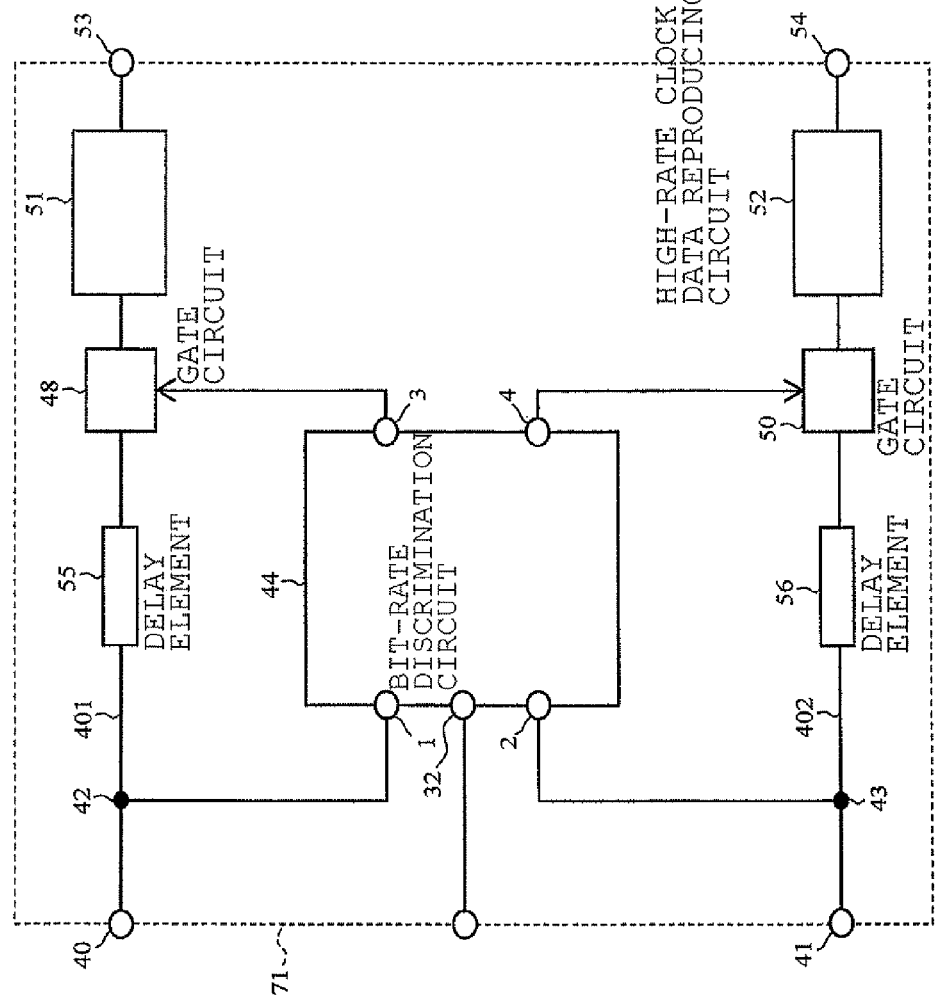
FIG. 39 is a block diagram illustrating a configuration of a signal discriminator according to the invention.

FIG. 39 is a block diagram illustrating a configuration of a signal discriminator according to a nineteenth example of the invention. A signal discriminator 71 of the nineteenth example includes a first path 401 in which a gate circuit 48 that passes or cuts the signal and a clock data reproducing circuit 51 that deals with the low bit-rate are series-connected; a second path 402 in which a gate circuit 50 that passes or cuts the signal and a clock data reproducing circuit 52 that deals with the high bit-rate faster than the low bit-rate are series-connected; and the bit-rate discrimination apparatus 44 of the thirteenth to eighteenth examples that controls the gate circuits 48 and 50 such that the low-bit-rate signal is passed through the first path 401 while the high-bit-rate signal is passed through the second path 402 in the time-division-multiplexed identical input signals input to both the first path 401 and the second path 402. It is assumed that the gate circuits 48 and 50 are opened when a certain voltage is input.

The bit-rate discrimination apparatus 44 in FIG. 39 is one of the bit-rate discrimination circuits of the thirteenth to eighteenth examples. However, the third input port 32 is not necessary when the bit-rate discrimination apparatus in FIG. 27 or FIG. 29 is used. A signal branching element 42 is not necessary when the bit-rate discrimination apparatus in FIG. 37 is used. Which bit-rate discrimination apparatus of the thirteenth to sixteenth examples is used as the bit-rate discrimination apparatus 44 is determined depending on which preamble pattern of the thirteenth to sixteenth examples is included in the input signal.

It is assumed that the delay circuits 55 and 56 substantially provide delays of the time constant $\tau_0$ of the integrator 10 included in the low-bit-rate discrimination circuit and the time constant $\tau_1$ of the integrator 17 included in the high-bit-rate discrimination circuit, respectively. Therefore, timings of the input signal passed through the first path 401 and the control signal input to the gate circuit 48 are matched with each other, and timings of the input signal passed through the second path 402 and the control signal input to the gate circuit 50 are matched with each other, which allows only the input signal having the desired bit-rate to be passed. The gate circuit 48 and the gate circuit 50 can be omitted when the time constants of the gate circuit 48 and gate circuit 50 are substantially equal to those of the delay circuits 55 and 56.

Figure 40:
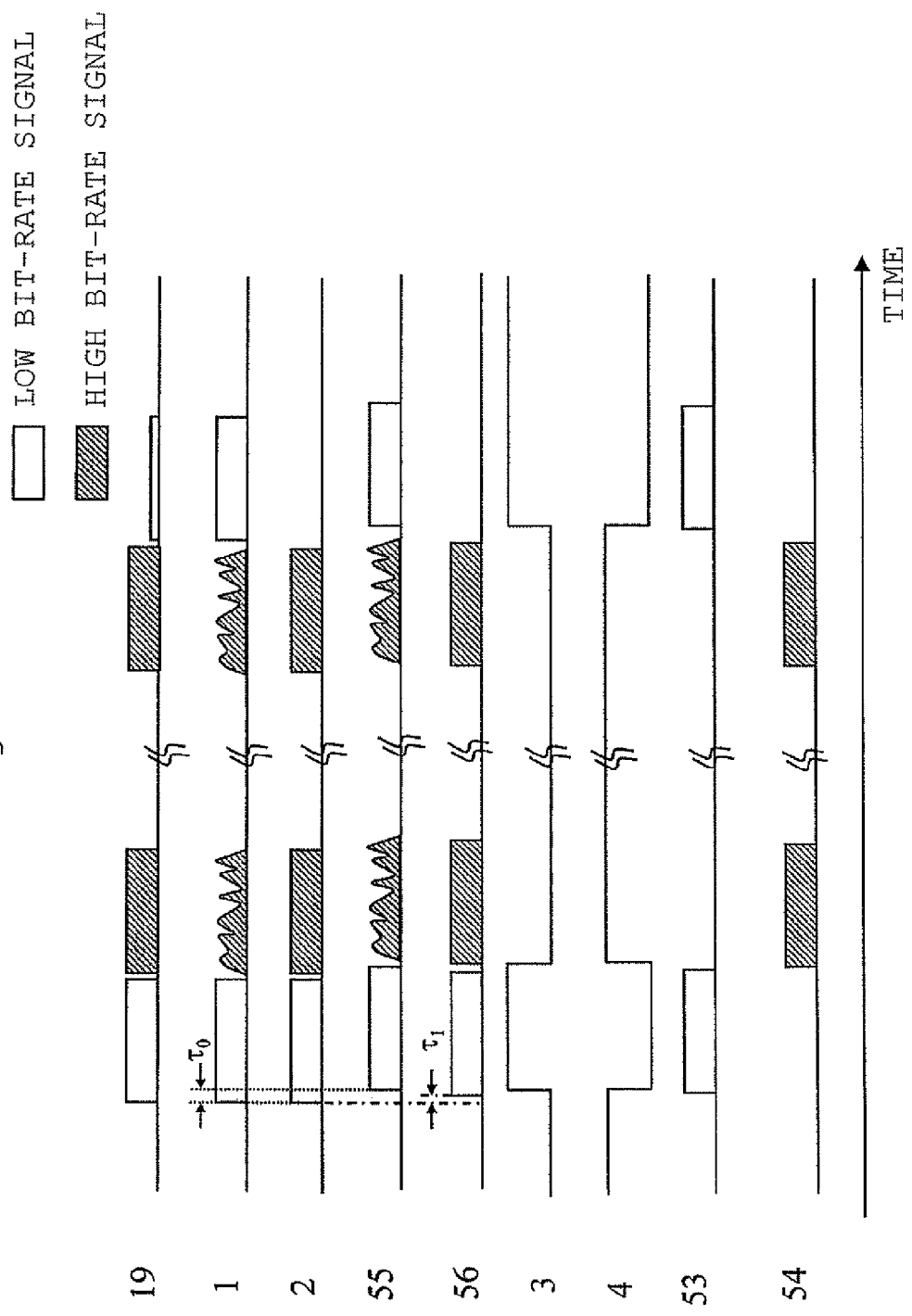
FIG. 40 is a timing chart illustrating an operation of the signal discriminator according to the invention.

FIG. 40 is a timing chart illustrating an operation of the signal discrimination 71 in FIG. 39. It is assumed that the bit-rate 19 to be discriminated is identical to that in FIG. 28. It is assumed that the signals input to the signal input terminals 40 and 41 are the input signals input to the first input port 1 and second input port 2 in FIG. 28.

When the input signal is input to the bit-rate discrimination apparatus 44, the control signals are output from the first control port 3 and the second control port 4 as described in the thirteenth to eighteenth examples.

As is clear from FIG. 40, when the gate circuits 48 and 50 are opened and closed by the control signals from the bit-rate discrimination apparatus 44, the low-bit-rate signal can be output from the signal output terminal 53, and the high-bit-rate signal can be output from the signal output terminal 54. In FIG. 39, the output result from the bit-rate discrimination apparatus of the fifteenth or seventeenth example is used as the output result of the bit-rate discrimination apparatus 44. The similar effect can be obtained even if the output result from the bit-rate discrimination apparatus of the thirteenth, fourteenth, sixteenth, or eighteenth example is used as the output result of the bit-rate discrimination apparatus 44.

Figure 41:
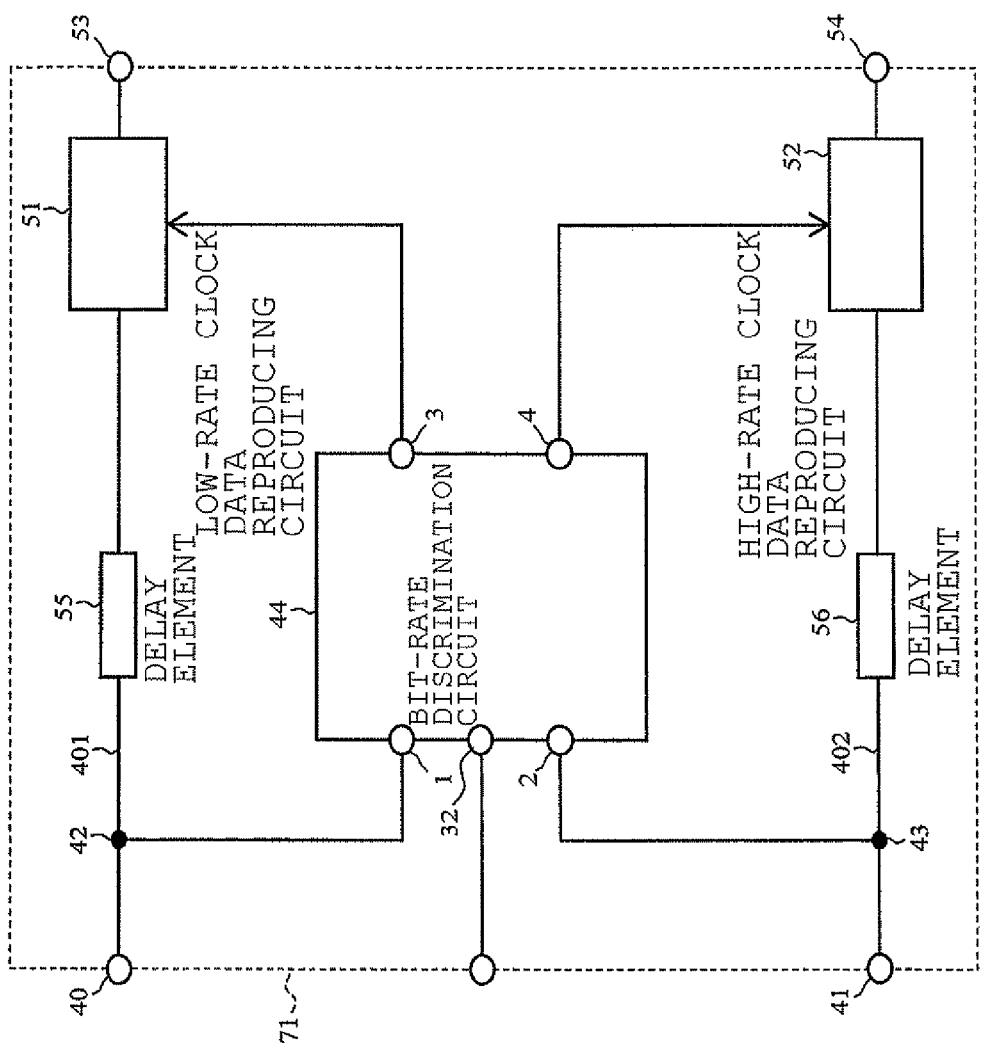
FIG. 41 is a block diagram illustrating a configuration of the signal discriminator according to the invention.

FIG. 39 illustrates the configuration of the signal discriminator 71 by way of example. For example, as illustrated in FIG. 41, the similar effect is obtained even if the gate circuits 48 and 50 are provided in the low bit-rate clock and data recovery circuit (CDR) 51 and the high bit-rate clock and data recovery circuit (CDR) 52, respectively.

Twentieth Example

Figure 42:
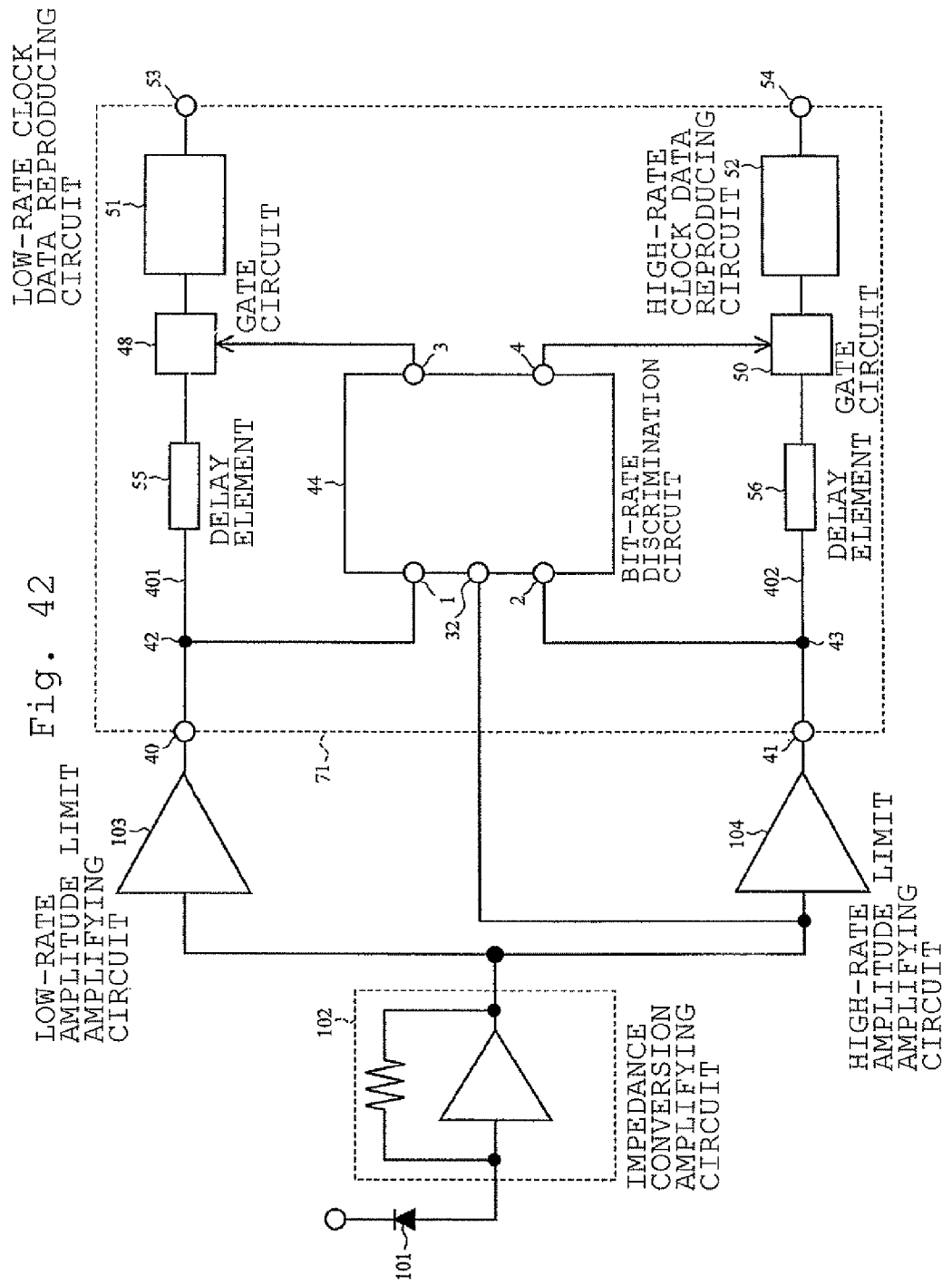
FIG. 42 is a block diagram illustrating a configuration of an optical signal receiving discriminator according to the invention.

A twentieth example is one in which the signal discriminator of the nineteenth example is applied to an optical transmission receiving circuit. FIG. 42 is a block diagram illustrating a configuration of an optical signal receiving discriminator of the twentieth example. The optical signal receiving discriminator of the twentieth example includes: the signal discriminator 71 in FIG. 39 or 41; a photo-detector 101 that receives an input optical signal in which the high-bit-rate optical signal and low-bit-rate optical signal are time-division-multiplexed, and performs photoelectric conversion of the input optical signal into a high-bit-rate current signal and a low-bit-rate current signal; a trans-impedance amplifier (TIA) 102 that converts the high-bit-rate current signal and the low-bit-rate current signal into a high-bit-rate voltage signal and a low-bit-rate voltage signal; a low bit-rate limiting amplifier 103 that amplifies a band corresponding to the low bit-rate to couple the amplified band to the first path 401 of the signal discriminator 71 with respect to one of two branched outputs of the trans-impedance amplifier (TIA) 102; and a high bit-rate limiting amplifier (LA) 104 that amplifies a band corresponding to the high bit-rate faster than the low bit-rate to couple the amplified band to the second path 402 of the signal discriminator 71 with respect to the other of two branched outputs of the trans-impedance amplifier (TIA) 102.

The photo-detector 101 converts the received optical signal into a current signal, the trans-impedance amplifier (TIA) 102 converts the current signal into a voltage signal, and the voltage signal is branched into two. One of the two branched voltage signals is coupled to the low bit-rate limiting amplifier 103, and the other is coupled to the high bit-rate limiting amplifier (LA) 104. The signal input to the signal-discontinuation detecting circuit 33 may be obtained at any point when located in front of the low bit-rate limiting amplifier 103 or high bit-rate limiting amplifier (LA) 104.

The signal denoted by the numeral 1 in FIG. 28 is input to the signal input terminal 40 of the signal discriminator 71. That is, the signal input to the signal input terminal 40 includes the high-bit-rate signal in which the waveform collapses due to the band limitation of the low bit-rate limiting amplifier 103. The signal denoted by the numeral 2 in FIG. 28 is input to the signal input terminal 41 of the signal discriminator 71. That is, the signal lacking in the low-bit-rate signal whose light-receiving sensitivity is equal to or lower than that of the high-bit-rate signal is input to the signal input terminal 41, because the light-receiving sensitivity is reduced in exchange for securing the band of the high-bit-rate signal by the passage of the signal through the high bit-rate limiting amplifier (LA) 104.

Therefore, as described in FIG. 39, the signal discriminator 71 discriminates the input signal in each bit-rate to output the signal from the signal output terminal 53 and the signal output terminal 54. Accordingly, the optical signal receiving discriminator in FIG. 42 receives the time-division-multiplexed optical signals having the plural bit-rates, and can discriminate the signal in each bit-rate to output the signal from the individual output terminal.

Figure 43:
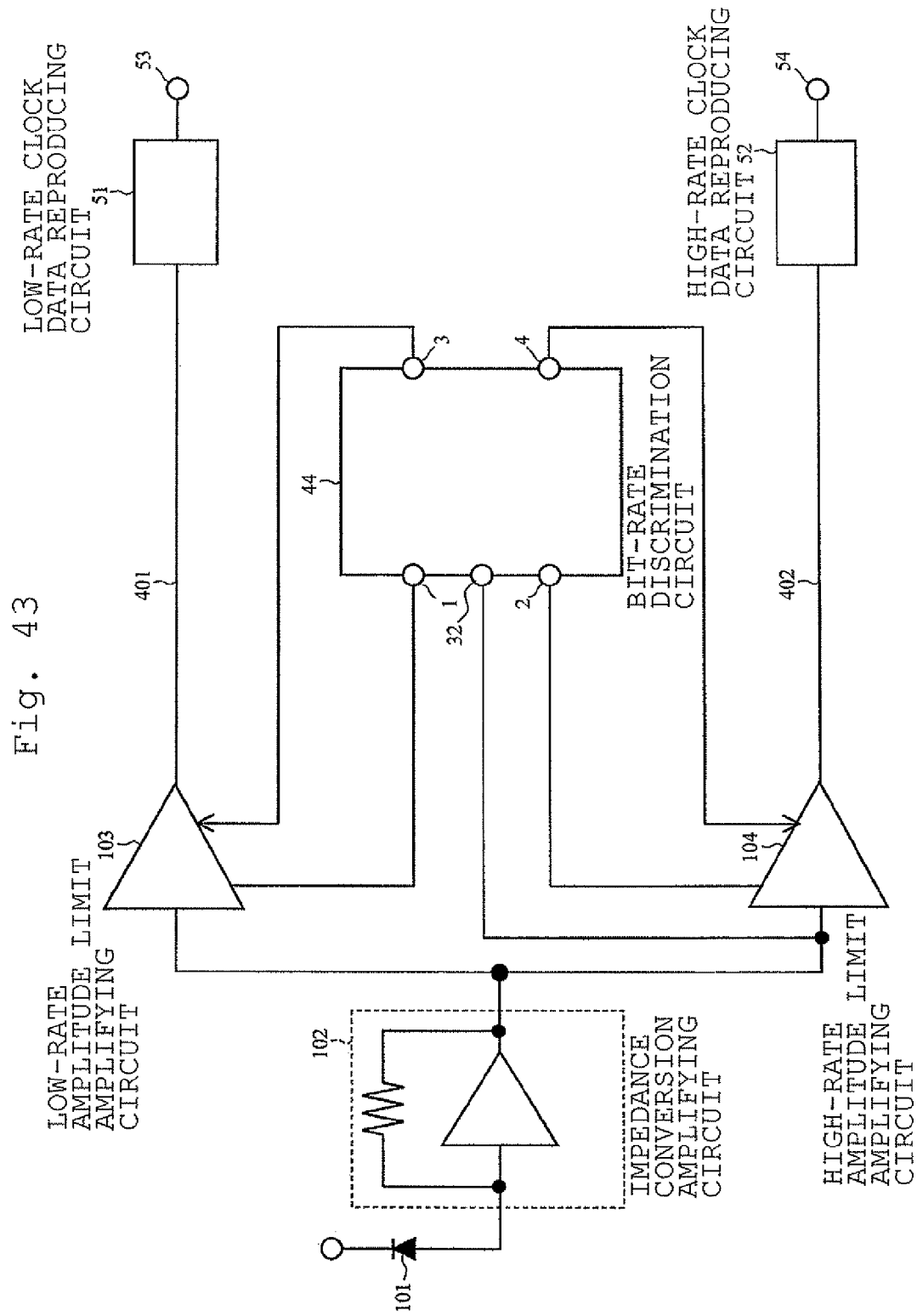
FIG. 43 is a block diagram illustrating a configuration of the optical signal receiving discriminator according to the invention.

FIG. 42 illustrates the configuration of the optical signal receiving discriminator only by way of example. Alternatively, for example, as illustrated in FIG. 43, the gate circuits 48 and 50 are provided in the low bit-rate limiting amplifier 103 and the high bit-rate limiting amplifier (LA) 104, respectively, and the control signals from the bit-rate discrimination apparatus 44 are input to the low bit-rate limiting amplifier 103 and the high bit-rate limiting amplifier (LA) 104. In this manner, the similar effect is obtained.

That is, the optical signal receiving discriminator includes: the photo-detector 101 that receives the input optical signal in which the high-bit-rate optical signal and the low-bit-rate optical signal are time-division-multiplexed, and performs the photoelectric conversion of the input optical signal into the high-bit-rate current signal and the low-bit-rate current signal; the trans-impedance amplifier (TIA) 102 that converts the high-bit-rate current signal and low-bit-rate current signal into the voltage signals; the first path 401, in which the gate circuit that passes or cuts the signal is incorporated, the low bit-rate limiting amplifier 103 that amplifies the band corresponding to the low bit-rate and a clock data reproducing circuit 51 that deals with the low bit-rate are series-connected, and one of two branched outputs of the trans-impedance amplifier (TIA) 102 is coupled as the input signal from the side of the low bit-rate limiting amplifier 103; the second path 402, in which the gate circuit that passes or cuts the signal is incorporated, the high bit-rate limiting amplifier (LA) 104 that amplifies the band corresponding to the high bit-rate faster than the low bit-rate and a clock data reproducing circuit 52 that deals with the high bit-rate are series-connected, and the other of two branched outputs of the photo-detector 101 is coupled as the input signal from the side of the high bit-rate limiting amplifier (LA) 104; and the bit-rate discrimination apparatus in FIG. 27, 29, 31, 33, 35, or 37 that controls the gate circuit such that the low-bit-rate signal is passed through the first path 401 while a high-bit-rate signal is passed through the second path 402 in the input signals.

The similar effect is obtained even if the signal discriminator 71 in FIG. 41 is used as the signal discriminator 71.

As described above, the use of the bit-rate discrimination apparatus and signal discriminator of the examples can automatically discriminate the bit-rate, eliminate the malfunction generated in the configuration of the optical signal receiving discriminator that outputs the desired bit-rate from individual output port in each bit-rate, and implement an optical communication receiving apparatus. The optical communication receiving apparatus instantaneously discriminates the signal even in the case of the plural bit-rates that do not have the relationship of the integral multiple or integral fraction, and outputs the desired bit-rate signal from the individual output port in each bit-rate.

INDUSTRIAL APPLICABILITY

The optical signal receiving discriminator according to the invention can be applied to the multi-rate receiver that can receive the signals having the plural bit-rates.

EXPLANATION OF REFERENCE NUMERALS (In FIGS. 1 to 24)
1: input terminal
2, 3: delay circuit
4: exclusive-NOR circuit (exclusive negative logical addition circuit)
5: termination circuit
6: integrator (time constant of $\tau_0$)

7: comparator
8: power supply or ground
9: reference voltage input terminal
10: output terminal
11, 12: delay circuit
13: integrator (time constant of $\tau_1$)
14, 15: bit-rate discrimination circuit of first example or second example of the invention
16: reset-set flipflop circuit (RS-FF)
17: inverting output terminal
18: malfunction portion
19 and 20: delay circuit
21: NOT circuit
22: AND circuit
23: time difference of tailing edge of pulse output from bit-rate discrimination circuit when low bit-rate signal is input subsequent to non-signal state longer than preamble length of low bit-rate signal
24, 25: delay circuit
26: exclusive-OR circuit (exclusive logical addition circuit)
27, 28: delay circuit
29, 30: bit-rate discrimination circuit of fifth example or sixth example of the invention
31: NOT circuit
32, 33: delay circuit
34: AND circuit
35, 36, 37: bit-rate discrimination circuit of first example, second example, fifth example, or sixth example of the invention
38: OR circuit
39, 40, 41: output terminal
42, 43, 44: inverting output terminal
45, 46, 47: bit-rate discrimination circuit of first example or second example of the invention
48, 49, 50: delay circuit
51, 53: bit-rate discrimination circuit of fifth example or sixth example of the invention
52: bit-rate discrimination circuit of first example or second example of the invention
(In FIGS. 25 to 43)
1: first input port
2: second input port
3: first control port
4: second control port
5, 6: delay circuit
7: exclusive-OR circuit (exclusive logical addition circuit)
8: termination circuit
9: power supply or ground
10: integrator (time constant of $\tau_0$)
11: comparator
12, 13: delay circuit
14: exclusive-OR circuit (exclusive logical addition circuit)
15: termination circuit
16: power supply or ground
17: integrator (time constant of $\tau_1$)
18: comparator
19: input signal
20: low-bit-rate discrimination circuit provided with exclusive-NOR circuit
21, 22: delay circuit
23: exclusive-NOR circuit (exclusive negative logical addition circuit)
24: delay circuit
25: NOT circuit
26: AND circuit
27: false output
28: high-bit-rate discrimination circuit provided with exclusive-NOR circuit
29, 30: delay circuit
31: exclusive-NOR circuit (exclusive negative logical addition circuit)
32: third input port
33: signal-discontinuation detecting circuit
34: NOT circuit
35: AND circuit
36: select switch
37: false output
38: pulse
39: OR circuit
40: signal input terminal
41: signal input terminal
42, 43: signal branching element
44: bit-rate discrimination apparatus
45: bit-rate discrimination circuit signal output terminal
46: bit-rate discrimination circuit differential signal output terminal
47: low-bit-rate control signal input terminal
48: gate circuit
49: high-bit-rate control signal input terminal
50: gate circuit
51: low bit-rate clock and data recovery circuit (CDR)
52: high bit-rate clock and data recovery circuit (CDR)
53: signal output terminal
54: signal output terminal
55, 56: delay circuit
61: first AND circuit
62: second AND circuit
71: signal discriminator
101: photo-detector
102: trans-impedance amplifier (TIA)
103: low bit-rate limiting amplifier
104: high bit-rate limiting amplifier (LA)
105: low-bit-rate-side control port
106: gate circuit
107: high-bit-rate-side control port
108: gate circuit
109: low bit-rate clock and data recovery circuit (CDR)
110: high bit-rate clock and data recovery circuit (CDR)
111: low-bit-rate signal output terminal
112: high bit-rate signal output terminal
113: low-bit-rate discrimination circuit
114: high-bit-rate discrimination circuit
115: reset-set flipflop circuit
123: second input port low-bit-rate discrimination circuit
211, 212, 213, 214, 215, 216: signal output circuit
301: control unit
401: first path
402: second path
S: set terminal
R: reset terminal
Q1: output terminal
Q2: inverting output terminal

The invention claimed is:
1. A bit-rate discrimination method, wherein
a bit-rate of an input signal is discriminated by utilizing periodicity of a unique preamble signal included in the input signal, and
the preamble signal, in which coincidence or incoincidence between the preamble signal and a signal which delayed the unique preamble signal an arbitrary time is utilized, is converted into a consecutive identical signal, and the consecutive identical signal is integrated to per- form a threshold determination, thereby discriminating the bit-rate within a preamble signal receiving time.

2. A bit-rate discrimination circuit comprising: an integrating unit, in which a delay difference corresponding to an integral multiple of a unique preamble pattern period included in an input signal is provided between two input terminals of an exclusive-NOR circuit, the input signal is input to the two input terminals with the delay difference, and an output signal from the exclusive-NOR circuit is integrated; and a comparison unit that compares a signal obtained by the integrating unit to a threshold to output discrimination result.

3. A bit-rate discrimination circuit comprising: an integrating unit, in which a delay difference corresponding to an odd-numbered multiple of a half of a unique preamble pattern period included in an input signal is provided between two input terminals of an exclusive-OR circuit, the input signal is input to the two input terminals with the delay difference, and an output signal from the exclusive-OR circuit is integrated; and a comparison unit that compares a signal obtained by the integrating unit to a threshold to output discrimination result.

4. The bit-rate discrimination circuit according to claim 2 or 3, wherein an integration time constant corresponding to a preamble signal receiving time of a signal having a bit-rate to be discriminated is set to the integrating unit.

5. A bit-rate discrimination apparatus comprising a first bit-rate discrimination circuit and a second bit-rate discrimination circuit, wherein
the first bit-rate discrimination circuit includes:
an integrating unit, in which a delay difference corresponding to an integral multiple of a unique preamble pattern period included in an input signal is provided between two input terminals of an exclusive-NOR circuit, the input signal is input to the two input terminals with the delay difference, and an output signal from the exclusive-NOR circuit is integrated; and a comparison unit that compares a signal obtained by the integrating unit to a threshold to output discrimination result,
the second bit-rate discrimination circuit includes:
an integrating unit, in which a delay difference corresponding to an odd-numbered multiple of a half of a unique preamble pattern period included in an input signal is provided between two input terminals of an exclusive-OR circuit, the input signal is input to the two input terminals with the delay difference, and an output signal from the exclusive-OR circuit is integrated; and a comparison unit that compares a signal obtained by the integrating unit to a threshold to output discrimination result,
a plurality of the first bit-rate discrimination circuits or a plurality of the second bit-rate discrimination circuits are connected to a common input terminal, or the first bit-rate discrimination circuits or the second bit-rate discrimination circuits are connected while combined, and the delay difference possessed by each bit-rate discrimination circuit and an integration time constant of the integrating unit are varied to be able to discriminate a plurality of rates.

6. A bit-rate discrimination apparatus comprising a storage circuit in which the discrimination result of the bit-rate discrimination circuits according to claim 5 are stored, wherein the storage circuit holds the previous discrimination results until the discrimination result is changed.

7. The bit-rate discrimination apparatus according to claim 6, wherein priority is placed on the discrimination of the bit-rate discrimination circuit that handles the highest-bit-rate signal in at least two bit-rate discrimination circuits in the plurality of the bit-rate discrimination circuits used, when at least the two bit-rate discrimination circuits simultaneously discriminate that the bit-rate is handled thereby.

8. The bit-rate discrimination apparatus according to claim 6, wherein the first bit-rate discrimination circuit is used as a bit-rate discrimination circuit for a low bit-rate, the second bit-rate discrimination circuit is used as a bit-rate discrimination circuit for a high bit-rate, the first bit-rate discrimination circuit and the second bit-rate discrimination circuit are connected to a common input terminal, and a pulse compression unit that compresses a pulse width of a discrimination output signal of the first bit-rate discrimination circuit to a rising edge is provided.

9. The bit-rate discrimination apparatus as in any one of claims 7 to 8, wherein an integration time constant corresponding to a preamble signal receiving time of the signal having the bit-rate to be discriminated is set to the integrating unit.

10. A bit-rate discrimination apparatus comprising a control unit that outputs a control signal controlling a gate circuit such that a low-bit-rate signal in an input signal is passed through a first path and such that a high-bit-rate signal faster than the low-bit-rate signal in the input signal is passed through a second path, the input signal being input to the first path and the second path, the gate circuit that opens or shuts the gate for the signal being connected to each of the first path and the second path,
wherein the control unit includes:
a first input port that obtains the input signal in front of the gate circuit of the first path; and
a second input port that obtains the input signal in front of the gate circuit of the second path, and
a bit-rate of the input signal from each of the first input port and the second input port is determined based on a preamble pattern included in the input signal, thereby preventing a control malfunction of the gate circuit.

11. The bit-rate discrimination apparatus according to claim 10,
wherein the control unit includes:
a low-bit-rate discrimination circuit that is connected to the first input port to discriminate whether the bit-rate of the input signal is identical to the set low bit-rate;
a high-bit-rate discrimination circuit that is connected to the second input port to discriminate whether the bit-rate of the input signal is identical to the set high bit-rate; and
a signal output circuit that includes a first control port connected to the gate circuit of the first path and a second control port connected to the gate circuit of the second path, and outputs the control signal from each of the first control port and the second control port based on discrimination result of each of the high-bit-rate discrimination circuit and the low-bit-rate discrimination circuit.

12. The bit-rate discrimination apparatus according to claim 11, wherein
the preamble pattern of the input signal has a period pattern in which polarity is inverted at a half of a period and an inverted code of the first-half pattern becomes the second-half pattern,
each of the low-bit-rate discrimination circuit and the high-bit-rate discrimination circuit, which branches the input signal into two signals, includes: delay circuits that generate a delay difference corresponding to an odd-numbered multiple of a half period of the preamble pattern of the input signal between the two branched signals; an exclusive-OR circuit to which the two signals having the delay difference are input from the delay circuits, and which produces a consecutive identical signal when the codes of the two signals are different from each other; an integrator that integrates the consecutive identical signal from the exclusive-OR circuit; and a comparator that makes discrimination with a predetermined threshold and the consecutive identical signal integral value integrated by the integrator, the low-bit-rate discrimination circuit outputs a pulse having a finite width within the preamble period pattern when the input signal has the low bit-rate, the high-bit-rate discrimination circuit outputs a pulse having a finite width within the preamble period pattern when the input signal has the high bit-rate, and the signal output circuit includes a determination circuit to which the pulse is input as a control determining signal from each of the low-bit-rate discrimination circuit and the high-bit-rate discrimination circuit, and which produces the control signal and maintains a state of the control signal until the bit-rate of the input signal is changed.

13. The bit-rate discrimination apparatus according to claim 11, wherein the preamble pattern included in the high-bit-rate input signal has a period pattern in which polarity is inverted at a half of a period and an inverted code of the first-half pattern becomes the second-half pattern, the preamble pattern included in the low-bit-rate input signal has integral repetition patterns having given periods, the high-bit-rate discrimination circuit that branches the input signal into two signals includes: delay circuits that generate a delay difference corresponding to an odd-numbered multiple of a half period of the preamble pattern of the input signal between the two branched signals; an exclusive-OR circuit to which the two signals having the delay difference are input from the delay circuits, and which produces a consecutive identical signal when the codes of the two signals are different from each other; an integrator that integrates the consecutive identical signal from the exclusive-OR circuit; and a comparator that makes discrimination using a predetermined threshold and the consecutive identical signal integral value integrated by the integrator, the high-bit-rate discrimination circuit outputs a pulse signal having a finite width within the preamble period pattern when the input signal has the high bit-rate, the low-bit-rate discrimination circuit that branches the input signal into two signals includes: delay circuits that generate a delay difference corresponding to an integral multiple of a period of the preamble pattern of the input signal between the two branched signals; an exclusive-NOR circuit to which the two signals having the delay difference are input from the delay circuits, and which produces a consecutive identical signal when the codes of the two signals are identical to each other; an integrator that integrates the consecutive identical signal from the exclusive-NOR circuit; and a comparator that makes discrimination with a predetermined threshold and the consecutive identical signal integral value integrated by the integrator, the low-bit-rate discrimination circuit outputs a pulse signal when the input signal is in a non-signal state, and the signal output circuit includes: an AND circuit to which the pulse signal from the low-bit-rate discrimination circuit and an inverting pulse signal of the pulse signal from the high-bit-rate discrimination circuit are input; and a determination circuit to which the output result of the AND circuit and the pulse signal from the high-bit-rate discrimination circuit are input as a control determining signal, and which produces the control signal and maintains a state of the control signal until the bit-rate of the input signal is changed.

14. The bit-rate discrimination apparatus according to claim 11, wherein the preamble pattern included in the high-bit-rate input signal has integral repetition patterns having given periods, the preamble pattern included in the low-bit-rate input signal has a period pattern in which polarity is inverted at a half of a period and an inverted code of the first-half pattern becomes the second-half pattern, the control unit further includes a signal-discontinuation detecting circuit that outputs a pulse signal having a finite width when at least one of the input signals input to the first input port and the second input port is smaller than a predetermined amplitude, the high-bit-rate discrimination circuit that branches the input signal into two signals includes: delay circuits that generate a delay difference corresponding to an integral multiple of a period of the preamble pattern of the input signal between the two branched signals; an exclusive-NOR circuit to which the two signals having the delay difference are input from the delay circuits, and which produces a consecutive identical signal when the codes of the two signals are identical to each other; an integrator that integrates the consecutive identical signal from the exclusive-NOR circuit; and a comparator that makes discrimination using a predetermined threshold and the consecutive identical signal integral value integrated by the integrator, the high-bit-rate discrimination circuit outputs a pulse signal when the input signal is in a non-signal state, the low-bit-rate discrimination circuit that branches the input signal into two signals includes: delay circuits that generate a delay difference corresponding to an odd-numbered multiple of a half period of the preamble pattern of the input signal between the two branched signals; an exclusive-OR circuit to which the two signals having the delay difference are input from the delay circuits, and which produces a consecutive identical signal when the codes of the two signals are different from each other; an integrator that integrates the consecutive identical signal from the exclusive-OR circuit; and a comparator that makes discrimination using a predetermined threshold and the consecutive identical signal integral value integrated by the integrator, the low-bit-rate discrimination circuit outputs a pulse signal having a finite width within the preamble period pattern when the input signal has the high bit-rate as the discrimination result, the signal output circuit includes: an AND circuit to which the pulse signal from the high-bit-rate discrimination circuit and an inverting pulse signal of the pulse signal from the signal-discontinuation detecting circuit are input; and a determination circuit to which the output result of the AND circuit and the pulse signal from the low-bit-rate discrimination circuit are input as a control determining signal, and which produces the control signal and maintains a state of the control signal until the bit-rate of the input signal is changed.

15. The bit-rate discrimination apparatus according to claim 11, wherein the preamble pattern of the input signal has integral repetition patterns having given periods, the control unit further includes a signal-discontinuation detecting circuit that outputs a pulse signal having a finite width when at least one of the input signals input to the first input port and the second input port is smaller than a predetermined amplitude, each of the low-bit-rate discrimination circuit and the high-bit-rate discrimination circuit, which branches the input signal into two signals, includes: delay circuits that generate a delay difference corresponding to an integral multiple of a period of the preamble pattern of the input signal between the two branched signals;

an exclusive-NOR circuit to which the two signals having the delay difference are input from the delay circuits, and which produces a consecutive identical signal when the codes of the two signals are identical to each other;

an integrator that integrates the consecutive identical signal from the exclusive-NOR circuit; and a comparator that makes discrimination with a predetermined threshold and the consecutive identical signal integral value integrated by the integrator, each of the low-bit-rate discrimination circuit and the high-bit-rate discrimination circuit outputs a pulse signal when the input signal is in a non-signal state, the signal output circuit includes: a first AND circuit to which the pulse signal from the high-bit-rate discrimination circuit and an inverting pulse signal of the pulse signal from the signal-discontinuation detecting circuit are input; a second AND circuit to which the output result from the first AND circuit and the pulse signal from the low-bit-rate discrimination circuit are input; and a determination circuit to which the output result of the first AND circuit and the output result from the second AND circuit are input as a control determining signal, and which produces the control signal and maintains a state of the control signal until the bit-rate of the input signal is changed.

16. The bit-rate discrimination apparatus according to claim 11, wherein the control unit further includes:

a second input port low-bit-rate discrimination circuit that discriminates whether the bit-rate of the input signal is identical to the set low bit-rate;

a signal-discontinuation detecting circuit that outputs a pulse signal having a finite width when at least one of the input signals input to the first input port and the second input port is smaller than a predetermined amplitude; and a select switch that selects the discrimination result of the low-bit-rate discrimination circuit or the discrimination result from the second input port low-bit-rate discrimination circuit using the pulse signal from the signal-discontinuation detecting circuit, the high-bit-rate discrimination circuit and the second input port low-bit-rate discrimination circuit are parallel-connected to the second input port, and the signal output circuit includes a determination circuit to which the discrimination result selected by the select switch and the discrimination result from the high-bit-rate discrimination circuit are input as a control determining signal, and which produces the control signal and maintains a state of the control signal until the bit-rate of the input signal is changed.

17. A bit-rate discrimination apparatus comprising a control unit that outputs a control signal controlling a gate circuit such that a low-bit-rate signal in an input signal is passed through a first path and such that a high-bit-rate signal faster than the low-bit-rate signal in the input signal is passed through a second path, the input signal being input to the first path and the second path, the gate circuit that opens or shuts the gate for the signal being connected to each of the first path and the second path, wherein the control unit includes:

a second input port that obtains the input signal in front of the gate circuit of the second path;

a low-bit-rate discrimination circuit that is connected to the second input port to discriminate whether the bit-rate of the input signal is identical to the set low bit-rate;

a high-bit-rate discrimination circuit that is connected to the second input port in parallel with the low-bit-rate discrimination circuit, to discriminate circuit discriminating whether the bit-rate of the input signal is identical to the set high bit-rate;

a signal-discontinuation detecting circuit that outputs a pulse signal having a finite width when at least one of the input signals input to a first input port and the second input port is smaller than a predetermined amplitude, the first input port obtaining the input signal in front of the gate circuit of the first path; and a signal output circuit that includes a first control port connected to the gate circuit of the first path and a second control port connected to the gate circuit of the second path, and outputs the control signal from each of the first control port and the second control port based on discrimination result of each of the high-bit-rate discrimination circuit and the low-bit-rate discrimination circuit, each of the low-bit-rate discrimination circuit and the high-bit-rate discrimination circuit, which branches the input signal into two signals, includes: delay circuits that generate a predetermined delay difference based on a preamble pattern of the input signal between the two branched signals; an exclusive-OR circuit to which the two signals having the delay difference are input from the delay circuits, and which produces a consecutive identical signal when the codes of the two signals are different from each other, or an exclusive-NOR circuit to which the two signals having the delay difference are input from the delay circuits, the exclusive-NOR circuit producing a consecutive identical signal when the codes of the two signals are identical to each other based on the preamble pattern of the input signal;

an integrator that integrates the consecutive identical signal from the exclusive-OR circuit or the exclusive-NOR circuit; and a comparator that makes discrimination with a predetermined threshold and the consecutive identical signal integral value integrated by the integrator, the low-bit-rate discrimination circuit outputs a pulse signal having a finite width within the preamble period pattern when the input signal has the low bit-rate, the high-bit-rate discrimination circuit outputs a pulse signal having a finite width within the preamble period pattern when the input signal has the high bit-rate, and the signal output circuit includes:

an OR circuit to which the pulse signal from the signal-discontinuation detecting circuit and the pulse signal from the low-bit-rate discrimination circuit are input; and a determination circuit to which the output result of the OR circuit and the pulse signal from the high-bit-rate discrimination circuit are input as a control determining signal, and which produces the control signal, maintains a state of the control signal until the bit-rate of the input signal is changed.

18. The bit-rate discrimination apparatus as in any one of claims 12 to 17, wherein the determination circuit is a reset-set flipflop circuit, in the reset-set flipflop circuit, the control determining signal is input to each of a set terminal and a reset terminal, and an output terminal and the first control port are connected and an inverting output terminal and the second control port are connected, or the inverting output terminal and the first control port are connected and the output terminal and the second control port are connected.

19. A bit-rate discrimination method, wherein
when a preamble pattern included in an identical input signal input to both a first path and a second path, each of which is connected to a gate circuit that opens or shuts the gate for a signal, has a period pattern, in which polarity is inverted at a half of a period and an inverted code of the first-half pattern becomes the second-half pattern, at both a low bit-rate and a high bit-rate faster than the low bit-rate,
the input signal is obtained in front of the gate circuit of the first path and input to a low-bit-rate discrimination circuit,
the input signal is obtained in front of the gate circuit of the second path and input to a high-bit-rate discrimination circuit,
the input signal is branched into two signals by each of the low-bit-rate discrimination circuit and the high-bit-rate discrimination circuit, a delay difference corresponding to an odd-numbered multiple of a half of a preamble pattern of the input signal is generated between the two branched signals, a consecutive identical signal is generated to make discrimination with a predetermined threshold and a value obtained by integrating the consecutive identical signal, when codes of the two signals having the delay difference are different from each other, the low-bit-rate discrimination circuit outputs a pulse signal having a finite width within the preamble period pattern, when the input signal has the low bit-rate, the high-bit-rate discrimination circuit outputs a pulse signal having a finite width within the preamble period pattern, when the input signal has the high bit-rate, and
a control signal that controls the gate circuit is output based on the pulse signal from each of the low-bit-rate discrimination circuit and the high-bit-rate discrimination circuit.

20. A bit-rate discrimination method, wherein
when a preamble pattern included in an identical input signal input to both a first path and a second path each of which is connected to a gate circuit that opens or shuts the gate for a signal has integral period patterns at a low bit-rate and a period pattern, in which polarity is inverted at a half of a period and an inverted code of the first-half pattern becomes the second-half pattern, at a high bit-rate faster than the low bit-rate,
the input signal is obtained in front of the gate circuit of the first path and input to a low-bit-rate discrimination circuit,
the input signal is obtained in front of the gate circuit of the second path and input to a high-bit-rate discrimination circuit,
the input signal is branched into two signals by the high-bit-rate discrimination circuit, a delay difference corresponding to an odd-numbered multiple of a half period of a preamble pattern of the input signal is generated between the two branched signals, a consecutive identical signal is generated to make discrimination with a predetermined threshold and a value obtained by integrating the consecutive identical signal when codes of the two signals having the delay difference are different from each other, and the high-bit-rate discrimination circuit outputs a pulse signal having a finite width within the preamble period pattern when the input signal has the high bit-rate,
the input signal is branched into two signals by the low-bit-rate discrimination circuit, a delay difference corresponding to an integral multiple of a period of the preamble pattern of the input signal is generated between the two branched signals, a consecutive identical signal is generated to make discrimination with a predetermined threshold and a value obtained by integrating the consecutive identical signal when codes of the two signals having the delay difference are identical to each other, and the low-bit-rate discrimination circuit outputs a pulse signal when the input signal is in a non-signal state, and
an inverting pulse signal of the pulse signal from the high-bit-rate discrimination circuit and the pulse signal from the low-bit-rate discrimination circuit are input to an AND circuit, and a control signal that controls the gate circuit is output based on the output result from the AND circuit and the pulse signal from the high-bit-rate discrimination circuit.

21. A bit-rate discrimination method, wherein
when a preamble pattern included in an identical input signal input to both a first path and a second path each of which is connected to a gate circuit that opens or shuts the gate for a signal has a period pattern, in which polarity is inverted at a half of a period and an inverted code of the first-half pattern becomes the second-half pattern, at a low bit-rate and integral period patterns at a high bit-rate faster than the low bit-rate,
the input signal is obtained in front of the gate circuit of the first path and input to a low-bit-rate discrimination circuit,
the input signal is obtained in front of the gate circuit of the second path and input to a high-bit-rate discrimination circuit,
the input signal is branched into two signals by the high-bit-rate discrimination circuit, a delay difference corresponding to an integral multiple of a period of a preamble pattern of the input signal is generated between the two branched signals, a consecutive identical signal is generated to make discrimination with a predetermined threshold and a value obtained by integrating the consecutive identical signal when codes of the two signals having the delay difference are identical to each other, and the high-bit-rate discrimination circuit outputs a pulse signal when the input signal is in a non-signal state,
the input signal is branched into two signals by the low-bit-rate discrimination circuit, a delay difference corresponding to an odd-numbered multiple of a half period of the preamble pattern of the input signal is generated between the two branched signals, a consecutive identical signal is generated to make discrimination with a predetermined threshold and a value obtained by integrating the consecutive identical signal when codes of the two signals having the delay difference are different from each other, and the low-bit-rate discrimination circuit outputs a pulse signal having a finite width within the preamble period pattern when the input signal has the low bit-rate, and
an inverting pulse signal of the pulse signal having the finite width and the pulse signal from the high-bit-rate discrimination circuit are input to an AND circuit when at least one of the input signals input to the first input port and the second input port is smaller than a predetermined amplitude, and a control signal that controls the gate circuit is output based on the output result from the AND circuit and the pulse signal from the low-bit-rate discrimination circuit.

22. A bit-rate discrimination method, wherein
when a preamble pattern included in an identical input signal input to both a first path and a second path each of which is connected to a gate circuit that opens or shuts the gate for a signal has integral period patterns at both a low bit-rate and a high bit-rate faster than the low bit-rate,
the input signal is obtained in front of the gate circuit of the first path and input to a low-bit-rate discrimination circuit,
the input signal is obtained in front of the gate circuit of the second path and input to a high-bit-rate discrimination circuit,
the input signal is branched into two signals by each of the low-bit-rate discrimination circuit and the high-bit-rate discrimination circuit, a delay difference corresponding to an integral multiple of a period of a preamble pattern of the input signal is generated between the two branched signals, a consecutive identical signal is generated to make discrimination with a predetermined threshold and a value obtained by integrating the consecutive identical signal when codes of the two signals having the delay difference are identical to each other, and each of the low-bit-rate discrimination circuit and the high-bit-rate discrimination circuit outputs a pulse signal when the input signal is in a non-signal state, and
an inverting pulse signal of a pulse signal having a finite width and the pulse signal from the high-bit-rate discrimination circuit are input to a first AND circuit when at least one of the input signals of the first path and the second path is smaller than a predetermined amplitude, the output result from the first AND circuit and the pulse signal from the low-bit-rate discrimination circuit are input to a second AND circuit, and a control signal that controls the gate circuit is output based on the output result from the first AND circuit and the output result from the second AND circuit.

23. A signal discriminator comprising:
a first path in which a gate circuit that opens or shuts the gate for a signal and a clock and data recovery circuit that deals with a low bit-rate are series-connected or a clock and data recovery circuit, in which the gate circuit is incorporated to deal with the low bit-rate, is connected;
a second path in which a gate circuit that opens or shuts the gate for a signal and a clock and data recovery circuit that deals with a high bit-rate faster than the low bit-rate are series-connected or a clock and data recovery circuit, in which the gate circuit is incorporated to deal with the high bit-rate, is connected; and
the bit-rate discrimination apparatus as in any one of claims 12 to 17 that controls the gate circuit such that a low-bit-rate signal is passed through the first path while a high-bit-rate signal is passed through the second path in a time-division-multiplexed identical input signal input to both the first path and the second path.

24. An optical signal receiving discriminator comprising:
the signal discriminator according to claim 23;
a photo-detector that receives an input optical signal in which a high-bit-rate optical signal and low-bit-rate optical signal are time-division-multiplexed, and performs photoelectric conversion of the input optical signal into a high-bit-rate current signal and a low-bit-rate current signal;
a trans-impedance amplifier that converts the high-bit-rate current signal and the low-bit-rate current signal into a high-bit-rate voltage signal and a low-bit-rate voltage signal;
a low bit-rate limiting amplifier that amplifies a band corresponding to the low bit-rate to couple the amplified band to the first path of the signal discriminator with respect to one of two branched outputs of the trans-impedance amplifier; and
a high bit-rate limiting amplifier that amplifies a band corresponding to the high bit-rate faster than the low bit-rate to couple the amplified band to the second path of the signal discriminator with respect to the other of two branched outputs of the trans-impedance amplifier.

25. An optical signal receiving discriminator comprising:
a photo-detector that receives an input optical signal in which a high-bit-rate optical signal and low-bit-rate optical signal are time-division-multiplexed;
a trans-impedance amplifier that converts the high-bit-rate current signal and low-bit-rate current signal, to which photoelectric conversion is already performed, into a high-bit-rate voltage signal and a low-bit-rate voltage signal;
a first path, in which a gate circuit that opens or shuts the gate for a signal is incorporated, a low bit-rate limiting amplifier that amplifies a band corresponding to the low bit-rate and a clock data reproducing circuit that deals with the low bit-rate are series-connected, and one of two branched outputs of the trans-impedance amplifier is coupled as an input signal from the low bit-rate limiting amplifier side;
a second path, in which a gate circuit that passes or cuts the signal is incorporated, a high bit-rate limiting amplifier that amplifies a band corresponding to the high bit-rate faster than the low bit-rate and a clock data reproducing circuit that deals with the high bit-rate are series-connected, and the other of two branched outputs of the trans-impedance amplifier is coupled as an input signal from the high bit-rate limiting amplifier side; and
the bit-rate discrimination apparatus as in any one of claims 12 to 17 that controls the gate circuit such that a low-bit-rate signal is passed through the first path while a high-bit-rate signal is passed through the second path in the input signal.

* * * * *